United States Patent
Jones et al.

(10) Patent No.: US 7,545,917 B2
(45) Date of Patent: Jun. 9, 2009

(54) SYSTEM FOR ACCESSING DATA VIA VOICE

(75) Inventors: Shannon Jones, San Mateo, CA (US);
Richard Gorman, San Mateo, CA (US);
Jesse Ambrose, San Jose, CA (US);
Joseph Harb, Woodinville, WA (US);
Chris Haven, Seattle, WA (US)

(73) Assignee: Siebel Systems, Inc., San Mateo, CA (US)

( * ) Notice: Subject to any disclaimer, the term of this patent is extended or adjusted under 35 U.S.C. 154(b) by 0 days.

(21) Appl. No.: 11/725,839

(22) Filed: Mar. 20, 2007

(65) Prior Publication Data
US 2007/0165796 A1 Jul. 19, 2007

Related U.S. Application Data

(63) Continuation of application No. 10/039,037, filed on Jan. 4, 2002, now Pat. No. 7,194,069.

(51) Int. Cl.
*H04M 1/64* (2006.01)
(52) U.S. Cl. ............ 379/88.02; 379/88.01; 379/210.01; 455/405; 701/210; 704/273
(58) Field of Classification Search .............. 379/88.02, 379/88.01, 210.01; 455/405; 701/210; 704/273
See application file for complete search history.

(56) References Cited

U.S. PATENT DOCUMENTS

| | | | | |
|---|---|---|---|---|
| 5,566,236 | A | 10/1996 | MeLampy et al. | 379/210.01 |
| 5,915,001 | A | 6/1999 | Uppaluru | 379/88.22 |
| 6,466,654 | B1 | 10/2002 | Cooper et al. | 379/80.01 |
| 6,502,094 | B1 | 12/2002 | Gvily et al. | 707/5 |
| 6,633,846 | B1 | 10/2003 | Bennett et al. | 704/257 |
| 6,671,672 | B1 | 12/2003 | Heck | 704/273 |
| 6,700,965 | B1 | 3/2004 | Ferrer et al. | 379/202.02 |
| 6,724,864 | B1 | 4/2004 | Denenberg et al. | 379/88.16 |
| 6,836,651 | B2 | 12/2004 | Segal et al. | 455/405 |
| 6,850,604 | B2 | 2/2005 | Cannell et al. | 379/93.01 |
| 6,950,745 | B2 | 9/2005 | Agnew et al. | 701/210 |
| 7,054,819 | B1 | 5/2006 | Loveland | 704/273 |
| 2002/0010705 | A1 | 1/2002 | Park et al. | 707/104.1 |
| 2002/0072951 | A1 | 6/2002 | Lee et al. | 705/10 |
| 2002/0120519 | A1 | 8/2002 | Martin et al. | 705/21 |
| 2002/0184402 | A1 | 12/2002 | Gangopadhyay | 719/315 |
| 2003/0046208 | A1 | 3/2003 | Lubking et al. | 705/36 R |
| 2003/0069780 | A1 | 4/2003 | Hailwood et al. | 705/10 |

(Continued)

*Primary Examiner*—Gerald Gauthier
(74) *Attorney, Agent, or Firm*—Campbell Stephenson LLP

(57) ABSTRACT

A system for providing access to data via a voice interface. In one embodiment, the system includes a voice recognition unit and a speech processing server that work together to enable users to interact with the system using voice commands guided by navigation context sensitive voice prompts, and provide user-requested data in a verbalized format back to the users. Digitized voice waveform data are processed to determine the voice commands of the user. The system also uses a "grammar" that enables users to retrieve data using intuitive natural language speech queries. In response to such a query, a corresponding data query is generated by the system to retrieve one or more data sets corresponding to the query. The user is then enabled to browse the data that are returned through voice command navigation, wherein the system "reads" the data back to the user using text-to-speech (TTS) conversion and system prompts.

11 Claims, 35 Drawing Sheets

U.S. PATENT DOCUMENTS

| | | | |
|---|---|---|---|
| 2003/0084053 A1 | 5/2003 | Govrin et al. | 707/100 |
| 2003/0123618 A1 | 7/2003 | Bhargava et al. | 379/88.01 |
| 2003/0158937 A1 | 8/2003 | Johal et al. | 709/224 |
| 2003/0200130 A1 | 10/2003 | Kall et al. | 705/9 |
| 2004/0030556 A1 | 2/2004 | Bennett | 704/270 |

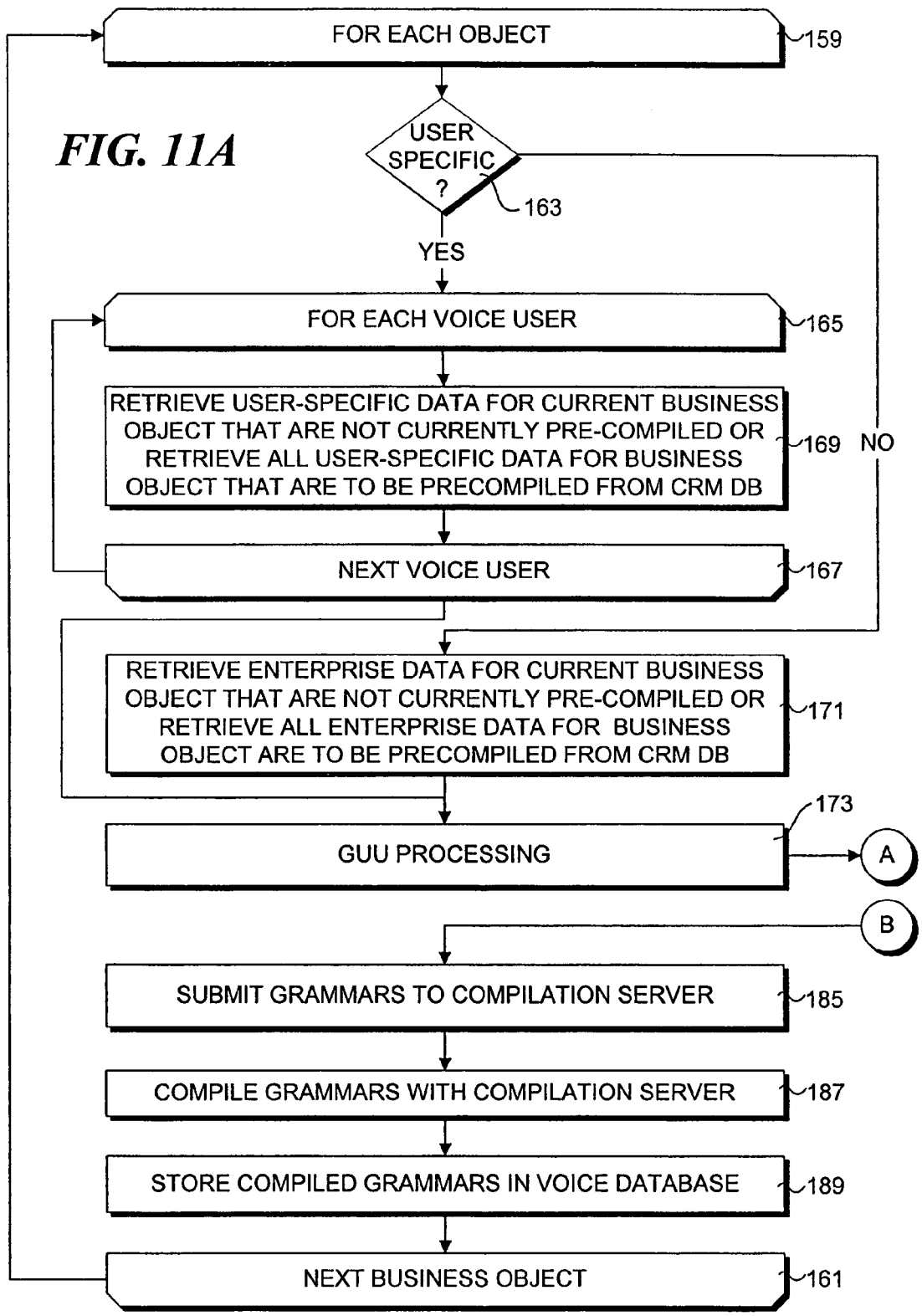

KEYWORD OPT. DATA KEYWORD
"LOOK UP MY NEW OPPORTUNITIES"

FIG. 13A

KEYWORD OPT. DATA KEYWORD KEYWORD
"LOOK UP THE NEW OPPORTUNITIES GREATER THAN [X] DOLLARS"
                            DATA

FIG. 13B

KEYWORD OPT. DATA KEYWORD KEYWORD DATA
"LOOK UP THE  OPPORTUNITIES FOR [ACCOUNT NAME]"

FIG. 13C

SYSTEM FOR ACCESSING DATA VIA VOICE

CROSS-REFERENCE TO RELATED APPLICATIONS

This application is a continuation of U.S. application Ser. No. 10/039,037, filed Jan. 4, 2002 which is now U.S. Pat. No. 7,194,069, entitled "SYSTEM FOR ACCESSING DATA VIA VOICE," issued on Mar. 20, 2007, and naming Shannon Jones, Richard Gorman, Jesse Ambrose, Joseph Harb and Chris Haven. This application is incorporated by reference herein, in its entirety and for all purposes.

BACKGROUND OF THE INVENTION

1. Field of the Invention

The present invention relates to access of data in general, and, in more particular, a system for accessing data using voice commands via a voice communications connection to a remote database access system.

2. Background Information

Today's work environment is more mobile than ever before. The proliferation of cellular telephony, wireless Internet-enables devices, laptop computers, handheld PCs and various other technologies have helped create a traveling "virtual office" work environment for many. Many professionals spend endless hours on the road, in airports, at business meetings, etc. Prior to the existence of the foregoing devices, the traveling professional might have to bring paper copies of his or her work with them if he or she needed access to such information while away from the office. Today, such information can be easily accessed via a laptop computer or handheld computer.

Although these modern devices are wonderful, there are often situations when a business professional is away from the office, and needs to obtain data that is difficult, if not impossible, to access using current technology. For example, much of today's business data is stored in central repositories, such as enterprise databases. While accessing enterprise data is relatively painless via a land-line network link, the problem gets more difficult when a land-line network link is not available, such as is often the case for the mobile professional.

On first glance, a wireless network link might appear to be a viable option; however, current wireless network access is generally very slow and unpredictable. For instance, wireless Internet access of full-featured Internet sites typically provides data transfer rates of only 20 kbits/sec. Why not access the data via an Internet-enabled phone? While many wireless phone and PDA manufacturers tout their devices' ability to access the Internet, what they don't advertise is that these devices can access only a very limited subset of Internet sites, including virtual private network hosts, that support the WAP (Wireless application protocol) protocol transport and include special versions of some of their web pages and data coded in WML (wireless markup language) rather than the HTML (hypertext markup language) code used for conventional web data.

It would be advantageous to enable the mobile professional to access data from virtually any location, such as via a wireless phone. This type of data access is presently provided by many banking institutions and credit-card agencies, whereby customers are able to access their personal banking and credit-card information by navigating through sets of fixed menu options by providing "voice" commands in response to predetermined system prompts. However, this type of voice access to data is very limited, as it only allows access to a very limited set of institution-generated data, and the mechanism for accessing the data is very static. For instance, under most voice-enabled bank data access systems, an individual may only access their own account data through a predetermined fixed navigation path. Ideally, it would be advantageous to enable users to access a wide variety of different data types from a telephone, whereby the user could perform ad hoc queries and access user- or company-specific information that has been stored in a database by the user or others known to the user rather than an institution that maintains the database.

SUMMARY OF THE INVENTION

The present invention provides a system for providing access to data via a voice interface. In one embodiment, the system includes a voice recognition unit and a speech processing server that work together to enable users to interact with the system via a telephone using voice commands guided by navigation context sensitive voice prompts, and provides user-requested data in a verbalized format back to the users.

The speech processing server receives digitized voice waveform data and processes it to determine the voice commands of the user. The system also uses a "grammar" that enables users to query for various data using intuitive natural language voice commands. In response to a user command, the system processes the command to determine what data the user wants to retrieve, or where the user wants to navigate. If the user desires to access data from the database, an appropriate query is generated by the system to retrieve one or more data sets corresponding to a verbal data request input provided by the user. The user is then enabled to "browse" the various data that are returned through voice command navigation, wherein the system "reads" the data back to the user using text-to-speech (TTS) technology or concatenated prerecorded speech in combination with TTS.

In accordance with various aspects of the invention, details of an exemplary voice access data system are provided that enables users to remotely access data stored in an enterprise database via a telephone. In one exemplary embodiment, the enterprise database stores customer relationship management (CRM) data. In a typical voice access session, a user will call a phone number that provides access to the system and perform a log in operation during which a user is authenticated through use of a user identifier and a PIN number. After the user has been authenticated, a main menu enables a user to navigate to various domains, wherein each domain provides user interface options pertaining to a corresponding logical partition of business data. For example, in the exemplary CRM data system, the domains include an opportunities, contacts, accounts, calendar, and employees domain. In accordance with the teaching and principles of the invention, other domains may be added or substituted to correspond to various types of data commonly found in enterprise data systems. The user can "browse" each domain by speaking appropriate voice commands, which are context sensitive to the current location of the user in the domain. Furthermore, depending on the navigation context, a user may "jump" to another domain so as to enable the user to retrieve data from that domain. Users may also interactively initiate a phone call to selected contacts, accounts, and/or employees through the system while participating in a user session.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIGS. 11A and 11B collectively comprise a flowchart for illustrating the logic used by the invention when performing a grammar update operation;

FIGS. 13A, 13B, and 13C illustrate grammar and syntax corresponding to respective user utterances that are used to request data corresponding to a user's business opportunities to be retrieved;

DETAILED DESCRIPTION OF THE ILLUSTRATED EMBODIMENTS

A method for providing access to data via a voice user interface is described in detail herein. In the following description, numerous specific details are provided, to provide a thorough understanding of embodiments of the invention. One skilled in the relevant art will recognize, however, that the invention can be practiced without one or more of the specific details, or with other methods, components, etc. In other instances, well-known structures or operations are not shown or described in detail to avoid obscuring aspects of various embodiments of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The present invention comprises a system and method that enables various users to access data stored in a database via a telephone link using voice commands, wherein the access includes support for user-generated ad hoc queries and allows users access to a variety of data that has been previously stored by the users or others in the database. In the following discussion, the principles and teachings of the invention are disclosed by way of example through a detailed description of an exemplary system that provides voice access to a customer relationship management (CRM) database. It is noted that this is not meant to be limiting, as the principles and teachings of the invention may be applied to provide access to databases that store a wide variety of different types of data in addition to CRM data.

Figure 1:
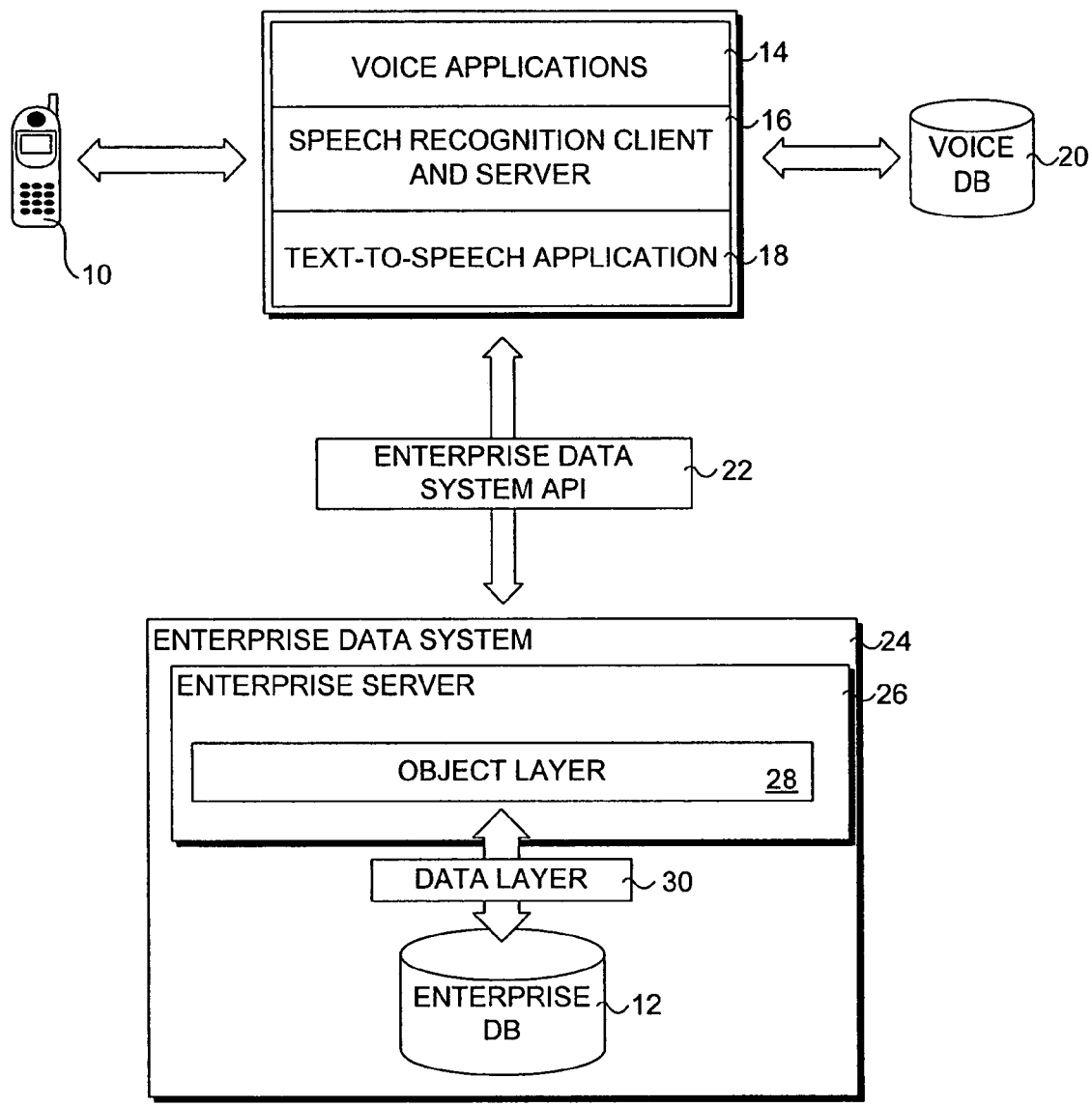
FIG. 1 is a block schematic diagram illustrating a high level view of an architecture corresponding to one embodiment of the invention in which a user is enabled to retrieve data from a database using voice commands.

A high-level architectural overview of one embodiment of the invention is shown in FIG. 1. The architecture enables a user of a phone 10 to access data stored in a enterprise database 12 from a remote location using verbal commands. This access capability is facilitated by voice user interface software including voice applications 14, speech recognition client and server 16, and a text-to-speech (TTS) application 18. The voice user interface enables users to navigate to and retrieve various information stored in enterprise database 12 via intuitive voice commands, wherein recognition of the voice commands is enabled, in part, by grammar definitions that are accessed by speech recognition client and server 16. The voice user interface software "converts" voice commands into navigation and data request commands that are returned to voice applications 14 in an application-readable (e.g., text) form, which processes the commands to navigate the user to a new location or retrieve requested data.

Depending on the domain pertaining to a user's data request, data may be retrieved from voice database 20 or retrieved from enterprise DB via an enterprise data system API (application program interface) 22 that enables the voice applications to access an enterprise data system 24. In one embodiment, enterprise data system 24 includes an enterprise server 26 that provides access to enterprise database 12 through an object layer 28 and a data layer 30.

Figure 2:
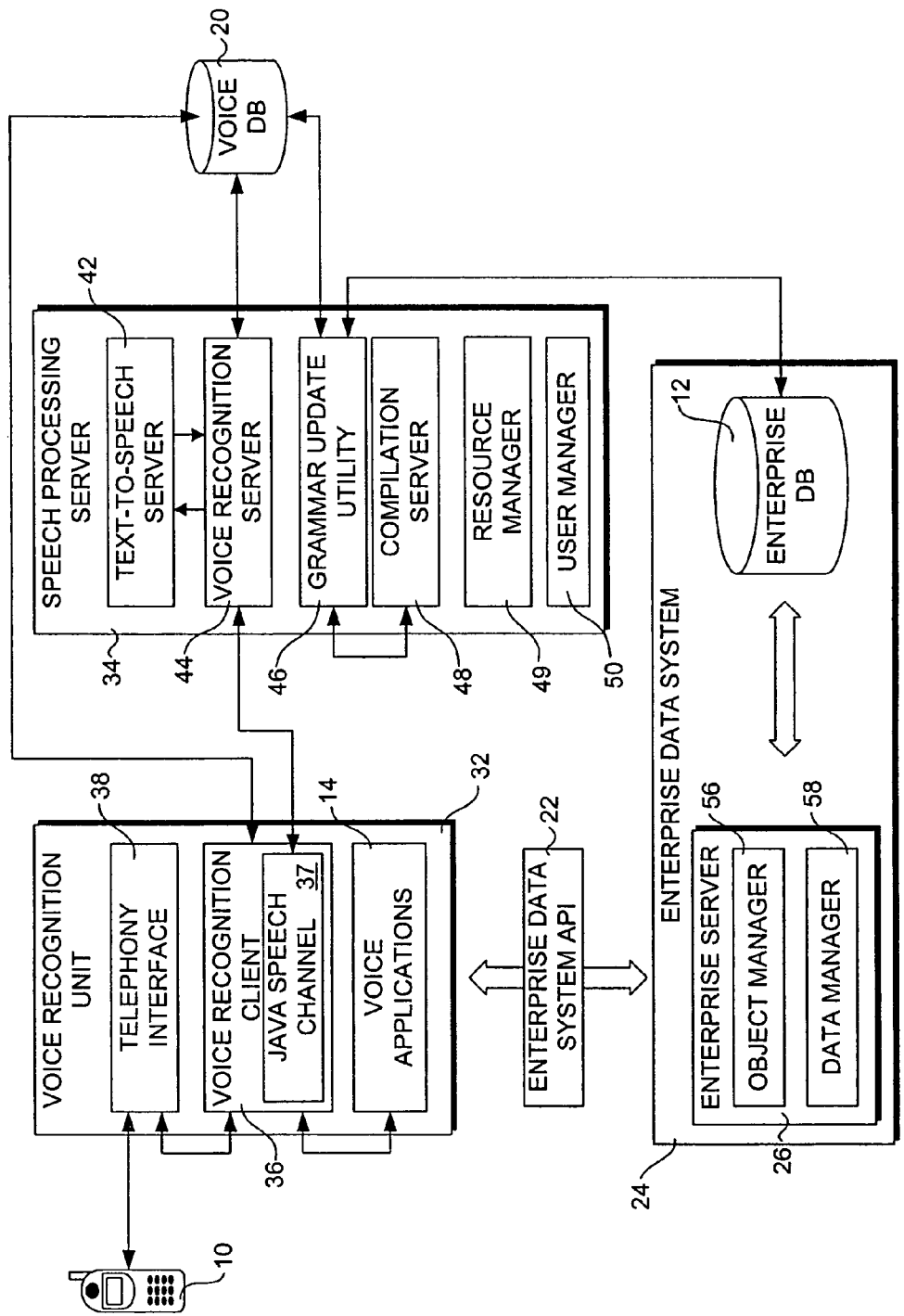
FIG. 2 is a block schematic diagram illustrating further details of the architecture of FIG. 1.

Further details of the architecture are illustrated in FIG. 2. In one embodiment, the architecture includes a voice recognition unit 32 and a speech process server 34. Voice recognition unit 32 includes voice applications 14, a voice recognition client (also referred to herein as the "Rec. Client") 36, which includes a java speech channel 37, and a telephony interface 38. Speech processing server 34 includes a text-to-speech (TTS) server 42, a voice recognition server (also referred to as the "Rec. ServerRec. Server") 44, a grammar update utility 46, a compilation server 48, a resource manager 49 and a user manager 50.

Voice recognition unit 32 is linked in communication with enterprise data system 24 via enterprise data system API 22. The enterprise data system includes an enterprise server 26 including an object manager 56 and a data manager 58, which respectively perform the functions corresponding to object layer 28 and data layer 30 in FIG. 1, and provide access to the CRM data and other data stored in enterprise database 12.

Figure 3:
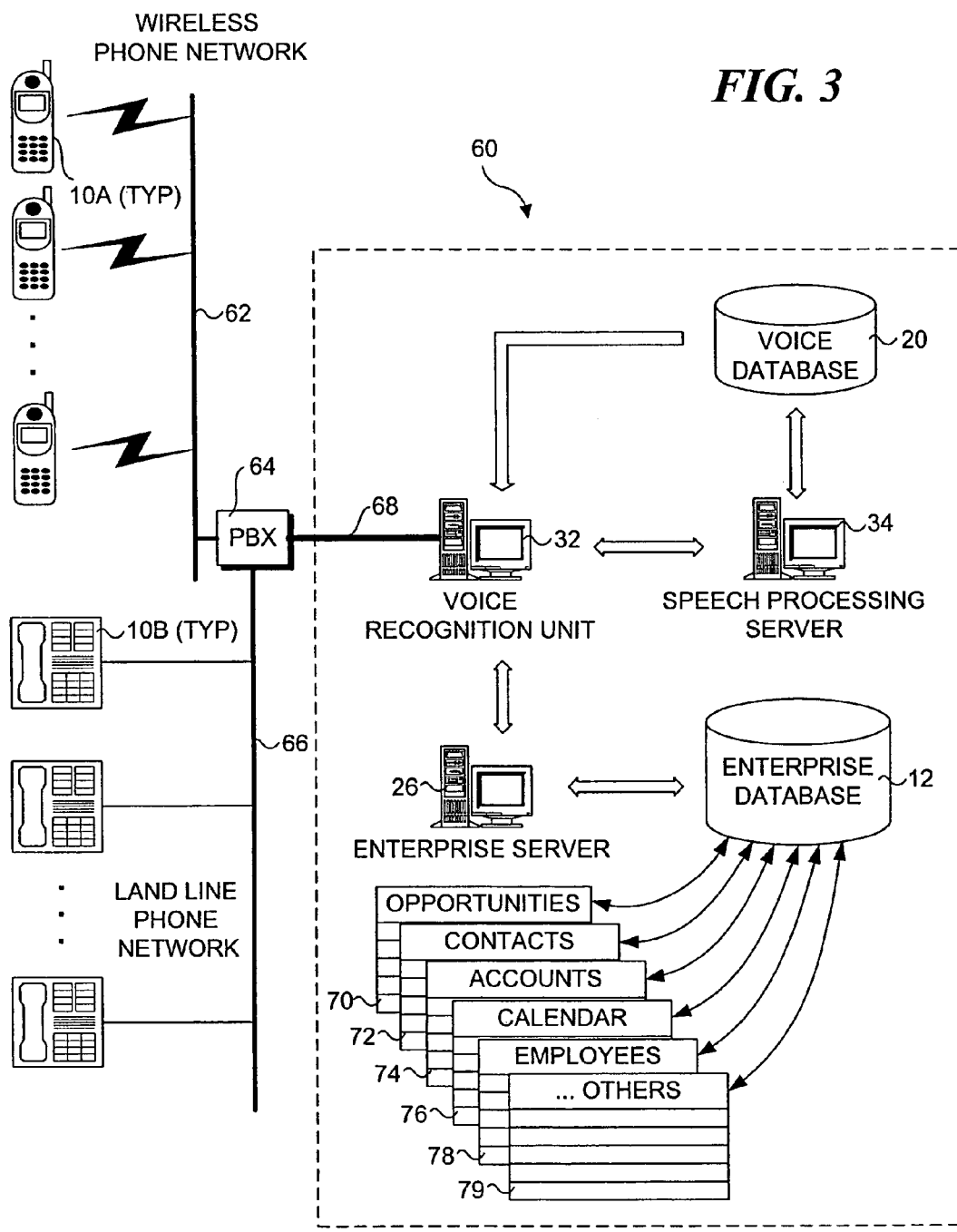
FIG. 3 is a block schematic diagram illustrating an exemplary hardware infrastructure for implementing the system architecture of FIGS. 2A-B.

An exemplary hardware infrastructure for implementing the architecture of FIG. 2 is shown in FIG. 3. The infrastructure enables voice communication device users such as various wireless phone users 10A and land-line phone users 10B to access data stored in enterprise database 12 via a voice access system 60. Wireless phone users 10A access the system via wireless service providers 62 and a phone bank exchange (PBX) 64. Similarly, land-line phone users 101B access the system via land-line phone network 66 and PBX 62. In the illustrated embodiment, a voice recognition unit 32 is interfaced with PBX 62, and serves as the access point to voice access system 60. Typically, voice recognition unit 32 will be connected with one or more PBX's via a T1 (or greater) connection 68. Voice recognition unit 32 is linked to a speech processing server 34 and an enterprise server 56. Enterprise server 56 provides access to enterprise database 12, which includes enterprise data such as opportunities data 70, contacts data 72, accounts data 74, calendar data 76, employee data 78, as well as other types of enterprise data, depicted by "... Other" data 79. The speech processing server provides speech processing and understanding, modifies the user's verbal request into data the voice applications utilize to retrieve the requested information from the enterprise database. This information is sent back via the VRU to speech processing server 34, which converts the data into a voice format via text-to-speech server 42. Further details of this process are discussed below.

Typically, enterprise database 12 will comprise a SQL (structured query language) relational database management system (RDBMS) database, such as one of the SQL RDBMS database products provided by Oracle (Oracle 8i, 9i), Microsoft (SQL Server 7), Sybase, IBM (DB2) and Informix. Optionally, the enterprise database may comprise a non-SQL-based server product, such as the Microsoft's Access database or Paradox. Similarly, voice database 20 may comprise a SQL or non-SQL database.

As depicted in FIG. 3, each of voice recognition unit 32, enterprise server 56, and speech processing server 34 are run on separate machines. As will be recognized by those skilled in the art, two or more of these servers may run on the same physical machine. In addition, the database client application that is used to access enterprise database 12 may run on a separate machine (not shown) or enterprise server 26, and the database client application that is used to access voice database 20 may run on a separate machine (not shown) or speech processing server 34. Furthermore, a multi-tier architecture may be used, wherein each tier may comprise multiple machines, such as multiple voice recognition units at one tier, multiple speech processing servers at another tier, etc.

Figure 4A:
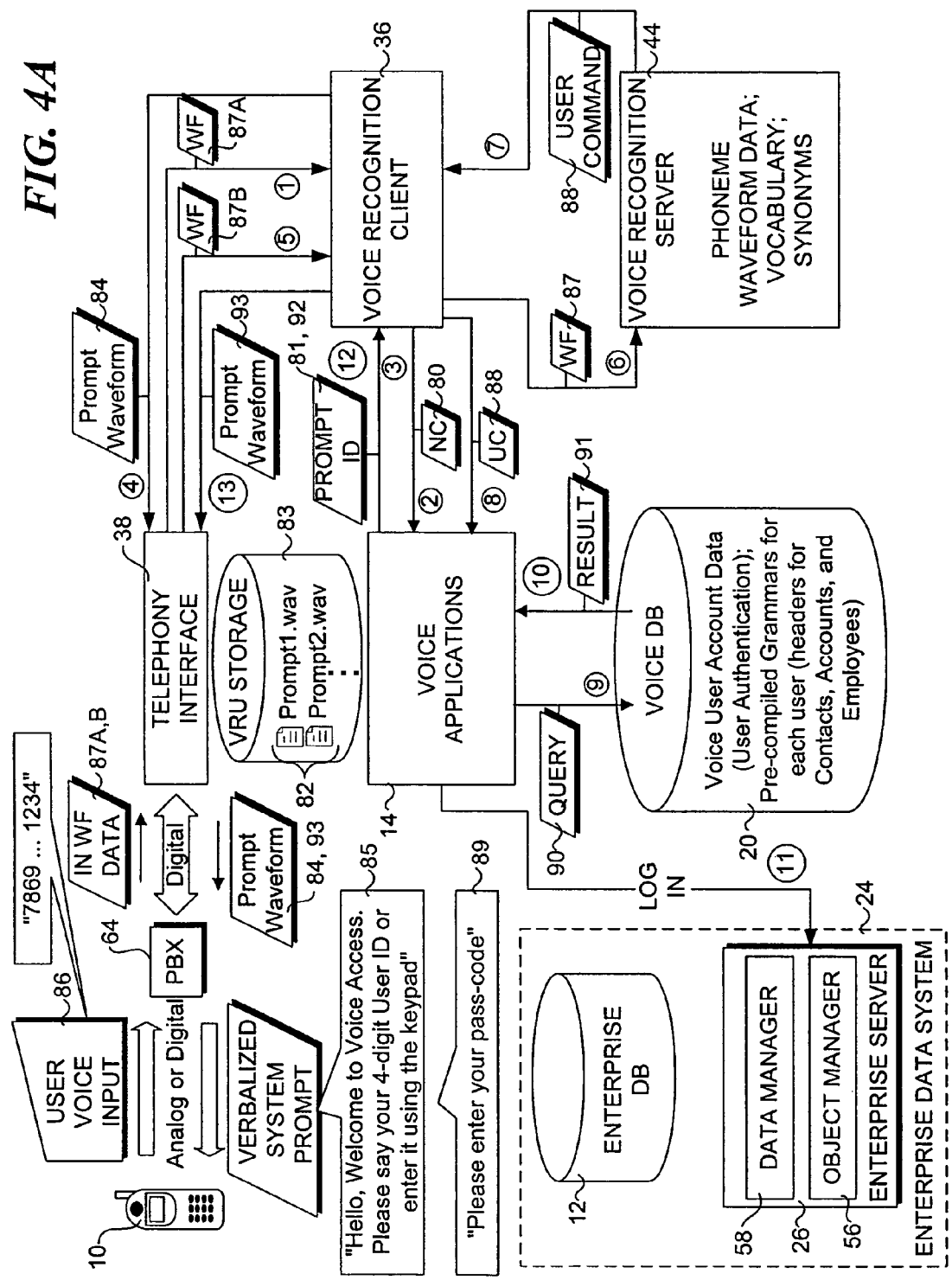
FIG. 4A is a block schematic diagram illustrating how data is passed between various system components when processing a user's navigation command.
Figure 4B:
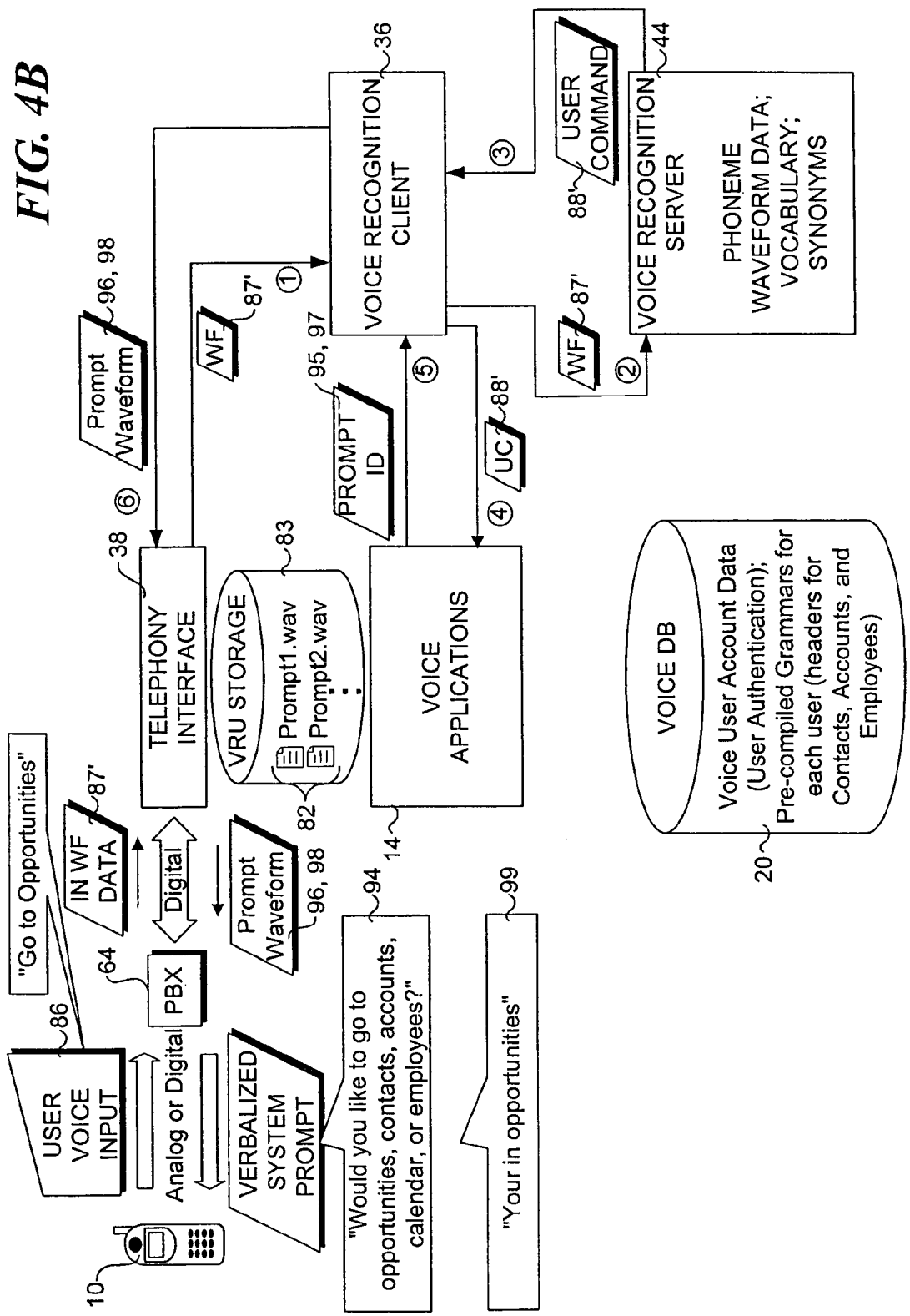
FIG. 4B is a block schematic diagram illustrating how data is passed between various system components when processing a user's request for data that is stored in a pre-compiled form in a voice database.

Various data paths encountered during a typical user session with a system having the architecture of FIGS. 2 and 3 are shown in FIGS. 4A, 4B, 4C and 4D. The data paths are indicated in these Figures with encircled numbers such that the flowchart operations corresponding to each data path can be easily identified. With reference to FIG. 4A and the flowchart of FIGS. 5A and 5B, a typical user session begins with a user log-in process that proceeds in the following manner.

The log in process begins in a block 100 with the user establishing a connection with the system via telephony interface 38. Telephony interface 38 provides telephony connection functions such as answering incoming calls, calling external numbers, and terminating calls, and provides digital waveform input/output functions once a calling connection is established. In one embodiment, telephony interface 38 includes one or more voice processing boards manufactured by Dialogic Corporation (now Intel), such as the Dialogic D240 PCI board, which provides 24 communication channels. In addition to the foregoing connection functions, telephony interface 38 also converts DTMF (dual tone multi-frequency) signals entered via a telephone keypad into digital information. For example, if a user presses the keypad number 5, a DTMF signal corresponding to number 5 will be generated by the phone. In response to receiving such a DTMF signal, telephony interface 38 coverts the signal into a digitized form that is used to indicate to the system that the user pressed number 5.

Information indicating a connection has been established is then passed to voice recognition client 36, which is waiting to respond to any new user connections. The Rec. Client sends data 80 indicating a new connection has been established to voice applications 14 in a block 101.

Upon receiving the new connection data, the voice applications pass information including a prompt identifier (ID) 81 to voice recognition client 36. The prompt identifier corresponds to a login system prompt waveform file in which a pre-recorded log in prompt is stored in a digital waveform format. In one embodiment, this and other system prompt waveform files comprise pre-compiled digitized waveforms corresponding to respective system prompts and stored as audio files (e.g., .wav files) 82 on a VRU storage device 83. Optionally, these system prompt waveform files may be stored on a storage device that is remote to VRU 32 and accessed over a network.

Upon receiving prompt ID 81, the Rec. Client retrieves the appropriate file from VRU storage 83 and streams the login prompt waveform file (depicted as prompt waveform data 84) to the user's telephone via telephony interface 38 over the existing telephone connection in a block 103. At some point in the telephone network or at user phone 10, the login prompt waveform file is converted into an analog signal, which is then amplified and provided to the user via phone 10's built-in speaker as an audible signal. For example, on land-line networks a digital-to-analog conversion may be performed at a digital concentrator near the location of a user's land-line phone, while the digital-to-analog conversion is performed at the phone itself when a digital cell phone is used.

When the user first accesses the voice access system, he or she is presented with a verbalized system log-in prompt 85 such as "Hello, Welcome to Voice Access. Please say your 4-digit User ID or enter it using the keypad." The user will then respond with an appropriate user ID and pass-code comprising user voice input 86 in a block 104. Depending on the particular phone technology used for phone 10, user voice input 86 may originally comprise an analog signal (for analog phones) or a digital stream (for digital phones). This analog signal or digital stream is sent via an applicable phone network (i.e., wireless network 62 or land-line network 66) to telephony interface 38 via PBX 64. User voice input 86 is received by telephony interface 38 as a digital waveform comprising input waveform data 87. Similar to that discussed above, at some point within phone 10 or the phone network (depending on the phone and phone network technology), an analog signal corresponding to user voice input 86 is converted into a digital waveform corresponding to input waveform data 87. The input waveform data is then passed to voice recognition client 36 in a block 105. Upon receiving input waveform data 87, the voice recognition client identifies the data as user input and passes it to voice recognition server to be interpreted through speech recognition in a block 106.

Although the specific details of speech recognition are beyond the scope of the present invention, an overview of an embodiment of the speech recognition process used in the voice access system is provided herein to clarify various operations performed by the invention that are facilitated, at least in part, by speech recognition. In one embodiment, the speech recognition operations used by the system are facilitated using speech recognition software (Nuance 7.0 speech server) provided by Nuance Corporation, Menlo Park, Calif.

In a given language, the verbalization of the language can be defined by a set of "phonemes," wherein each phoneme has certain sound characteristics and produces a corresponding waveform (phonemes form the basis of phonics). For instance, each syllable, word, or "utterance" spoken by a person comprises one or more phonemes that are chained together during pronunciation of the syllable, word or utterance. Examples of phonemes include sounds corresponding to individual consonants, such as the sounds made when pronouncing words that include an m ("mmmm" or s ("sssss"), vowel sounds (e.g., ay, ah, e, eh, etc.) and combined consonants (st, ck, pl, etc.). As each phoneme is annunciated, a corresponding acoustic (sound) "waveform" is produced. The acoustic waveform includes data that identifies the frequency of various portions of each particular sound and amplitudes at those frequencies. Although the shape and amplitude of the acoustic waveform corresponding to a given phoneme will differ somewhat, based on voice characteristic of the user, such as whether the user is a man or woman, child, adult, or elderly, whether the user has an accent, speed and inflection of the user's voice, etc, the various waveforms that are produced by annunciation of that phoneme by different speakers will have approximately the same characteristic shape. This forms a primary basis for enabling speech recognition, wherein individual phonemes that are used to form a given syllable, word, or utterance may be identified by matching mathematical representations (acoustic models) of corresponding phoneme waveforms.

As individual phonemes are identified, they are chained together to form syllables or single-syllable words. For multisyllable words, the syllables will then be chained together. When applicable, words are combined into phrases. Generally, the demarcation between syllables and words will depend on the acoustic waveform data corresponding to the user input, wherein blank or low-level background noise portions of the data will be regarded as breaks in speech. For example, when a person says the word "input," a speech recognition system will first determine that the word comprises phonemes corresponding to sounds made when pronouncing "ih," "nnnn", "ppp", "uhhh," and "tttt", which may be chained together to form the syllables "in" and "put." The corresponding acoustic waveform for "input" will include portions corresponding to each phoneme, with little or no blank data in between each phoneme. In contrast, if the user says "in put" with a delay between the words, the acoustic waveform data will include a blank portion corresponding to the delay. In addition to the foregoing speech recognition "rules," other rules are also used to translate digital sound waveform data into text.

Under consideration of the foregoing speech recognition method, voice recognition server 44 performs speech recognition by first breaking input waveform data 82 into individual phonemes by converting portions of the input waveform data into mathematical representations and comparing the mathematical representations with mathematical representations (e.g., models) of various waveforms that are stored locally to voice recognition server 44 to identify the closest match for each portion of input waveform data. The phonemes corresponding to the input waveform data are then combined into syllables, words, and/or phrases, as appropriate, based on additional speech recognition data accessible to voice recognition server 44 (e.g., vocabulary, dictionary, lexicons, etc.) and proprietary algorithms. This process is collectively represented by a block 106 in the flowchart.

After processing input waveform data 87, the user's input has been converted into an application readable form, such as ASCII text or a binary form. The next operation, as provided by a block 117, is to convert the application readable form of the user input into a valid user command or input. For example, the system may implement certain operations that are logically based on a "Yes" or "No" user response. Rather than only allow "Yes" or "No" responses, it is desired that a user be able to use synonymous inputs that correspond with yes and no, such as "yeah," and "OK" for yes, and "negative" for no. Determination of valid user commands is based, in part, on vocabulary and synonym data available to voice recognition server 44. Additionally, the determination is based on a present navigation context of the user, such that a limited set of possible commands and/or inputs are valid for each navigation context the user may have. In the case of the present log in process, the user input will be processed to determine if it corresponds to a user ID or pass-code (e.g., a number).

Figure 5A:
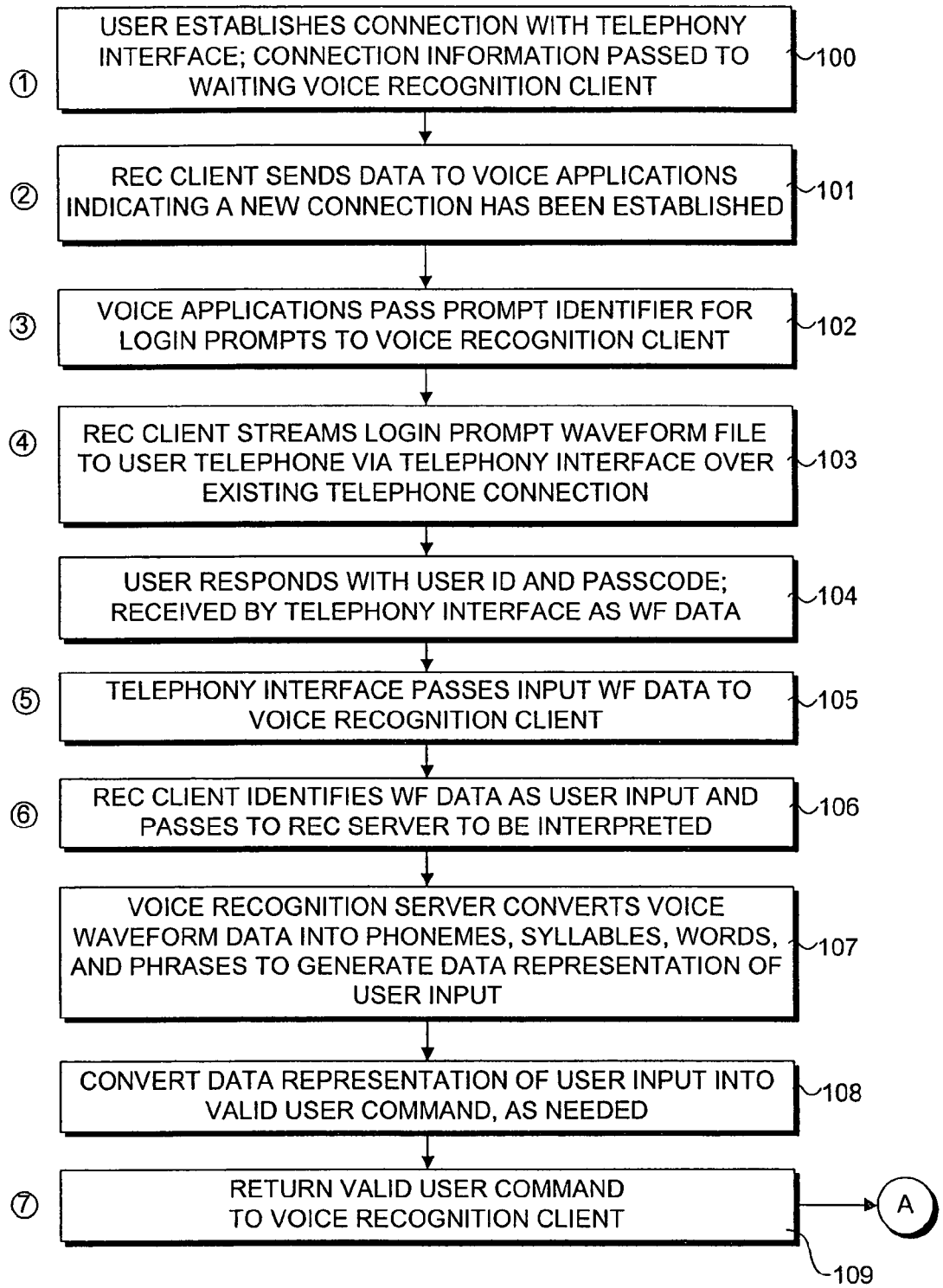
FIGS. 5A and 5B collectively comprise a flowchart illustrating the logic used by the invention when generally interacting with a user during a user session.
Figure 5B:
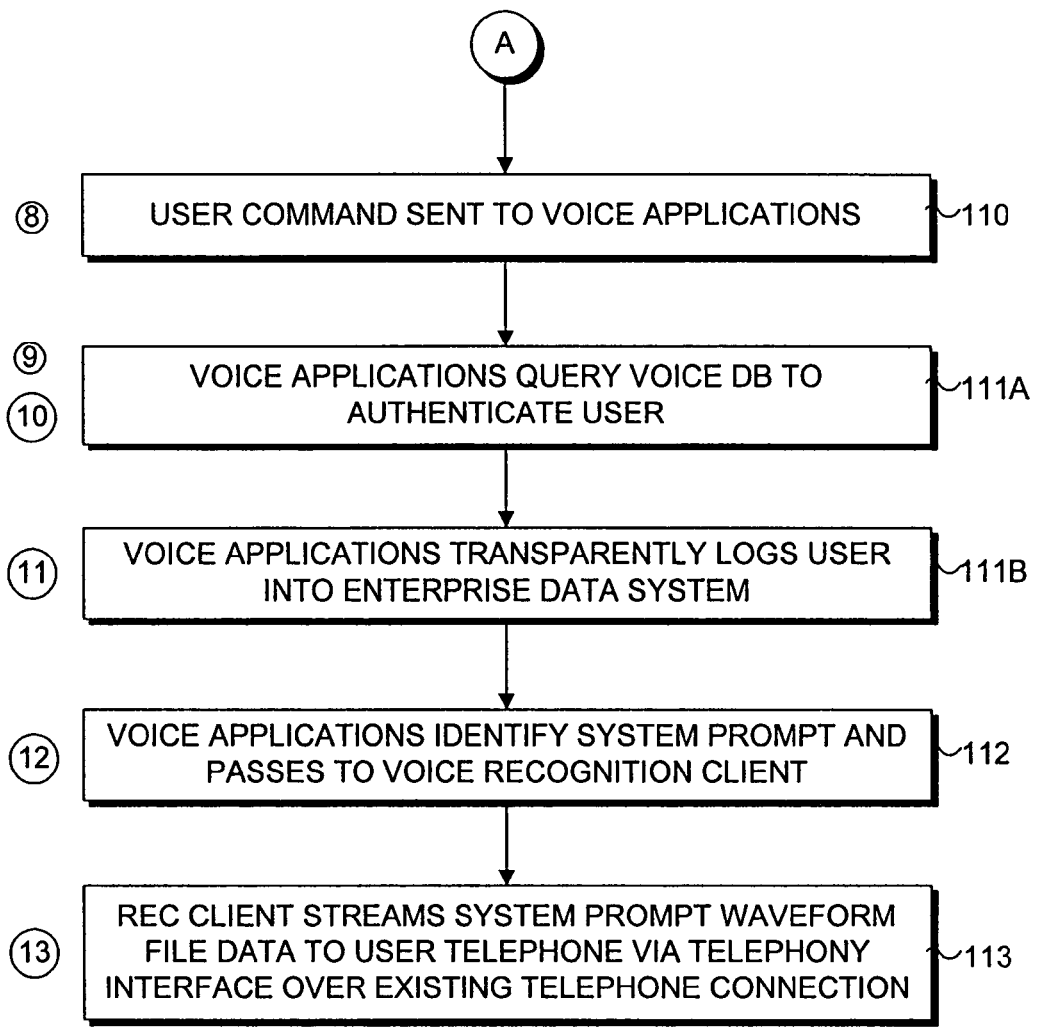

Once a valid user command has been determined, it is returned to voice recognition client 36 in a block 109 as a user command/input 88. With reference to FIG. 5B, user command/input 88 is then passed from voice recognition client 36 to voice applications 14 in a block 110.

During the login process, the user provides two pieces of information: a user ID and a pass-code. In operation, the system will first prompt the user for the user ID, as shown by verbalized system prompt 85. The user's response will be received by telephony interface 38 and processed in the manner discussed above with reference to blocks 105-110. If the user has provided a recognizable user ID (in the present example, recognizable in terms of it being a number), voice recognition client 36 will retrieve an appropriate prompt waveform file and stream the prompt waveform file data to the user via telephony interface 38 and the telephone connection, whereupon the user will hear, "Please enter your pass-code," as indicated by a verbalized system prompt 89. The user will then respond with his or her pass-code, as appropriate.

It will be assumed that the user has entered a user ID and pass-code that has the proper form. Prior to logging into the system, persons that may use the voice access system will have established a voice access account by providing a user ID and pass-code to a user manager system (not shown). Accordingly, new user connections will be authenticated by comparing the user ID and pass-code information provided by the user with corresponding information stored in voice database 20. This is accomplished in a block 111A by having voice applications 14 submit a query 90 to the voice database to see if there is a matching record that corresponds to the user ID and pass-code provided by the user.

In general, the user will desire to retrieve data that is stored in enterprise data system 24, although the user may also retrieve data stored in voice database 20, as explained in further detail below. In order to retrieve the data from the enterprise data system, the user (or in this case a proxy, voice applications 14, acting on behalf of the user) must have access to the enterprise data system. In one embodiment, the enterprise data system 24 comprises an enterprise data system that may be accessed by various clients via respective client connections. For example, in one embodiment enterprise data system comprises a Siebel™ data system that includes a Siebel™ enterprise server (e.g., enterprise server 26) produced by Siebel Systems, Inc., San Mateo, Calif. In environments in which the enterprise data system hosts various client connections, voice applications 14 will establish its own client connection with the enterprise data system, acting as a transparent proxy for the user. For example, in one embodiment voice applications 14 establishes a client connection with enterprise data system 24 for each user by logging into the enterprise data system in a block 111B with an enterprise user ID and password retrieved from voice database 20 during the user authentication performed in block 111A, wherein the enterprise data system user ID and password are part of the data contained in a query result 91 that is returned to voice applications 14.

Depending on the data contained in result 91, the voice applications will select an appropriate prompt and pass a prompt ID 92 to voice recognition client 36 in a block 112. The Rec. Client will then retrieve the audio waveform file corresponding to the prompt ID and stream waveform data 93 to the user via the telephony interface and telephone connection in a block 113. If the user has supplied appropriate log in data, the user is authenticated and is provided with an appropriate system prompt asking the user what domain the user would like to navigate to. If the user cannot be authenticated, a system prompt indicating such will be provided to the user.

Once a user has logged into the voice access system, the user is enabled to navigate various domains to retrieve various data that are context sensitive to a current navigation context of the user. This navigation context is also referred to as a current system state. Once in a domain, the user may request to retrieve various data that are stored in enterprise data system 24 and/or voice database 20.

Figure 6:
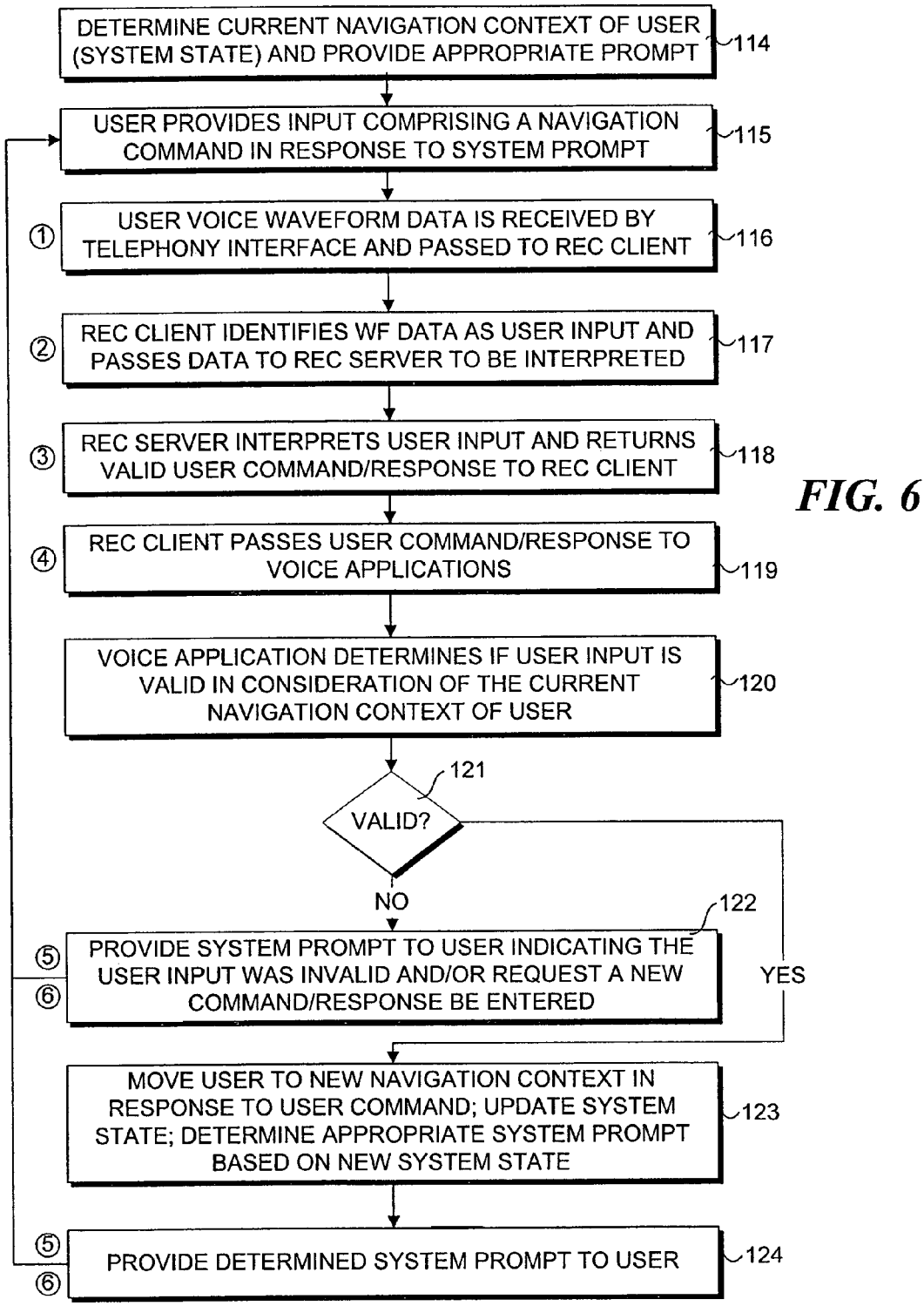
FIG. 6 is a flowchart illustrating the logic used by the invention when processing a user's navigation command.

In continuation of the present example, suppose the user desires to retrieve data pertaining to business opportunities the user and/or his business enterprise may have. As explained in further detail below, in one embodiment the user will be provided with information pertaining to new opportunities upon logging into the voice access system. Optionally, the user can request to navigate to an opportunities domain in response to a system prompt that asks the user where the user wants to go. With reference to FIGS. 4A and 6, a typical user navigation process proceeds as follows.

First, in a block 114, voice applications 14 determine the current navigation context of the user, (i.e., the current user system state), and the system provides an appropriate verbalized system prompt to the user, asking the user what the user wants to do. In general, the system state for each user is monitored throughout each user session, and is used to determine what valid options are available to the users as the users navigate through various navigation contexts. Prompt waveform files 82 include various system prompts corresponding to the various navigation contexts a user may have. Accordingly, based on the user's current navigation context, the system will retrieve the prompt ID for the appropriate prompt waveform file, pass it to the Rec. Client, which will then stream the prompt waveform data to the user via telephony interface and the existing telephone connection.

For example, if the user has used the system before and doesn't have any new opportunities, the user will be greeted with a verbalized system prompt 94 of, "Would you like to go to opportunities, contacts, accounts, calendar, or employees?" In response, the user will provide a user voice input 86' in a block 115 comprising a spoken response, such as a navigation command. In general, the user input will either comprise a command, such as "Look up X," or a response to a system prompt, such as "Yes," or a value in a selection list presented to the user. This user input is converted into input waveform data 87', which is received by telephony interface 38 and passed to voice recognition client 36 in a block 116. The Rec. Client identifies input waveform data 87' as user input and passes the data to voice recognition server 44 to be interpreted, as provided by a block 117.

In a manner similar to that described above, the Rec. ServerRec. Server interprets the user input and returns a valid user command/response to the Rec. Client in a block 118, whereupon the Rec. Client passed the user command/input to voice applications 14 in a block 119. Next, in a block 120, the voice applications determine if the user command or response is a valid in consideration of the current navigation context of the user. In response to verbalized system prompt 94, the user may select to navigate to one of various domains by saying the name of one of the domains presented in the list. A decision block 121 is used to indicate whether the user input is valid. If the user provides an input that is not valid for the current user navigation context, such as requesting to call a contact from the current navigation context of this example, the answer to decision block 121 is No (FALSE), and the logic proceeds to a block 122 in which the system provides a verbalized prompt to the user indicating the user input was invalid and/or requesting a new command be entered. As described above, this comprises voice applications 14 determining an appropriate prompt ID (e.g., a prompt ID 95) and passing it to the Rec. Client, which retrieves the corresponding waveform file and streams the waveform data (e.g., as prompt waveform 96) to the user's telephone via telephony interface 38 and the existing telephone connection. At this point, the logic loops back to block 115 to process the next user voice input.

If the user has provided a valid input (in this case, a valid navigation command, such as "opportunities"), the answer to decision block 121 is Yes (TRUE), and the logic proceeds to a block 123. In this block, the user is (logically) moved to a new navigation context corresponding to the users command/response, whereupon the user system state is updated to reflect the user's new navigation context. Voice applications 14 will then determine an appropriate system prompt for the new navigation context in a block 124, and the system will provide the system prompt to the user in the manner described above, as indicated by a prompt ID 97, a prompt waveform 98, and a verbalized system prompt 99. The logic will then loop back up to block 115 to process the next user input.

Once the user has navigated to an appropriate navigation context, the user may request to retrieve data corresponding to that navigation context. For example, once in the opportunities domain, the user may request to retrieve data pertaining to the user's opportunities. In addition, the user may also request to make a call to a contact or an employee who is a member of the same enterprise as the user.

In general, retrieval of data involves processing a user input comprising a spoken natural language query to determine what data the user wants, retrieving (or at least attempting to retrieve) the data from an appropriate data source, generating a system data response comprising a combination of system prompts and retrieved data in which various data are embedded in "slots" defined in a prompt/data string corresponding to a predefined grammar syntax language prescribing a grammatical form in which system data responses are presented to users. The data portion of the prompt/data string is then converted into digitized speech (TTS) waveform data by TTS server 42 using a text-to-speech conversion process. Waveform data corresponding to prompts and the TTS data are then streamed to the user, in order, based on the grammar syntax language, over the telephone connection such that the user hears a verbalized system response comprising system prompts and embedded TTS data. Optionally, a data embedded text string can be submitted to TTS server 42, with the resulting TTS data directly streamed to the user. In some instances, data will be retrieved from enterprise data system 24. In other instances, data may be retrieved from voice database 20. In still other instances, "header" data will be retrieved from voice database 20, while "detail" data pertaining to the header data will be retrieved from enterprise data system 24.

Figure 4C:
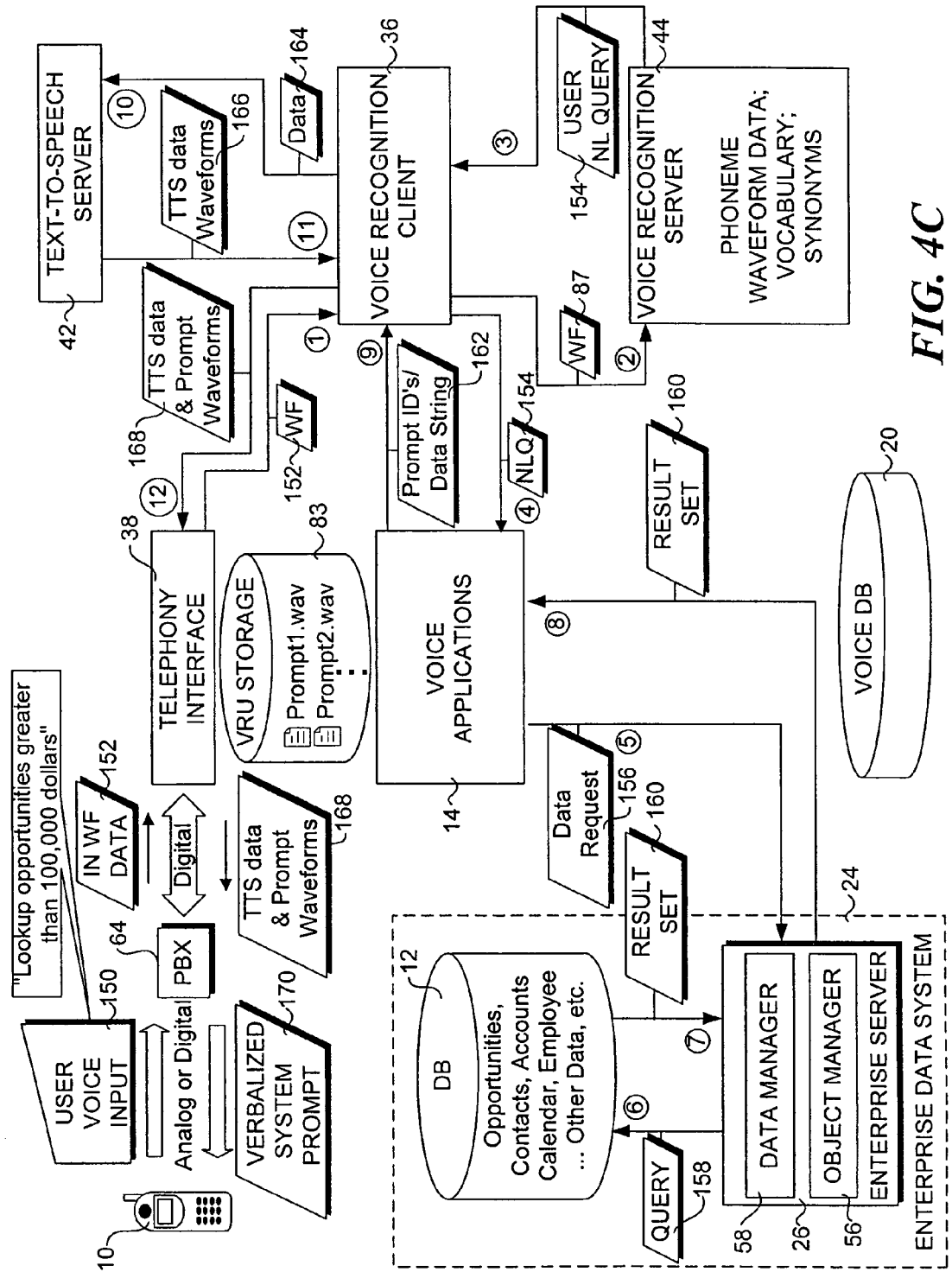
FIG. 4C is a block schematic diagram illustrating how data is passed between various system components when processing a user's request for data that is stored in an enterprise database.
Figure 7:
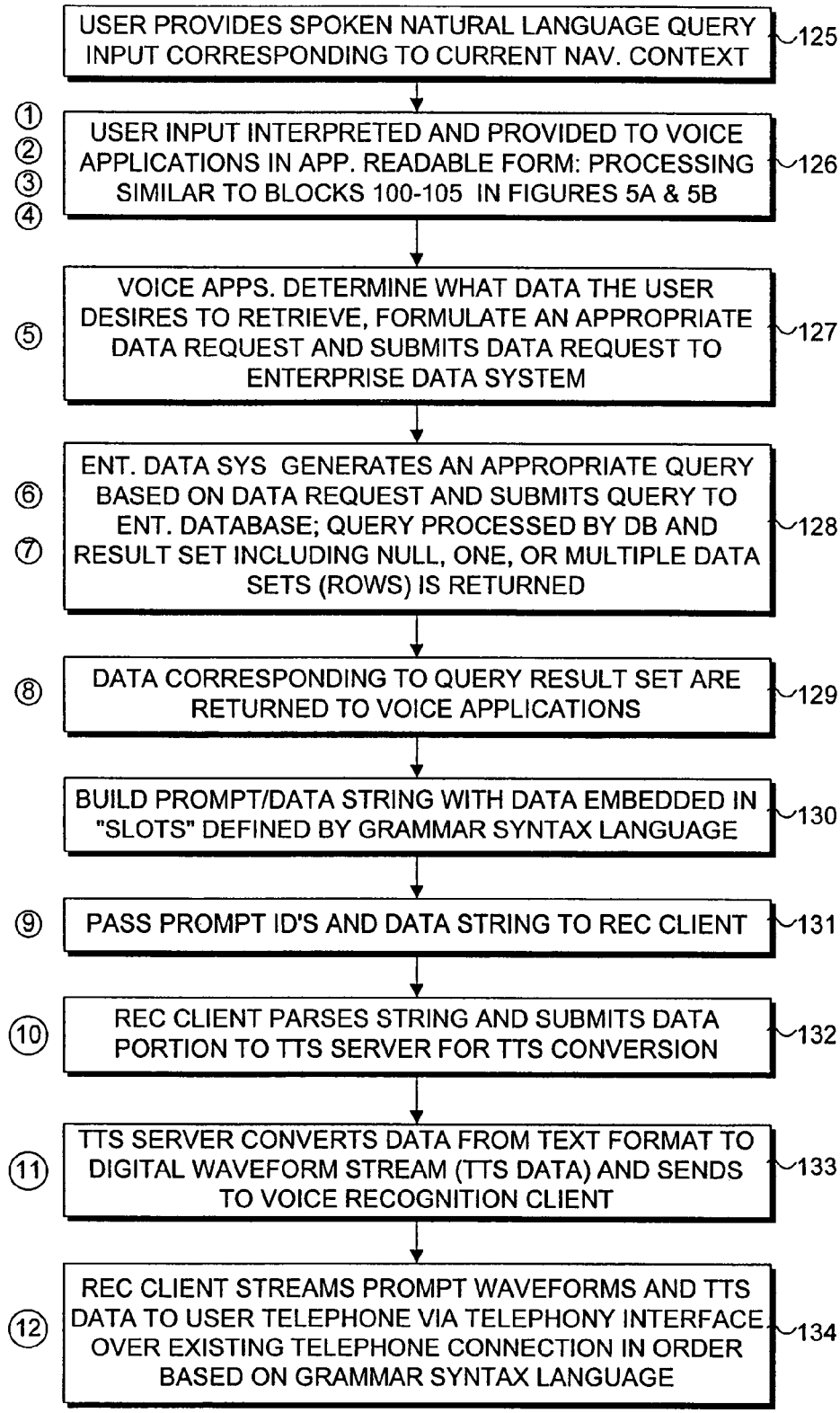
FIG. 7 is a flowchart illustrating the logic used by the invention when retrieving data from an enterprise database.

An example in which data are retrieved from enterprise data system 24 is now described with reference to FIG. 4C and FIG. 7. The process begins in a block 125 in which a user provides a spoken natural query language input to the system. For example, the user may provide a user voice input 150 of "Look up my opportunities greater than 100,000 dollars."

This input is received by telephony interface 38 as user input waveform data 152 and passed to voice recognition server 44, which processes the input and provides a valid user query 154 in application readable form to voice applications 14. These operations to perform these tasks are provided by a block 126, and a similar to the operations described above for processing user input in blocks 105-110 of FIGS. 5A and 5B.

The application-readable form of the spoken natural language query is then processed by voice applications 14 in a block 127 to determine what data the user desires to retrieve by parsing the request in view of the current navigation context of the user. As before, if the request is inconsistent (i.e., invalid) for the current user navigation context, the voice applications will cause a system prompt to be provided to the user indicating so.

The next operation is to retrieve data from the enterprise data system based on the natural language query and user navigation context. In the foregoing Siebel data system architecture, data in an enterprise database is accessed by requesting retrieval of data pertaining to one or more objects stored in the enterprise data system. As shown in the Figures herein, in one embodiment enterprise data 24 includes an enterprise server that uses an object manager 56 and a data manager 58 to retrieve data from enterprise database 12. In addition to other functions provided by these components, object manager 56 and data manager 58 provide a layer of abstraction between an enterprise data system client, such as voice applications 14, and data in enterprise database 12. This layer of abstraction enables the schema used for enterprise database 12 to be reconfigured while maintaining a consistent application interface to clients. Rather than accessing data through a direct query of enterprise database 12, a client requests data to be retrieved by passing information that identifies data corresponding to one or more object(s) be retrieved from enterprise database 12. Upon receiving a data retrieval request, object manager 58 determines where data corresponding to the object(s) are stored in enterprise database 12, and interacts with data manager 58 to retrieve the corresponding data by formulating an appropriate database query.

In accordance with the foregoing scheme, voice applications 14 determine (a) corresponding object(s) corresponding to data the user desires to retrieve from enterprise data system 24 and submits an appropriate data request 156 to the enterprise data system. The data request is received by object manager 56 in a block 128, which interacts with data manager 58 to generate an appropriate query 158 that is submitted to enterprise database 12. In response to the query, enterprise database 12 returns result set 160 to the data manager. The data manager then sends result set 160 to voice applications 14 via the API.

Generally, result set 160 will comprise header data or detail data. In the case of header data, the result set will typically comprise one or multiple data sets (i.e., rows), while the result set will typically comprise a single data set (row) for detailed data. In one embodiment, when data corresponding to only a single object is returned (e.g., a single contact, employee, etc.), the result set data will include both header and detail data for that object.

As provided by a block 130, upon receiving result set 160, voice applications 14 will parse the data to break it up into individual data components and embed the data components in "slots" defined in a prompt/data string based on a predefined grammar syntax language for the string, wherein the original (i.e., non-filled) form of the prompt/data string is selected based on the current user navigation context and data in result set 160.

In a manner similar to that described above pertaining to system prompts, voice applications 14 then passes the prompt/data string as a prompt ID's/data string 162 to voice recognition client 36 in a block 131. In general, prompt ID's/data string 162 identifies system prompts with embedded data corresponding to the voice access system's response to the user's natural language query. Accordingly, a typical prompt/data string corresponding to prompt ID's/data string 162 will provide a narrative description of the results to the query in addition to specific data values embedded in the string. Under appropriate navigation contexts, the string will further include a system prompt that enables the user to "browse" detail data corresponding to the result set. For example, if the user has five business opportunities greater than $100,000, the text string will include information identifying such, along with various details that are specific to each business opportunity, along with a prompt that enables the user to "drill-down" into further details of one or more of the opportunities.

Upon receiving prompt ID's/data string 162, voice recognition client 36 parses out the data portion of the string and submits it as data 164 to TTS server 42 to convert the data from a text format into digitized waveform data corresponding to a verbal form of data. TTS server converts the data into a data stream comprising a continuous digital waveform corresponding to a verbalized form of the data (depicted as TTS waveform data 166), and sends the digital waveform data stream back to voice recognition client 36 in a block 133. In one embodiment, TTS server comprises software provided by Fonix Corporation, Salt Lake City, Utah. The voice recognition client then retrieves appropriate prompt waveform files correspond to the prompt ID's and streams prompt waveform file data and TTS waveform data 166 to phone 10 in a block 134 via telephony interface 38 and the existing telephone connection in order, based on the grammar syntax language specification for the prompt/data string. This is depicted as TTS data and prompt waveforms 168, which are converted into an audible signal at phone 10 such that a verbalized system response 170 is heard by the user. It is noted that if null data is returned from query 158 (i.e., the is no data in enterprise database 12 meeting the query criteria), an appropriate system prompt is provided to the user indicating such, and the operations performed in blocks 131-134 are skipped.

In the previous embodiment, a combination of prompts waveform data and TTS waveform data are streamed to the user's phone, whereupon it is converted into a verbalized system response. Alternatively, text strings comprising prompt text embedded with slots in which data are inserted are used, wherein the text strings are defined by a grammar syntax language. In this embodiment, the entire text string is submitted to TTS server 42 to be converted into TTS waveform data, rather than just the data portions, and the resulting TTS waveform data is directly streamed to the user's phone as a continuous stream. Accordingly, the entire verbalized system response comprises computer-generated (i.e., TTS) speech.

In addition to providing access to data via enterprise data system 24, the voice access system enables users to access various data stored in a "pre-compiled" form in voice database 20, enabling users to quickly access this data without having to retrieve it from the enterprise data system. As discussed below in further detail, this pre-compiled data comprises data that is retrieved from enterprise data system 24 on a periodic basis and compiled into appropriate grammars through use of grammar update utility 46 and compilation server 48.

Figure 4D:
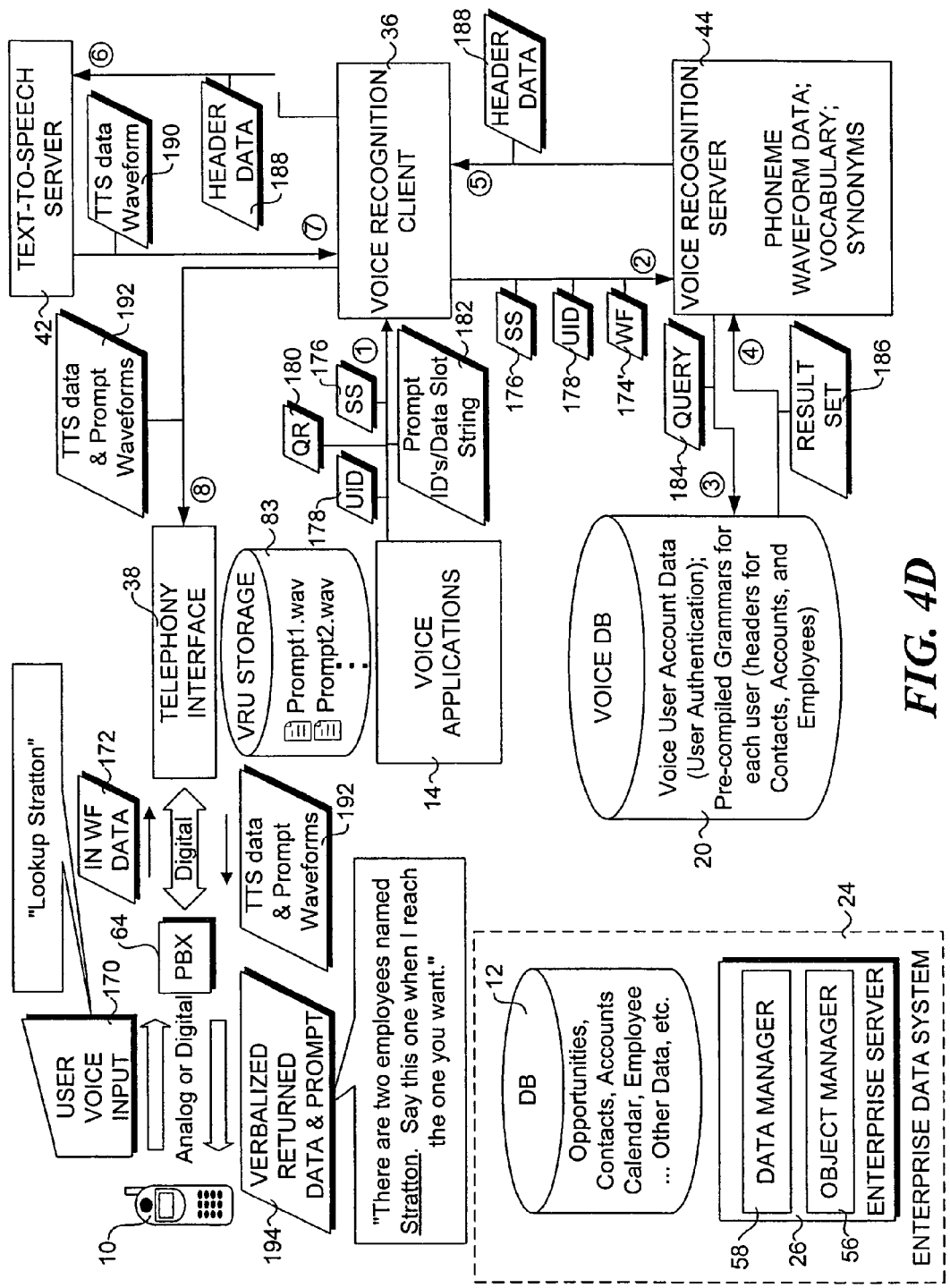
FIG. 4D is a block schematic diagram illustrating how data is passed between various system components when processing a user's request for data that is stored in a pre-compiled form in a voice database.
Figure 8:
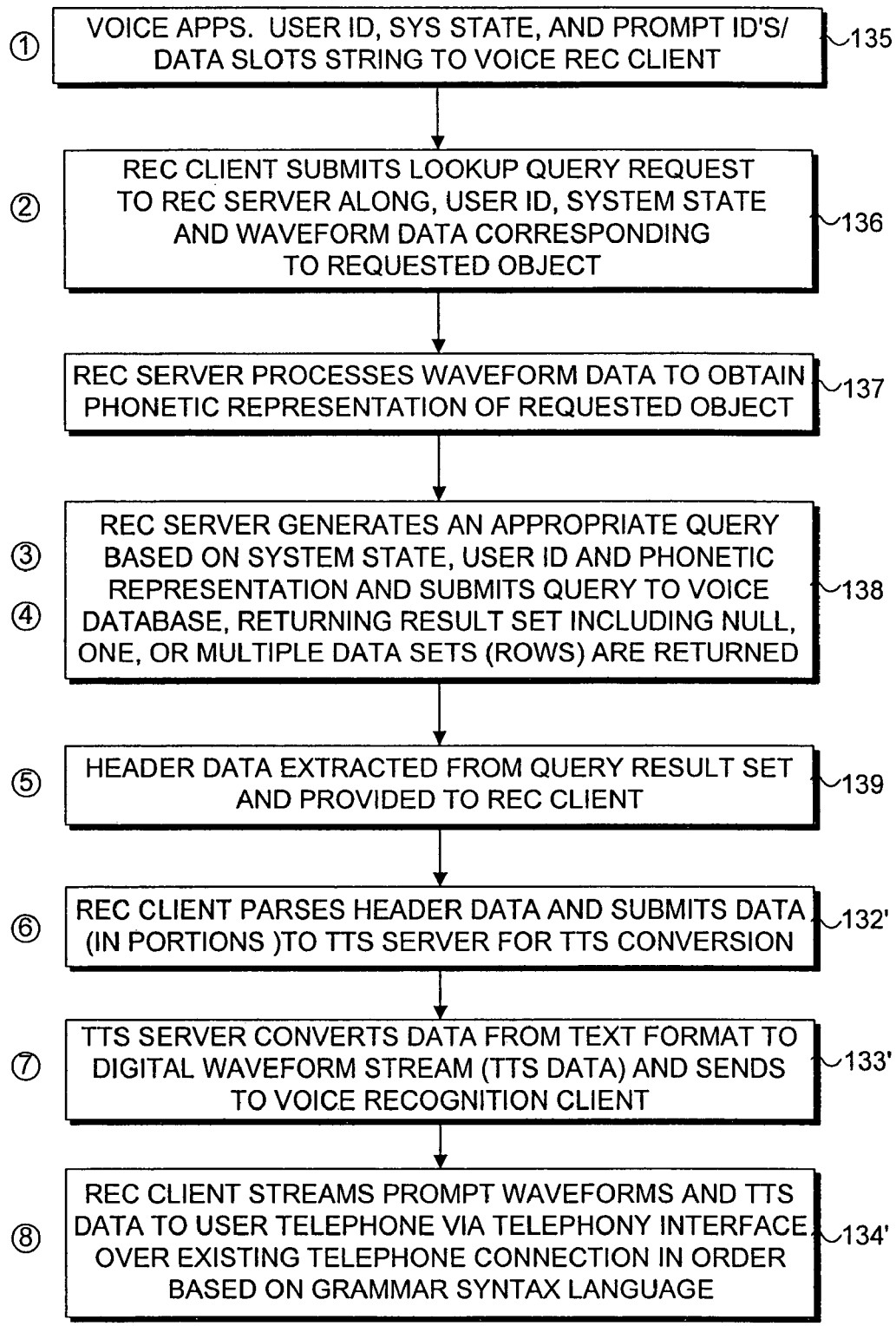
FIG. 8 is a flowchart illustrating the logic used by the invention when retrieving pre-compiled data from the voice database.

With reference to FIG. 4D and the logic flowchart of FIG. 8, an exemplary user access to pre-compiled data stored in voice database 20 proceeds as follows. In the following example, it will be assumed that the user has already navigated to an employees domain from which the user can request to retrieve data corresponding to employees that work for the same enterprise as the user. Furthermore, the user has provided a user voice input 172 of "Lookup Stratton," thereby requesting the voice access system to lookup information corresponding to an employee named "Stratton." User input waveform data 174 corresponding to user voice input 172 is received by telephony interface 38 and processed by the system in a manner similar to processing a navigation command above, whereby voice applications 14 retrieves data from voice recognition client 36 that the user desires to lookup a user. The user's navigation context (system state) is also updated.

The process continues in a block 135 in which system state information 176 and a user ID 178 corresponding to the user and a current navigation context of the user are passed to voice recognition client 36, along with a query request 180. In addition, a prompt ID's/data slot string 182 corresponding to the current navigation context of the user is also passed to voice recognition client 36. The query request is used to inform the Rec. Client to request that the Rec. Server perform a query against voice database 20 to retrieve any objects that meet the search criteria of the query. Prompt ID's/data slot string 182 provides the grammar syntax language in which any retrieved data are to be presented to the user. The search criteria is derived from system state 176, user ID 178, and a phonetic representation of the portion of user input waveform data 174 pertaining to the object that user desires to search for, as depicted by waveform data 174'. For example, in the case of user voice input 170, the portion that pertains to the object the user desires to search for is "Stratton." The "Lookup" portion of the input tells the system what the user wants to do, i.e., lookup information corresponding to an employee named "Stratton." All of these data are passed from the Rec. Client to the Rec. Server in a block 136.

In a block 137, the Rec. Server processes the waveform data to obtain a phonetic representation of the object the user requested. For example, waveform data corresponding to "Stratton" would be converted into a phonetic representation of "Stratton." As discussed above, in one embodiment, the portion of the waveform data that contains pertains to the object will be already identified (in this case "Stratton"). Alternately, the Rec. Server may be programmed with logic to understand that when the system state corresponds to a certain state, such as a "lookup" request, the "lookup" portion of the waveform data is to be disregarded.

Next, in a block 138, the Rec. Server generates a query 184 that includes a search criteria based on system state 176, user ID 178, and the phonetic representation of the object the user requested corresponding to waveform data 174'. For example, under the present example the system state information informs the Rec. Server that the user is in the employees domain, and the user ID identifies the user. Accordingly, a query is generated to look for employees corresponding to the user having a phonetic representation of the name corresponding to the data in waveform data 174'.

As explained in further detail below, various data are stored in voice database 20 in a pre-compiled form. In one embodiment, data are stored in tables as blobs (binary large objects) in one or more blob columns. The blob data is formatted in a manner that improves query performance when compared with text-based columns. In one embodiment, data pertaining to user ID's, object type (e.g., contact, employee, etc., and phonetic data are stored in the same blob column. Furthermore, in one embodiment, individual sets of pre-compiled data are stored for each user. Accordingly, by specifying the user ID and object type in the query, the number of records required to be searched by voice database 20 to process the query is greatly reduced.

In one embodiment, the query will identify potential matches by comparing a phonetic representation of the search object against phonetic representation of corresponding objects stored in voice database 20. Furthermore, the voice access system is designed to enable name data (e.g., employee names, contact names, etc.) to be retrieved based on various reference information provided by the user, such as reference to a last name, first name and last name, etc. Accordingly, name data are stored in a manner that enables corresponding queries to retrieve appropriate matches in a manner that supports these various name references.

In response to execution of query 184 against voice database 20, null, one or multiple data sets (i.e., rows) will be returned to voice recognition server 44 as a result set 186. In one embodiment, the result set data returned from the query will comprise "header" data 188, or data from which header data can be extracted, as provided by a block 139. Header data generally provides identification information that enables the user to quickly ascertain what or who a given set of data corresponds. After "browsing" header data, a user can request to retrieve detail data, which typically comprises further details corresponding to the header data, such as address information, detailed contact information, detailed account information, etc.

Header data 188 are then passed back to voice recognition client 36 in a block 128, which parses the data and submits logically grouped portions of the data to TTS server 42 for TTS conversion in a block 132'. The TTS server converts the data it receives in TTS waveform data 190. Upon receiving data TTS waveform data 190, voice recognition client 36 retrieves appropriate prompt waveform files specified in prompt ID's/data slot string 182, and streams prompt waveform data and TTS waveform data 192 to phone 10 based on the order defined in prompt ID's/data slot string 182, wherein the data slots are filled with TTS data. This results in verbalized returned data and prompt 194. As depicted in FIG. 4D, the user hears "There are two employees named Stratton. Say "this one" when I reach the one you want," wherein the underlined word pertain to data slots embedded with TTS data, and the other text corresponds to system prompts. At this point the system will read the full name of the two employees with "Stratton" in their names with a small delay in between to enable the user to verbally select the employee the user desires to obtain data about.

In many instances, it will be desired to retrieve detail information corresponding to one or more of the sets of header data returned in an initial query in response to a user's data request. In one embodiment, header data is stored in a pre-compiled form in voice database 20, while detailed data is stored in enterprise database 12. In this case, detailed data is retrieved in the manner discussed above with reference to FIGS. 4C and 7.

Furthermore, in addition to the object manager/data manager database access scheme described above, voice applications 14 may also access data from a database by directly querying the database using the underlying query language for the database. For example, upon receiving a user's data request command, voice applications 14 can formulate a query, such as a SQL query for SQL-based databases, which may be used to retrieve the data directly from the database.

Further details of how data objects are selected for retrieval based on user inputs are discussed below.

Voice User Interface (VUI)

The voice access system enables users to access data and navigate through various system domains using voice commands. This is facilitated through the system's voice user interface (VUI), which translates user speech input into internal system commands, enabling users to use the system through intuitive voice commands using automated speech recognition.

As used herein, the speech input provided by a user is termed an "utterance." An utterance is a distinct piece of user speech that is typically collected in response to a system prompt and is recognized using a specific recognition context. As explained in further detail below, the recognition context corresponds to a present user navigation context or system state of the user, wherein there is a limited set of utterances (i.e., voice commands) the system will accept for that specific user navigation context.

A fundamental aspect of the VUI concerns the grammar used by the system. A grammar is a specification of all allowed user utterances (syntax) in an application, such as those used by voice applications 14. A grammar also contains the meanings of each key word or phrase (semantics) corresponding to the user utterances.

Syntax is the representation of all allowed user utterances that will be accepted by the voice recognizer in an application, as illustrated in the following example:

([ok yes yeah sure (you bet)])

Semantics is the specification of the meaning of key words or phrases. The following code tags utterances with the meaning yes:

([ok yes yeah sure (you bet)])
{<yesno yes>}

A system's dialog design is ultimately governed by carefully worded prompts and users' responses to them. Prompts can be played back to the user either as prerecorded prompts or as synthesized speech (i.e., TTS). Users' responses must be included in a recognition grammar, which is the collection of all possible utterances at a given point in the system's call flow. Otherwise, these utterances will be rejected as being out of grammar. Prompts should be designed carefully and concurrently with the grammar.

The grammar consists of the responses that are expected of the user from a given navigation context. In addition to each anticipated response, the grammar must also include a natural-language interpretation. For example, in a travel application, "Los Angeles" and "L.A." are two possible city names that refer to the same place, so they receive the same interpretation (for example, {<city los_angeles>}). Likewise, the responses "yes," "yeah," and "yes, it is" are synonymous responses to the question "Is that correct?," so all three should be associated with the same interpretation (for example, {<confirm YES>}). Further details on how to specify and build grammars are available at the Nuance Developers Network at https://www.nuance.com.

Dynamic grammars are grammars that can be dynamically created and modified by a running application. They are an important component of the system architecture. Dynamic grammars allow an additional class of speech recognition application in which the complete set of items to be recognized cannot be determined until run time. This can include, for example: Applications that create and update grammars based on a variable set of items in a database or from other dynamic data known only at run time; and applications that are customized for individual users, such as a dialing application with a personal address list for each user. Dynamic compilation is performed by compilation server 48.

Pre-Compilation of Data Using the GUU

Figure 9:
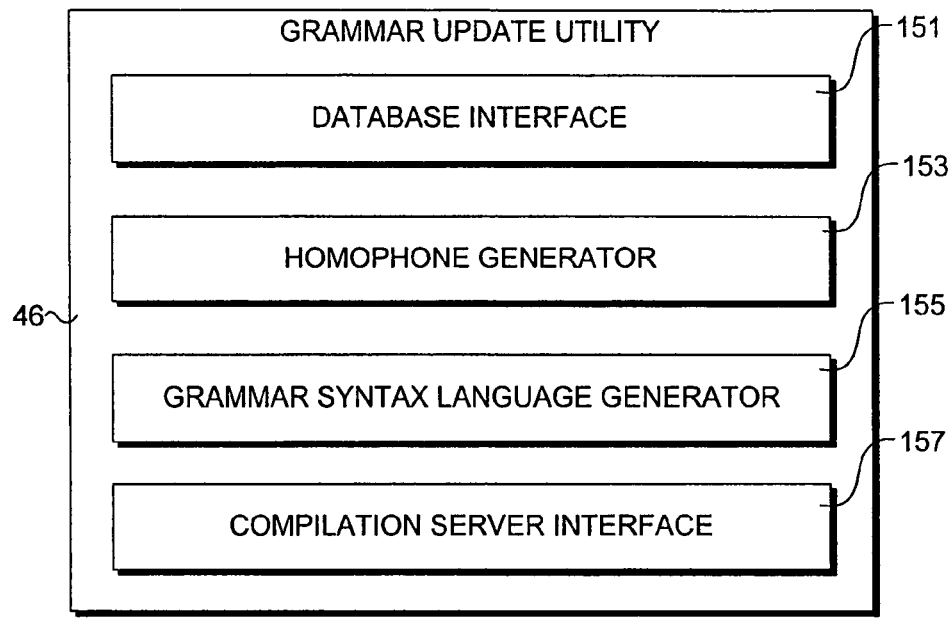
FIG. 9 is a block diagram illustrating the functional components of the grammar update utility.

In accordance with one embodiment of the invention, a portion of the enterprise database data is precompiled into an appropriate grammar form using grammar update utility (GUU) 46. Precompilation of these data increases the speed of many data requests made by users of the system. The GUU comprises a process that generates and stores phoemes (i.e., phonetic representations) corresponding to data pertaining to selected objects, e.g., employees, contacts, etc. In one embodiment, these data include information pertaining to contacts, accounts, and employees. The GUU interacts with compilation server 48 to precompile these grammars and store them in one or more grammar tables in voice database 20. As shown in FIG. 9, GUU 46 includes a database interface 151, a homophone generator 153, a grammar syntax language generator 155 and a compilation server interface 157.

Database interface 151 allows retrieval of data from both voice database 20 and enterprise data system 24 for grammer generation. It is also designed to prefetch rows in order to minimize the total time required to execute large queries. The prefetch count is configurable in a guu.cfg file.

Homophone generator 153 generates homophones for a given name or word. Homophones are words that sound alike, but have different spellings and/or meanings, such as to, too, and two. This module is required to handle potentially ambiguous speech interpretations. For instance, if the two names "Ann" and "Anne" appear on a given user's contact list, then when the user says "Ann*" it could mean either name. Thus both interpretations must be returned. The homophone generator also handles textual processing of the raw data, transforming it into strings that are acceptable to compilation server 48.

Grammar syntax language generator 155 assembles the strings from homophone generator 153 into the GSLs with desired return values that can be compiled with compilation server 48. In one embodiment, the return values are the actual names with their original spellings and punctuation exactly as they appear in enterprise database 12.

Compilation server interface 157 passes the GSL strings to compilation server 48, which compiles and stores the GSL strings as dynamic grammars in voice database 20. In one embodiment, the Grammer Update Utility access data stored in enterprise database 12 base tables via enterprise data system 24. In an optional configuration, the GUU may extract data directly from the enterprise database base tables. To address the possibility of changes in base table definitions in this latter embodiment, the GUU loads the SQL queries from an external text file (query.txt). This file can be modified to reflect any database schema changes.

In one embodiment, pre-compiled information corresponding to selected objects for each of the voice system users is maintained by the system such that it is not required to access these data from enterprise data system 24 at runtime. Accordingly, a GUU update process is run against enterprise data system 24 and voice database 20 on a periodic basis, such as once a day, whereby data corresponding to selected objects for each user are pre-compiled and stored in voice database 20. In one embodiment, the GUU update process is run as a batch process that is run as a background system process (e.g., as a background service).

Figure 11B:
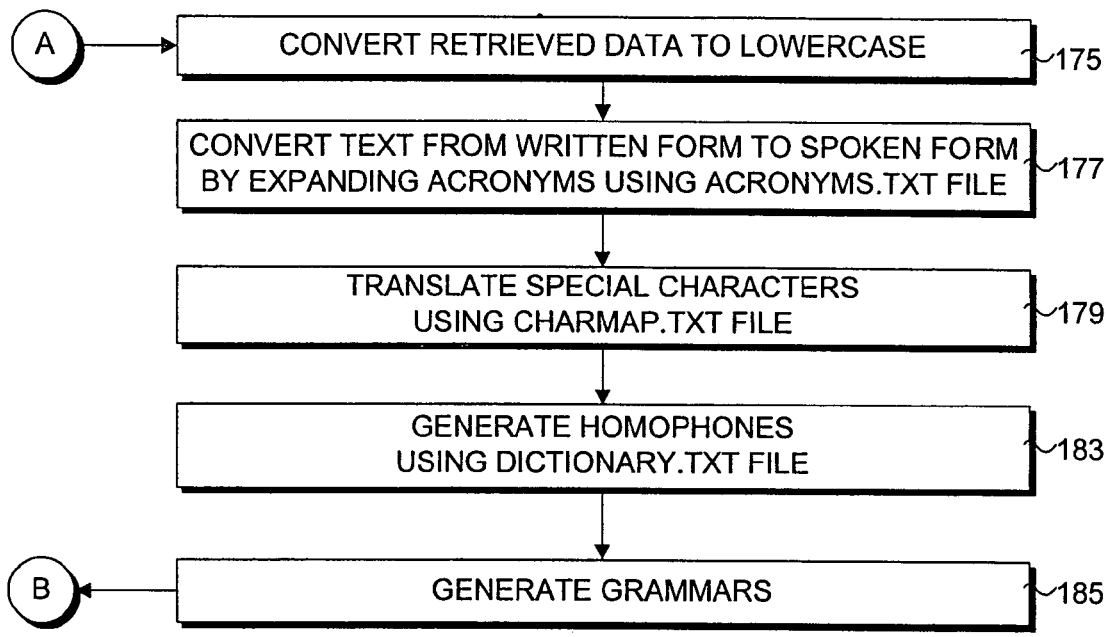

With reference to the architecture of FIG. 11 and the flowchart of FIGS. 11A and 11B, the GUU update process is applied to data corresponding tor each object that are to be pre-compiled, as depicted by start and end loops blocks 159 and 161. For example, in one embodiment, data corresponding to accounts, contacts, and employees are precompiled using GUU 46. In a decision block 163, a determination is made to whether the object is user specific. For instance, accounts and contacts are user specific (i.e., each user will generally have a different set of accounts and contacts), while employees may or may not be user-specific (i.e., the set of employees for a given enterprise are the same for each user). For example, in one embodiment, a separate set of employees that are "visible" to each user are pre-compiled for each user. If the object is user specific, user-specific data corresponding to the current object that are not currently pre-compiled are retrieved from enterprise database 12 for each voice access system user, as depicted by start and end loop blocks 165 and 167, and a process block 169. Optionally, all user-specific data corresponding the current object are retrieved from enterprise database 12, wherein existing data in voice database 20 is deleted and replaced.

If the object is not user-specific, such as data that pertains to an enterprise, the answer to decision block 163 is false, and the logic proceeds to a block 171 in which enterprise data for the current object that are not currently precompiled are retrieved from enterprise database 12. Optionally, all of the enterprise data corresponding to the current object are retrieved from enterprise database 12. In some instances, several sets of data derived from the same enterprise data may be retrieved. For example, an enterprise may desire to restrict access to certain types of information, providing an access code or visability code for each user. Suppose there are ten access codes for a given object, such as employees for an enterprise. Accordingly, ten individual sets of data corresponding to each respective access code will be retrieved and processed.

In a block 173, GUU processing is performed, which are detailed in the flowchart portion of FIG. 11B. In a block 175, the retrieved data is converted to lowercase. Next, text is converted from written form to spoken form by expanding acronyms using an acronyms.txt file, as provided by a block 177. Acronyms are normally spoken in their original form, while corresponding database data may be stored in an abbreviated form. For example, when a person reads an address, "24 N. Jackson St. Menlo, Park, Calif.," the spoken form usually is "Twenty four North Jackson Street, Menlo Park, Calif." The acronyms.txt file helps the GUU convert spoken language from its abbreviated form to its original form.

In a block 179, special characters are translated using a charmap.txt file. This file helps the GUU convert foreign characters to their English equivalent. Next, homophones are generated in a block 181 using a dictionary.txt file. The dictionary.txt file provides phonetic definitions for each words, such that the words are converted into a sequence of phonetic units (phonemes). GSLs are then generated in a block 183, returning the logic to a block 185 in FIG. 11A.

In block 185, the grammars are submitted to compilation server 48, which compiles the grammars in a block 187. The compiled grammars are then stored in voice database 20 in a block 189, whereupon the logic loops back to start block 159 to begin processing the next object.

In the foregoing description, an exemplary GUU process sequence was discussed wherein the process was applied on an object-by-object basis. This is merely illustrative, as the processing sequence may be performed using a user-by-user basis, or a combination of an object basis and a user basis. For example, the processing in blocks 174-190 may be performed individually for each user, either for one object at a time, or all objects at a time.

In one embodiment, detailed information is provided for each employee, such as address, phone numbers, organizational information, etc., while name information (e.g., first name, last name, business name) if provided for each contact and account. In an exemplary configuration, name information is converted into phoneme data, while associated detail data is stored in its normal format, either in the same row as the phoneme data, or through a reference to another table and row that contains the detailed data.

Figure 10:
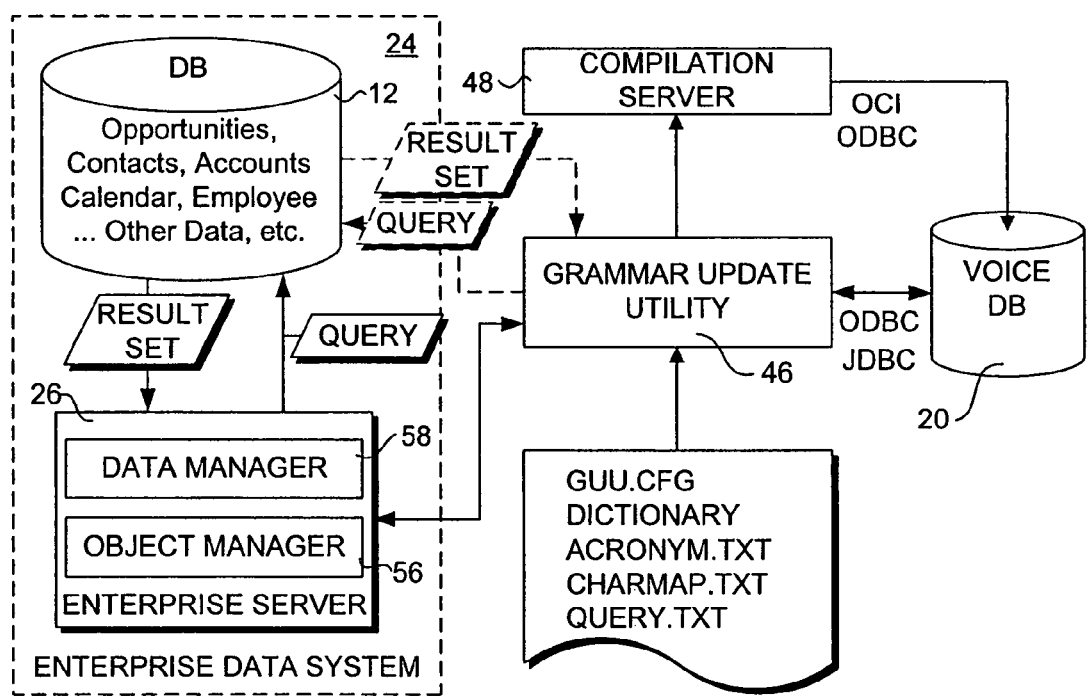
FIG. 10 is a block schematic diagram illustrating the interaction between various system components when performing a grammar update operation.

With reference to FIG. 10, in one embodiment, enterprise database 12 is accessed via enterprise data system 24 in a manner similar to that discussed above with reference to FIG. 4C, while voice database 20 is accessed using a database client connection, such as ODBC (Open Database Connectivity) connection or a JDBC (Java Database Connectivity) connection. In an optional configuration, each of enterprise database 12 and voice database 20 or hosted on an Oracle 8i database server. Accordingly, GUU 46 may access each of enterprise database 12 and voice database 20 using an ODBC or JDBC connection. Also in this embodiment, compilation server 48 may store data in voice database 20 using an ODBC connection or an Oracle Call Interface (OCI) connection.

Generation of Queries/Business Object Retrieval Requests

In order to retrieve data requested by the user, the system will have to generate an appropriate database query (when a direct link between the voice applications and the enterprise database is used) or generate an appropriate object retrieval request (when an object manager/data manager architecture is employed by the enterprise system being accessed). This task is handled by the voice applications using the process illustrated by the flowchart of FIG. 12.

In a block 191, voice applications 14 receives a command in application-readable form, such as a text form, from voice recognition client 36. In a block 193, the current navigation context of the user is determined. As discussed above, as the user navigates through various system domains, the location of the user is monitored by tracking the user system state. In addition, the current context of the user is considered, such as whether the user is browsing a particular item and what that item is.

After determining that the command is a data request rather than a navigation command, the command is parsed looking for keywords and data in "slots" defined by a command grammar syntax that is dependent on the navigation context of the user. For example, a user may access only certain data while in a given navigation context, such as a list of contacts or accounts corresponding to a current opportunity that is being browsed. As a result, the various command grammar syntaxes that need to be considered are a subset of all the command grammar syntaxes used by the system.

An exemplary set of slot definitions corresponding to an opportunities domain navigation context are shown below in TABLE 1.

TABLE 1

| Utterances | NL Slots, Sample Values |
|---|---|
| "Look up my new opportunities" | <command lookup> <opportunity_type new> |
| "Look up my opportunities" | <command lookup> <opportunity_type all> |
| "Look up my new opportunities greater than [x] dollars" | <command lookup> <opportunity_type new> <amount [x]> |
| "Lookup up my opportunities greater than [x] dollars" | <command lookup> <amount [x]> |
| "Call the account" | <command call> <location main> |

TABLE 1-continued

| Utterances | NL Slots, Sample Values |
|---|---|
| "Look up the opportunities for [account]" | <command lookup> <account [account]> |
| "Look up the new opportunities for [account]" | <command lookup> <opportunity_type new> <account [account]> |

Three exemplary grammar syntax definitions corresponding to data requests a user may make when in the opportunities domain are illustrated in FIGS. 13A-C. The grammar syntax includes keywords, optional words, and data. The keywords and data are used to build the queries or object requests.

Figure 12:
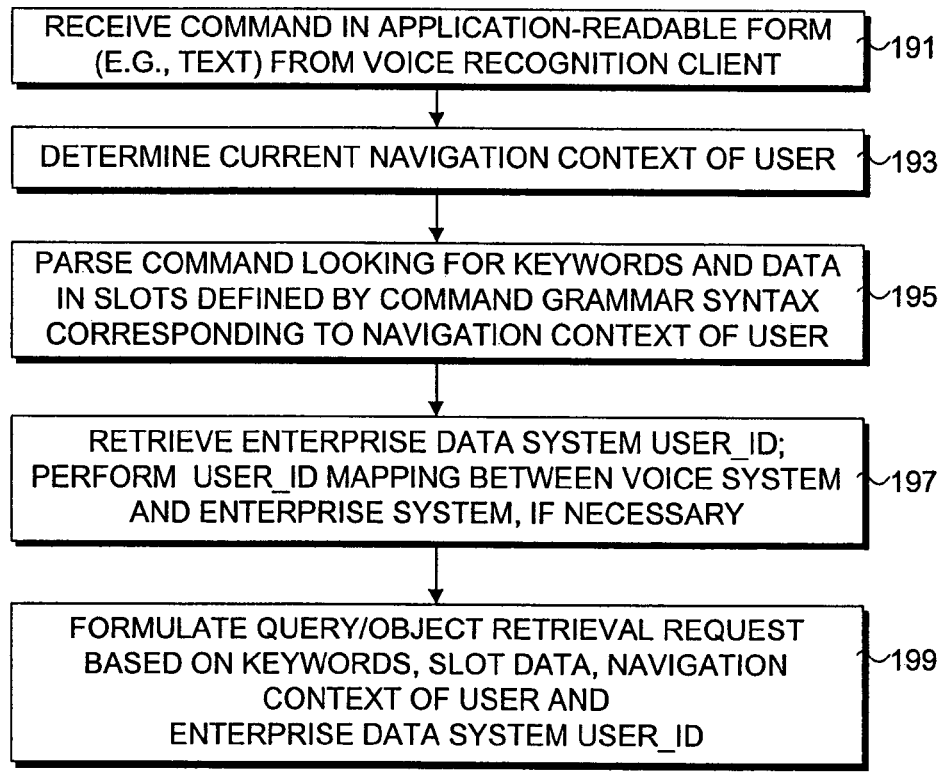
FIG. 12 is a flowchart for illustrating the logic used by the invention when retrieving request data from the enterprise database.

Returning to the flowchart of FIG. 12, the user identification (e.g., USER_ID) for user access to the enterprise system (e.g., enterprise data system 24) is retrieved in a block 197. As discussed above, in one embodiment this information is obtained during user log in and authentication, and is stored as a local variable for each user. Optionally, this information may be obtained by looking up the enterprise system user identification and password in a lookup table that maps voice system USER_IDs to enterprise system USER_IDs. A query or object retrieval request is then formulated in a block 199, based on keywords, slot data, the navigation context of the user (when applicable) and the enterprise system USER_ID.

Figure 14:
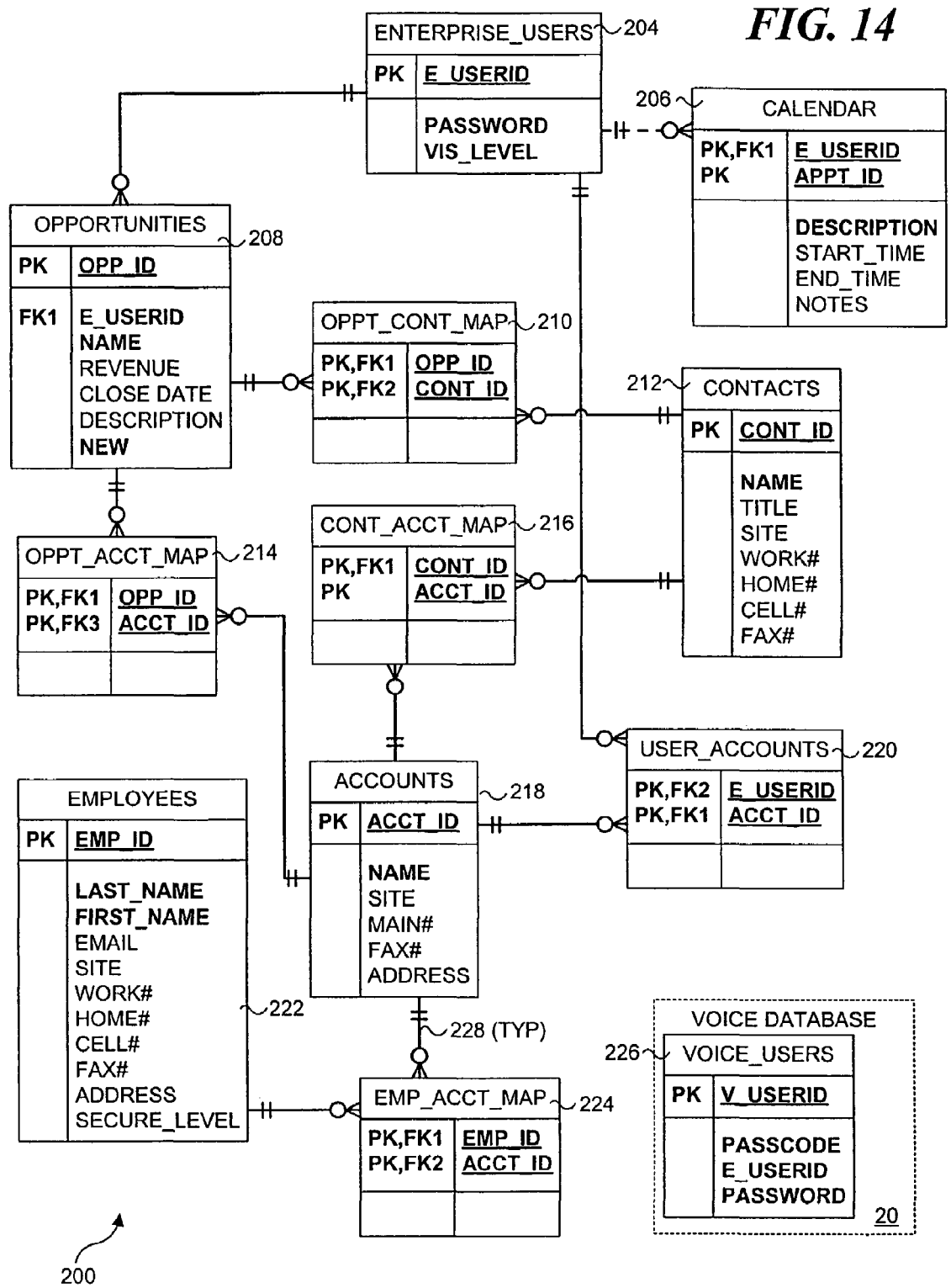
FIG. 14 is a database schema diagram illustrating various tables and relationships corresponding to an exemplary customer relationship management database schema.

The navigation context of the user may be used when "drilling down" within a current object that is being browsed by the user. For example, suppose a user has requested new opportunities and is browsing one of the opportunities returned by the system. If the user desires to lookup a contact or account corresponding to the opportunity that is presently being browsed, the identification of that opportunity is considered in formulating the query. An exemplary RDBMS database schema 200 corresponding to enterprise database 12 is illustrated in FIG. 14. Database schema 200 includes an ENTERPRISE_USERS table 204, a CALENDAR table 206, an OPPORTUNITIES table 208, an OPPT_CONT_MAP table 210, a CONTACTS table 212, and OPPT_ACCT_MAP table 214, a CONT_ACCT_MAP table 216, and ACCOUNTS table 218, a USER_ACCOUNTS table 220, an EMPLOYEES table 222 and an EMP_ACCT_MAP table 224. The tables are linked via various one-to-many relationships 226. Primary keys for each table are labeled "PK", while foreign keys are labeled "FK#." In addition, required fields are bolded, while optional fields (i.e., nullable fields) contain non-bolded text. It will be understood that database schema 200 is used herein to illustrate how data may be queried, and that an actual enterprise database may have more and/or different columns and tables than those shown in FIG. 14.

In addition to the tables for enterprise database 12 shown in schema 200, the diagram also references a VOICE_USERS table 228 that is stored in voice database 20. This table includes the voice USER_ID (V_USERID), and PASSCODE (i.e., PIN) for the user, as well as the enterprise system userId (E_USERID) and PASSWORD that are used to access enterprise database 12.

Suppose a user desires to hear information about any new opportunities the user has that are greater than $100,000. In accordance with one embodiment of the invention, the data returned from a query of enterprise database 12 will include header data and/or detail data, depending on the navigation context of the user and the amount of data that matches a user request. Using the object request scheme, voice applications 14 would submit something similar to the following to object manager 56 to retrieve the header information:

```
Retrieve [Opportunity Name], [Account Name] where
Business component = "opportunity" and
User = <Enterprise userID> and
[New] = "True" and
[Revenue] > 100000.
```

The object manager would then parse the data passed to it, and generate an appropriate SQL query to retrieve the data. An SQL query to retrieve the desired information in accordance with database schema 200 would look something like:

```
SELECT O.NAME, A.NAME, OPP_ID
FROM OPPORTUNITIES O, ACCOUNTS A, ENTERPRISE_USERS USERS,
USER_OPPORTUNITIES UO, OPPT_ACCT_MAP OAM
WHERE
    O.NEW = TRUE AND
    O.REVENUE > 100000 AND
    USERS.E_USERID = <ENTERPRISE ID FOR CURRENT USER> AND
    UO.E_USERID = USERS.E_USERID AND
    O.OPP_ID = UO.OPP_ID AND
    OAM. ACCT_ID = A.ACCT_ID AND
    O.OPP_ID = OAM.OPP_ID;
```

In each of the foregoing object request/query, it is assumed that the NEW field in OPPORTUNITIES table 208 is a Boolean field (or other type of identifier such as a "*") that is flagged to indicate opportunities the user has not previously retrieved. Optionally, a "new" opportunity could be an opportunity that has been added to enterprise database recently. In the latter case, a difference between a current date and time and timestamp corresponding to when data for the opportunity was entered into enterprise database 12 could be used to establish which opportunities are new.

In addition, the system would typically query VOICE_USERS table 226 to obtain the enterprise system userID (E_USERID) and password at some point prior to formulating the foregoing data request and query. Typically, retrieval of the enterprise userID and password will be performed during log in, as discussed above. In this instance, the enterprise userID could be stored in a local variable that is valid through a user's session connection such that it would be readily available for any queries throughout the session.

In response to the query, 0, 1, or multiple data sets will be returned. In the event that 0 (or null) data sets are returned, the system will inform the user as such. If one dataset is returned, the user will be advised of this and be allowed to have details of the object corresponding to the single dataset that was returned read to the user through a "read it" command. In cases where multiple datasets are returned, the user is enabled to browse header data for the objects corresponding to the multiple data sets using navigation commands (next, previous, first, last, etc.) and make requests for details for a given object corresponding to header data that is being currently browsed. In addition, the user may obtain information pertaining to a currently browsed object header, such as contact or account information.

For example, suppose the user is browsing an opportunity header corresponding to an opportunity having an OPP_ID of 1000 (note the user is unaware of the OPP_ID, which is used for internal purposes) and the user desires to retrieve contact information for that opportunity. The user would then say, "Look up the contacts," whereupon the object manager would be passed an appropriate object request and formulate a query to retrieve the contacts, such as:

```
SELECT C.NAME, C.TITLE, CONT_ID
FROM OPPORTUNITIES O, CONTACTS C, OPP_CONT_MAP OCM;
WHERE
    O.OPP_ID = <OPP_ID for currently browsed Oppt.> AND
    OCM.OPP_ID = O.OPP_ID AND
    C.CONT_ID = OCM.CONT_ID;
```

Further details of navigation options available for various system domains are now presented.

Navigation Domains and Definitions

The VUI of the voice access system enables a user to navigate within various domains to retrieve data from within those domains. In general, each domain corresponds to a particular object or type of data, which may include information corresponding to other domains.

Figure 15:
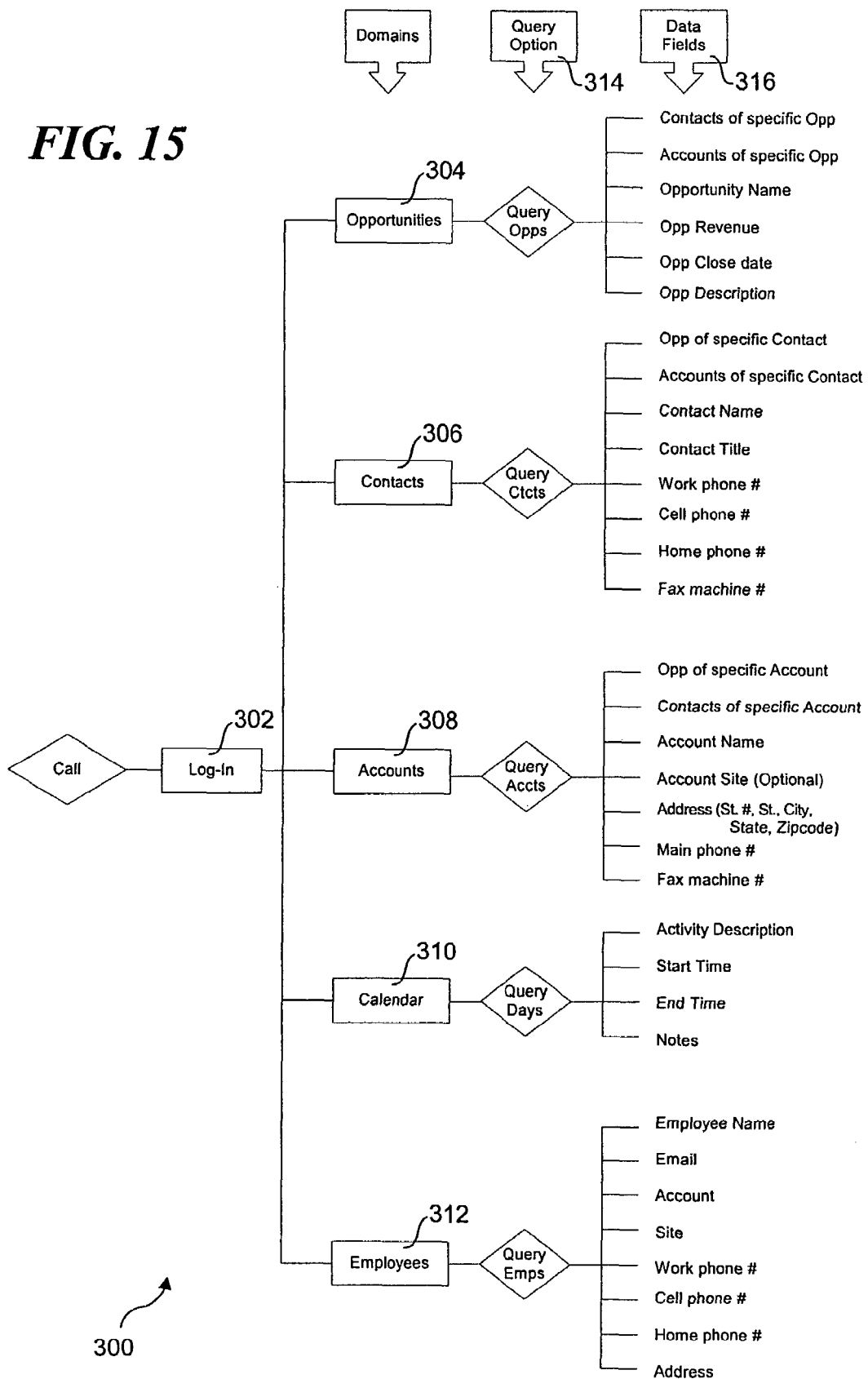
FIG. 15 is a schematic diagram illustrating a navigation paths corresponding plurality of customer relationship management (CRM) domains.

A navigation scheme 300 corresponding to one embodiment of the invention is depicted in FIG. 15, and includes a log-in domain 302, an opportunities domain 304, a contacts domain 306, and accounts domain 308, a calendar domain 310, and a employee domain 312. After logging into the system via log-in domain 302, the user enters one of the remaining five domains: Opportunities, Contacts, Accounts, Calendar, or Employees. From those domains, the user can make a query 114 to access various data fields 116 corresponding to the domain the user is currently in.

There are several characteristics that are common to all of the domains:

1) Modality. The system is modal, and thus, the user must go to a particular domain in order to have access to the commands specific to that domain, e.g., the user must be in the Contacts domain to be able to call a contact.

2) Query. The user can perform a "speech query" after entering any of the domains. Behavior of the VUI will be different depending on whether the query returns one item or more than one item. If a query returns a single item, the system will read the header and detail for that item rather than just the header information. If the query returns more than one item, the user is presented with a list of items, and can use list navigation commands (next, previous, etc.) to browse through the headers in the list.

3) More Detail and Call Actions. After listening to the header for a particular item, the user can obtain additional detail by saying "read it", or make a direct call by saying "call X". For example, after hearing the header "Mary Doyle at Parker Industries", the user could say "read it" to obtain other information about that contact or say "Call her at work".

Similarly, after hearing the header for a particular account, the user could say, "read it" to obtain additional detail or say "call the main number".

Figure 16:
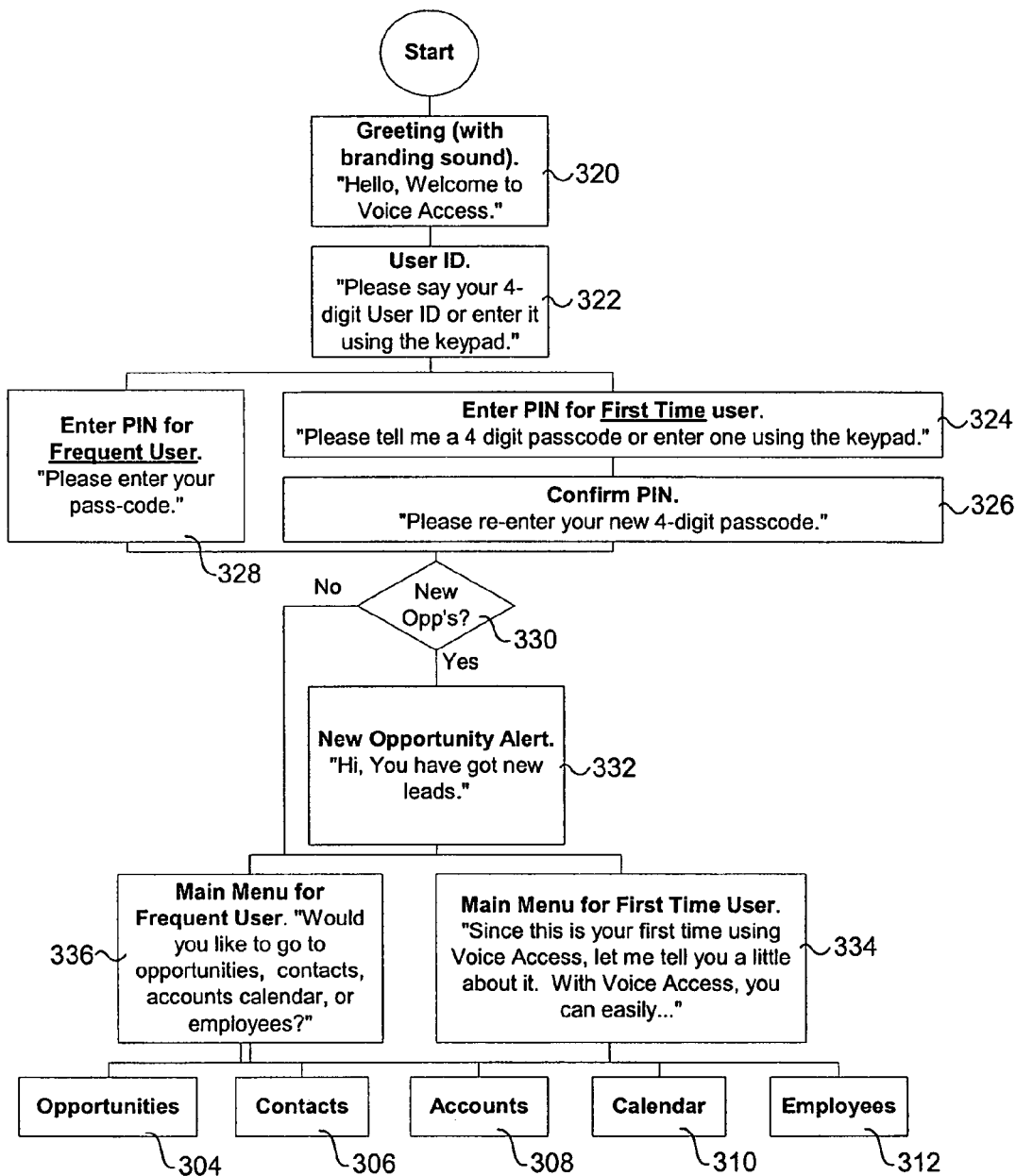
FIG. 16 is a command call diagram illustrating the navigation options encountered by a user when logging in to the voice database access system.

A command call flow diagram for log-in domain 302 is shown in FIG. 16. The process begins with a user calling a phone number that is used to access the database voice access system, which is referred to as "Voice Access" in FIG. 16 and the following Figures. In response, the system welcomes the user to the database voice access system in a block 320 and asks the user to enter a 4- to 6-digit UserID in a block 322 to initiate the login process. Login is a two-step process, with a request for a numeric user number (i.e., userID) followed by a request for a numeric PIN (personal identification number). Login allows for DTMF (keypad) input of the UserID and PIN so that users do not need to say their identification and PINs in public. The system administrator specifies the number of digits in both the user number and the PIN during the setup process. The Voice Access authenticated UserID and PIN are mapped to the enterprise application where the user is logged onto the enterprise system using the user's enterprise userID and password. If the user is entering the system for the first time, the logic flows to blocks 324 and 326 in which the user enters a 4-digit passcode (i.e., PIN), and confirms the passcode. If the user has used the system before, the user is asked to enter the user's passcode in a block 328.

Next, in a decision block 330, a determination is made to whether any new opportunities exist. If the answer is yes, a new opportunity alert is provided in a block 332. By identifying the "new leads" right after log-in, the user is allowed to immediately investigate business critical opportunities without wasting time browsing through the various domains. If no new opportunities exist, or after any new opportunities have been reviewed, the user is presented with the main menu, which allows the user to select the domain the user would like to navigate. For first time users, additional details of the system are provided in a block 334 prior to asking the user which domain the user would like to go to. Previous users are simply asked "would you like to go to opportunities, contacts, accounts, calendar, or employees?" in a block 336. This completes the call flow for log-in domain 302.

Figure 17:
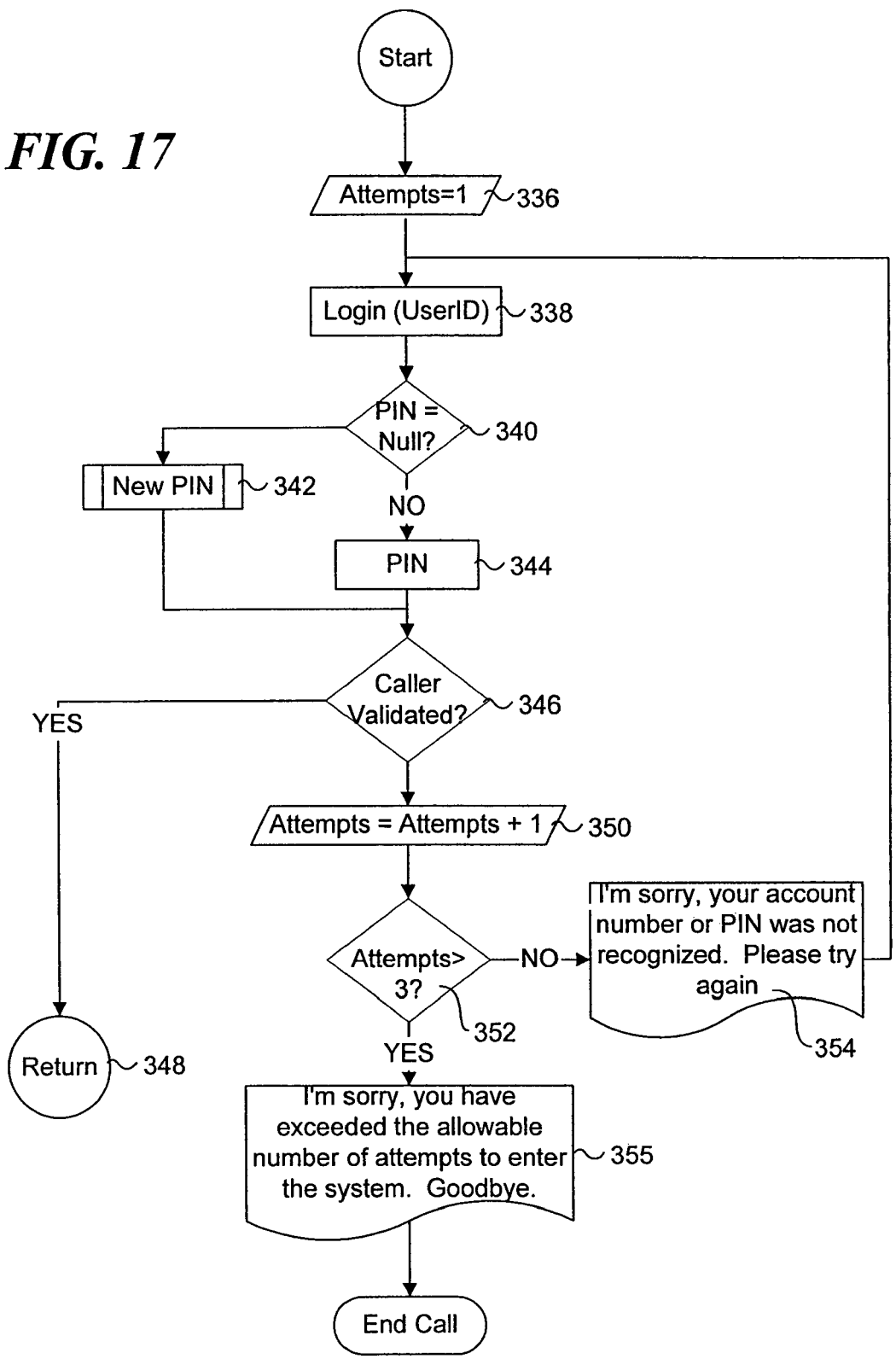
FIG. 17 is a logic flowchart illustrating the logic used by the system when a user logs in to the system.

The logic used by the system when logging in a user is illustrated in the logic flowchart of FIG. 17. In a block 336 an attempt count is initialized to 1 to indicate this it the first login attempt by the user in the current login session. The user enters his or her user number in a block 338, which causes the system to search VOICE_USERS table 228 for the PIN number (PASSCODE) corresponding to the user number (i.e., V_USERID). As determined by a decision block 340, if there is no PIN number, a process to create a new PIN number is performed in a process block 342. If a PIN number already exists for the user number, the user is asked to enter the PIN number in a block 344, whereupon a determination is made in a decision block 346 to whether the caller is validated based on whether the user number and PIN match their corresponding related entries in the database. If the answer is yes, data indicating the caller is validated is returned in a block 348. If the PIN entered by the user doesn't correspond to the proper PIN for the previously enter user number, the attempt count is incremented in a block 350 and a determination is made to whether this was the third failed attempt by the user in a decision block 352. If less than three attempts have been made by the user, a messaging indicating that the user number or PIN was not recognized and request the user to try again is provided in a block 354, and the logic loops back to block 338 to allow the user to enter the user number and PIN again. If this is the third failed attempt, the user is advised that he or she has exceeded the allowable number of attempts in a block 355 and the call is ended.

Generally, upon successful login and review of any new opportunities, the user will select one of the domains to go to. For convenience, the command call flow diagram and logic flowcharts for each of the opportunities, contacts, accounts, calendar, and employees domains will be discussed in order below.

Opportunities Domain

The Opportunities domain allows users to check their sales leads. The user can do a query for new opportunities, (new) opportunities greater than a particular revenue amount and (new) opportunities for a particular account. When positioned at a particular opportunity in an opportunity list (the result of a query), the user can look up the account, call the account, or look up the contacts associated with the opportunity.

Figure 18:
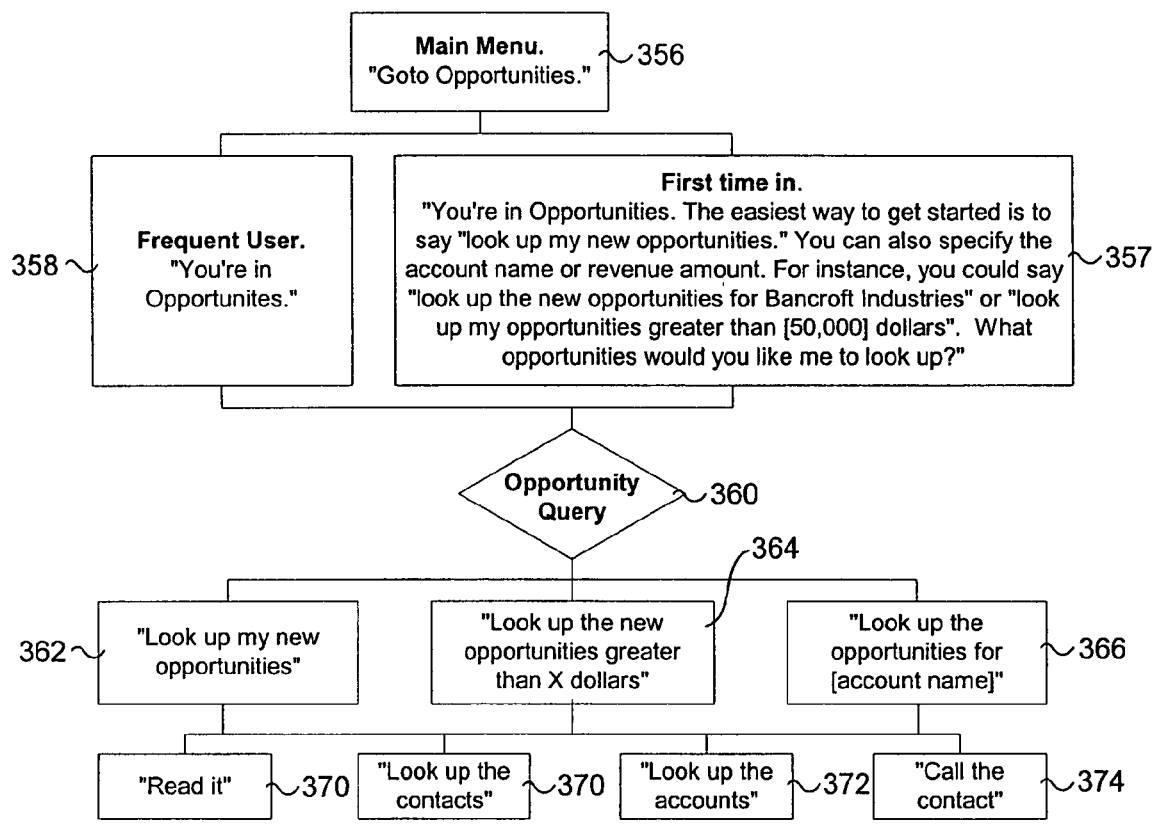
FIG. 18 is a command call diagram illustrating the navigation options encountered by a user when in an "opportunities" domain of the voice database access system.

With reference to the command call flow diagram of FIG. 18, a user enters the opportunities domain by responding "Go to Opportunities" from main menu blocks 334 and 336, as provided by a block 356. If the user is a first time user, information describing how opportunities may be looked up is provided in a block 357. Frequent users are provided with a system response such as "You're in Opportunities" in a block 358. At this point, the user can perform a natural language opportunities query 360, examples of which are provided in blocks 362, 364, and 366. Each opportunity query returns a browsable list of opportunities if any opportunity matches exist. In response to the natural language query, a corresponding SQL query is generated and executed on enterprise database 12, and one or more data sets pertaining to each opportunity that matches the query's criteria is returned to the user in the form of a header and detail information.

At this point, the navigation is context sensitive—that is, the user may navigate to other domains depending on the context of the user's request. If a user says "Read it," as provided by a block 368, the system reads the header and/or detail for the current opportunity in the list. As used herein, the term "read" means the system will process the data that is requested to be read by converting it into TTS data and delivering the TTS data to the user, thereby providing computer-generated speech corresponding to the requested data to the user. Typically, the header will include an opportunity name and account, while the detail will include revenue, close date, and descriptive information concerning the opportunity.

The user can review the contacts for the current opportunity by saying, "Look up the Contacts" in a block 370. The system will create a browsable list of contacts for the current opportunity and read the header for the first contact in the list. If there is only one contact, the system will read detail information for that contact as well.

The user can review the accounts for the current opportunity by saying "Look up the accounts" in a block 372, which will position the user at the account for the current opportunity. The system will then read the header and detail for that account. The user can also shift to the contacts by saying, "Call the Contact" in a block 374, which will find a relevant contact phone number and call that number directly. If there is more than one contact number, the user will be provided with a list of numbers and corresponding identifiers from which the user can select a number to call.

Figure 19:
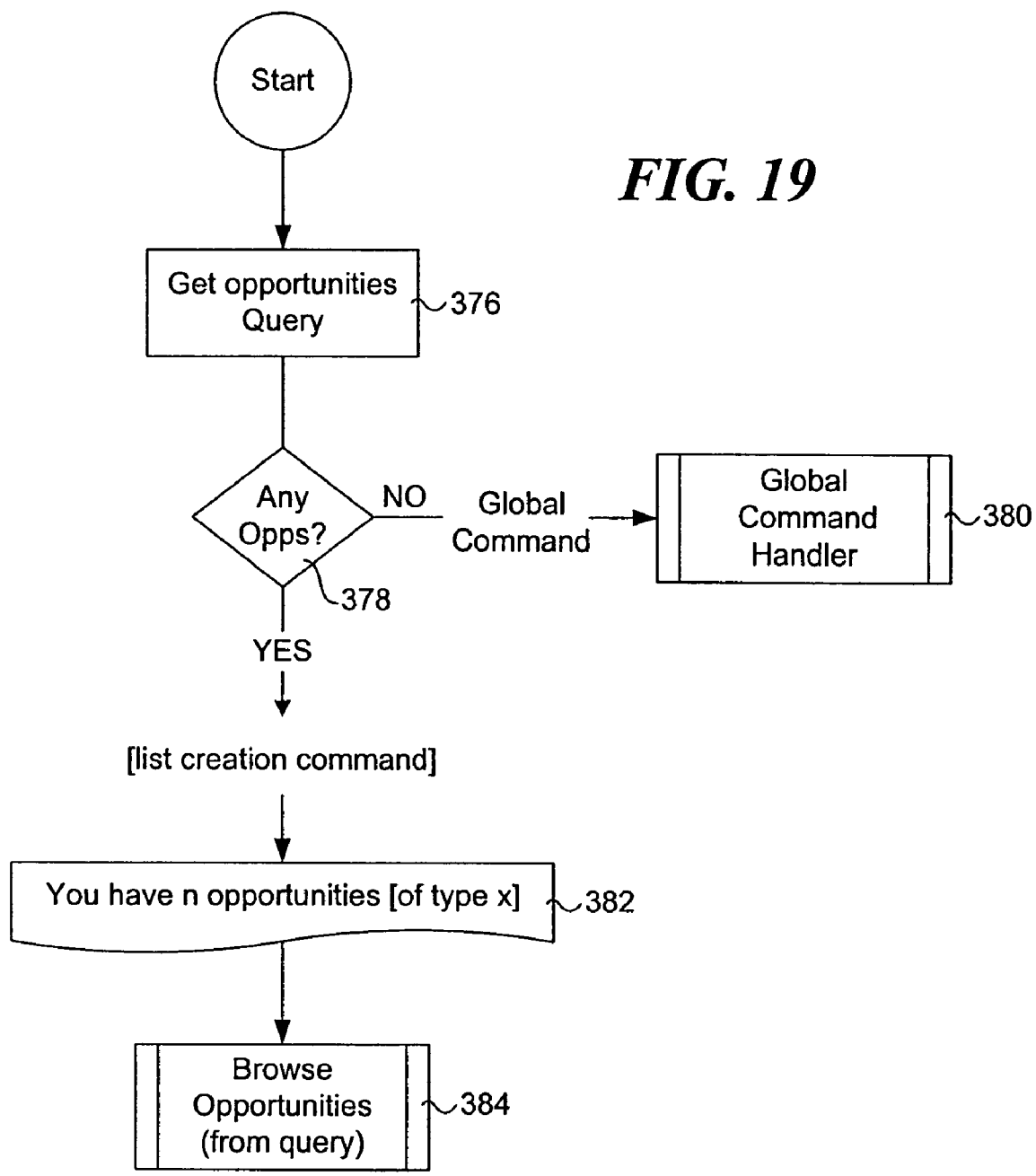
FIG. 19 is a logic flowchart illustrating the logic used by the system in response to a user opportunities query.

A flowchart illustrating the logic used when performing an opportunity query and providing feedback to the user is shown in FIG. 19. A get opportunities query is performed in a block 376, and a determination is made in a decision block 378 to whether any opportunity data sets are returned from the query. If the answer is no, the logic flows to a global command handler process 380, further details of which are described below with reference to FIG. 20. If the answer is yes, a list creation command is issued internally by the system, and the system informs the user of the number of opportunities returned from the query, as provided by data 382. The user is then able to browse the opportunities via a browse opportunity process 384, further details of which are illustrated in the flowchart of FIG. 21.

Figure 20:
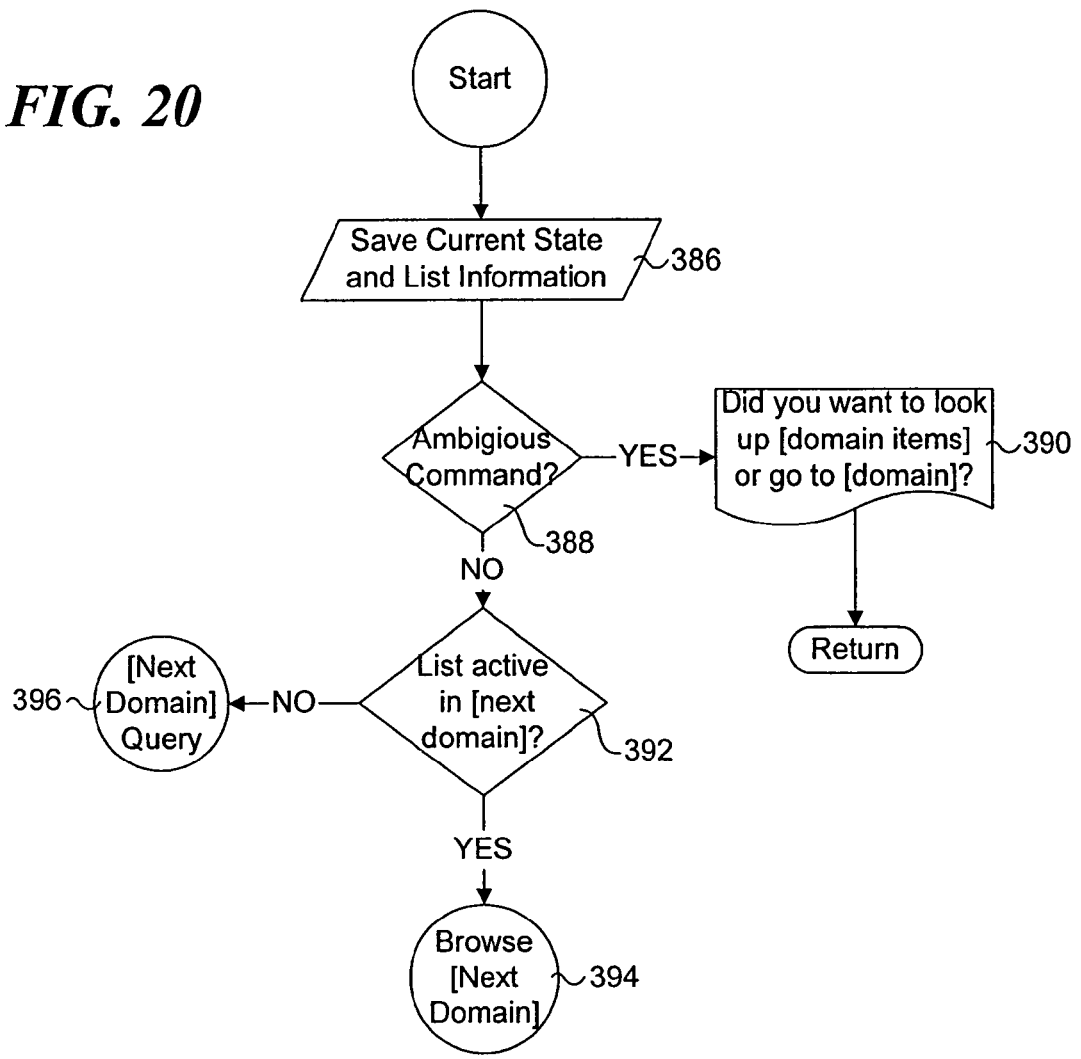
FIG. 20 is a logic flowchart illustrating the logic used by the system when performing a global command handler process.

A flowchart corresponding to global command handler process 380 is shown in FIG. 20. The global command handler process begins by saving current state and list information in a data block 386. A determination is then made in a decision block 388 to whether the command is ambiguous. If the command is ambiguous, the system asks the user various navigation questions in a block 390 to ascertain where the user wants to go. If the command is unambiguous, a determination is made in a decision block 392 to whether the list is active in the next domain. If it is, the next domain is browsed, as indicated by a block 394. If the list is not active, a query for the next domain is performed in a block 396.

Figure 21:
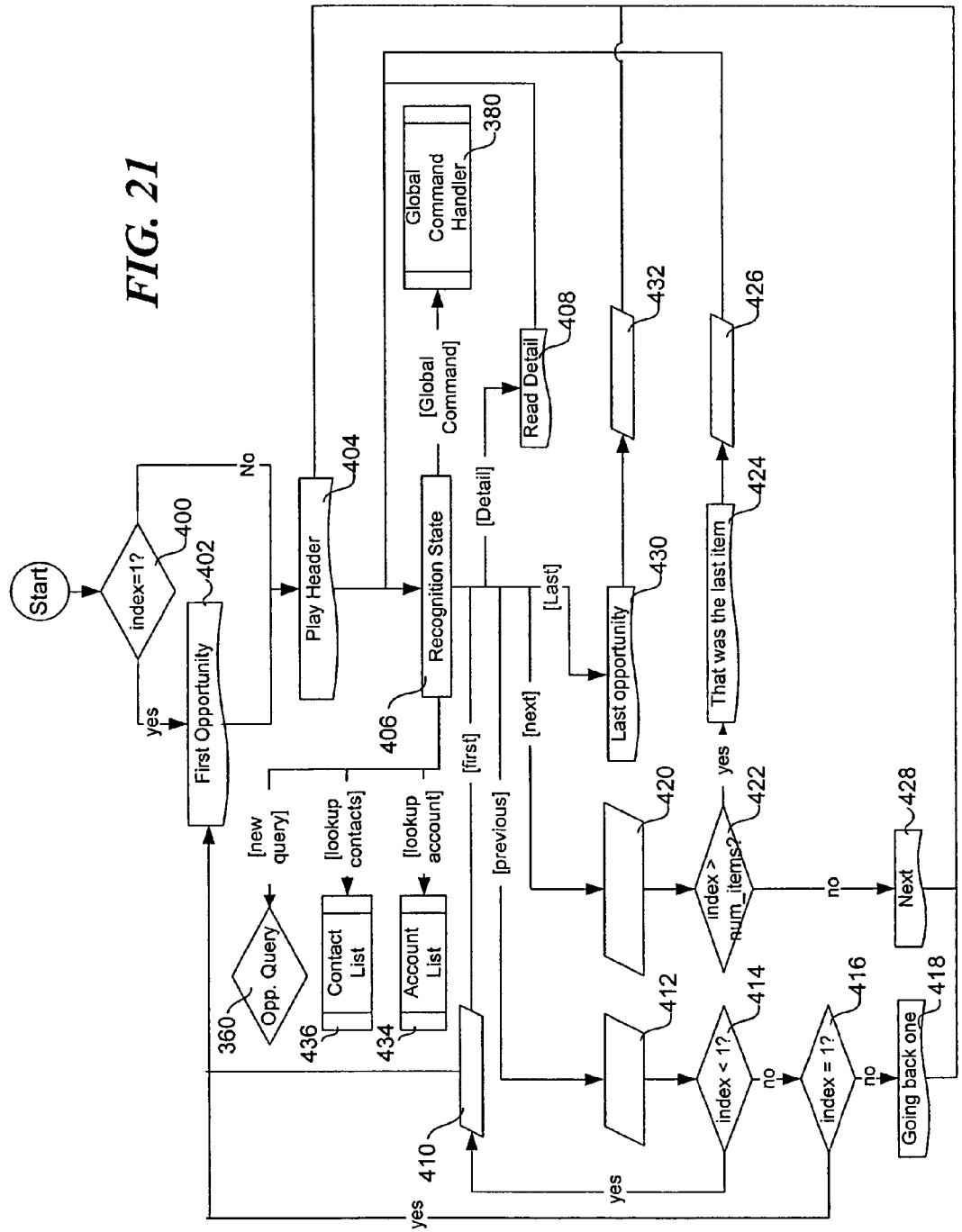
FIG. 21 is a logic flowchart illustrating the logic used by the system when enabling a user to browse opportunities returned from an opportunities query performed in response to a user request for opportunities information.

With reference to the flowchart of FIG. 21, in a decision block 400 a determination is made to whether the opportunity index value is 1, which indicates that the current opportunity being browsed is the first or only opportunity in the set of opportunities that is returned by the opportunity query. Accordingly, the system announces, "First opportunity" in a block 402. The header for the opportunity is then "played" in a block 404, whereupon the logic proceeds to a recognition block 406. Recognition block 406 routes the logic based on a current command provided by the user in response to hearing the header for the current opportunity or a current context of the navigation. For example, the user can ask for a new query, to lookup contacts, to lookup accounts, to retrieve the first opportunity in the set, to retrieve a previous or next opportunity in the set, or to hear details of the opportunity. If the command does not correspond to any of these options, it is considered to be a global command that is processed by global command handler 380. As discussed above, if there is only one opportunity returned by the query, both the header and detail will be read, wherein the latter is provided by a block 408.

In cases when multiple opportunities are returned by the opportunities query, the voice user interface provides a way for the user to select which opportunities the user would like to hear more details about. If the user asks to navigate to the first opportunity by saying "first," the opportunity index is set to 1 in a block 410 and the logic loops back to block 402. If the user asks for a "previous" opportunity, the opportunity index is decremented by 1 in a block 412 and a determination to whether the index is less than 1 is made in a decision block 414. An opportunities index that is less than one indicates that the user has requested to move to a previous opportunity when the user is already at the top of the list; accordingly, the index is set back to 1 and the user is returned to the first opportunity. If the index has been decremented to 1, the answer to a decision block 416 is yes, again the system says "first opportunity" in block 402. If the user has moved forward to any opportunity that isn't the first opportunity, a "going back one" announcement will be made in a block 418, whereupon the logic will loop back to play the header for the moved to opportunity in block 404.

If the user desires to move to a "next" opportunity, the opportunity index is incremented by one in a block 420 and a determination will be made in a decision block 422 to whether the index now exceeds the number of opportunities returned by the query. If the answer is yes, the user was already at the end of the list. In response, the system announces, "That was the last item" in a block 424, and the opportunity index is set to n in a block 426, wherein n corresponds to the number of items (data sets) returned. The logic then loops back to recognition state 406. If the next opportunity is not the last opportunity, the system announces, "Next" in a block 428 and the logic loops back to play the header for the next opportunity in block 404. If the user say "last" to move to the last opportunity, the system moves to that opportunity and announces, "Last opportunity" in a block 430 and the opportunity index is set to n in a block 432, whereupon the logic loops back to block 404.

As discussed above, the recognition state block 406 is context sensitive to the present location the navigation is at. As a result, a user can drill down to retrieve information corresponding to the current opportunity being browsed. For instance, the user can say "lookup account" and the logic will flow to begin an account list process 434. The user may also say, "lookup contacts" to cause a contact list process 436 to begin. If the user requests a "new query", the logic returns to opportunity query block 360 (FIG. 18).

Contacts Domain

Users can look up or call any contact for which they have visibility privileges in the contacts domain. If a look up or call request returns more than one contact (for example, there are two names in the database that match "John Smith") the user will be placed in the browsable list of contacts returned for that request. The user can then disambiguate by saying "Call this one" or "Read this one" after hearing a particular header. They can also say any other valid contacts command. Finally, when positioned at a particular contact, the user can look up the account or opportunities associated with that contact.

Figure 22:
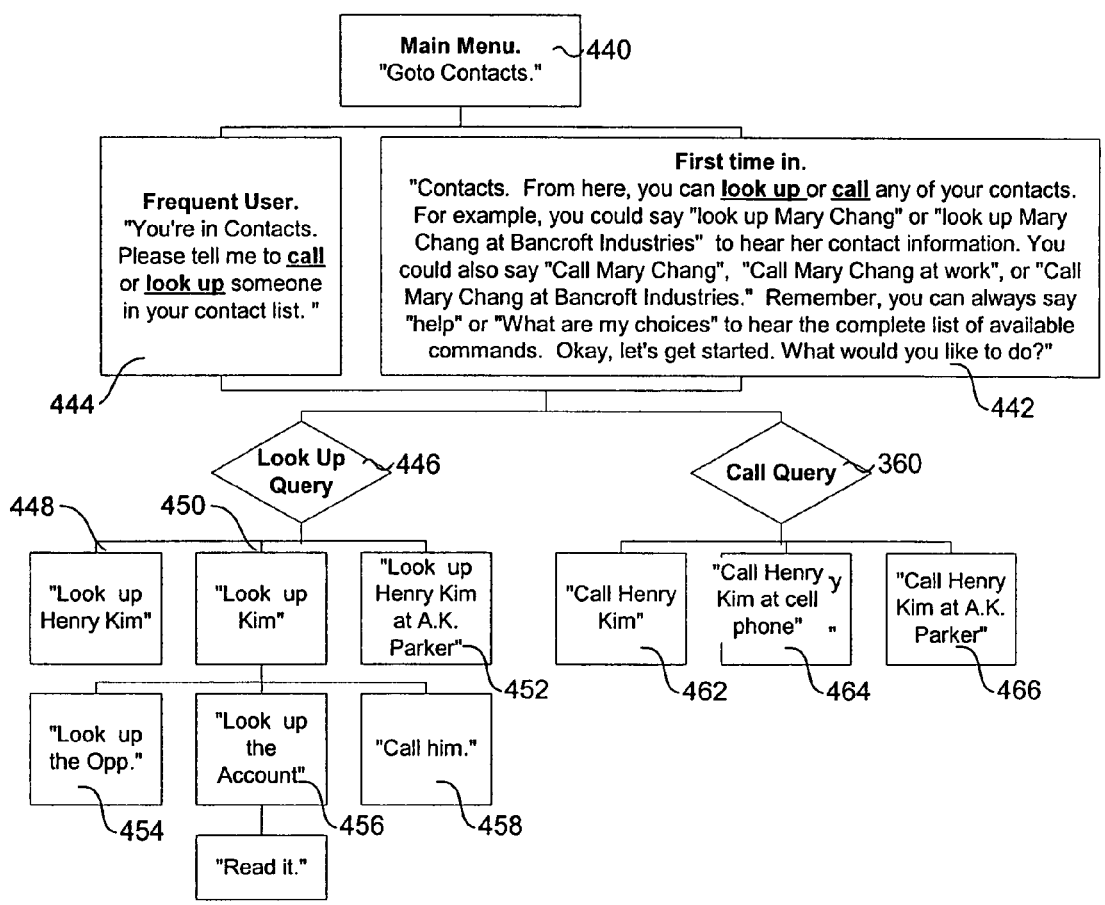
FIG. 22 is a command call diagram illustrating the navigation options encountered by a user when in a "contacts" domain of the voice database access system.

A command call flow diagram for the contact domain is shown in FIG. 22. From the main menu, the user says "Go to Contacts" in a block 440, whereupon first time users are provided with instructions in a block 442, while previous users are directed to provide a command pertaining to call or lookup someone in a block 444. The user can cause a look up query 446 to be performed by saying "look up <contact query criteria>," wherein the contact query criteria may be a person's full name, last name, or name and business, as exemplified by blocks 448, 450, and 452, respectively. Once the contact has been identified, the user may obtain related information or call the contact, such as looking up opportunities corresponding to the contact, looking up an account corresponding to the contact, etc, as exemplified by blocks 454, 456, and 458.

A call query 460 enables the user to directly call the user, while still connected to the system, whereby the system functions as a pass through during the call. Examples of call queries are provided in blocks 462, 464, and 466. If a "tromboning" feature is activated, the user is returned to the contact domain upon completion of the call.

Figure 23:
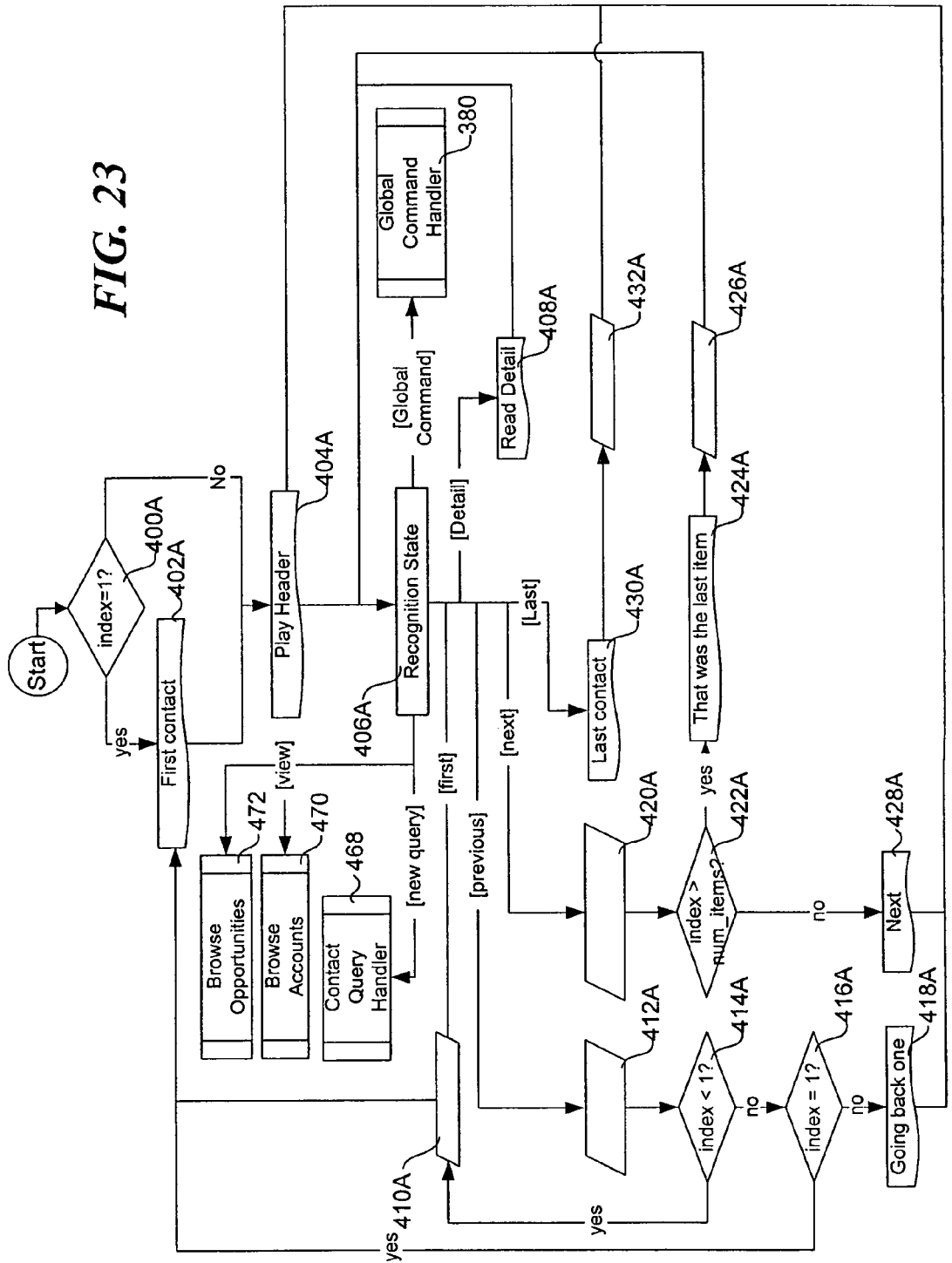
FIG. 23 is a logic flowchart illustrating the logic used by the system when enabling a user to browse contacts returned from a contacts query performed in response to a user request for contact information.

A flowchart corresponding to the logic implemented by the system to support contact browsing is shown in FIG. 23. Much of the logic of the browse contact flowchart is identical to the browse opportunities flowchart of FIG. 20. Accordingly, these blocks are labeled with the same base reference numbers plus an appended "A". Notable differences between the flowcharts concern various navigation options, which include a contact query handler 468, a browse accounts process 470, and a browse opportunities process 472. In addition, the header for a contact will typically include a contact name, account, and site, while the detail will typically include a work number, home number, cell number, and fax number.

Figure 24:
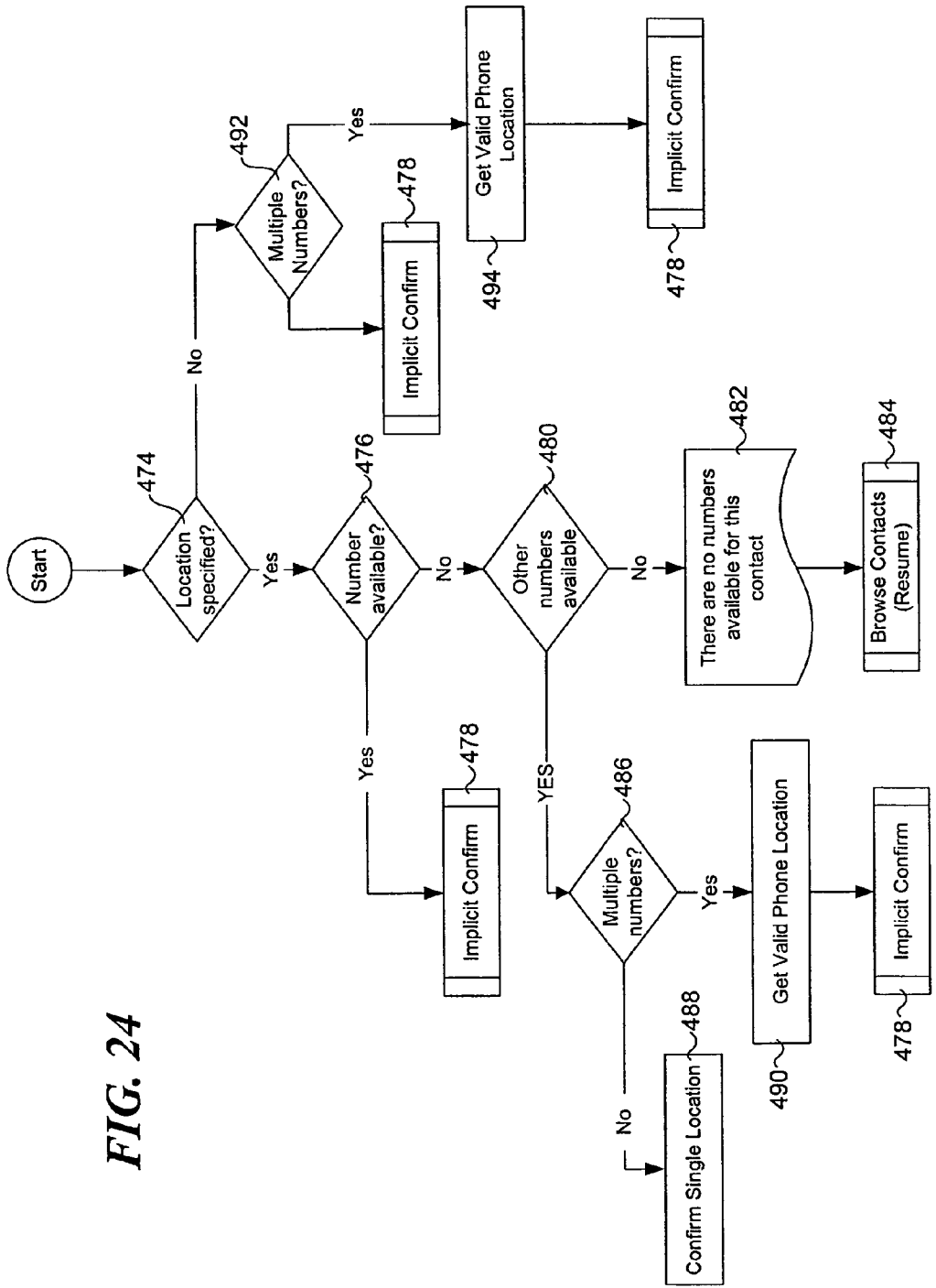
FIG. 24 is a logic flowchart illustrating the logic used by the system when enabling a user to call a contact.

A logic flowchart for calling a contact is shown in FIG. 24. In a decision block 474, a determination is made to whether a location for the contact is specified. If the answer is yes, a determination is made to whether a number is available for the contact in a decision block 476. If the answer is yes, an implicit confirm process is performed in a block 478, further details of which are discussed below with reference to FIG. 25. If the answer to decision block 476 is no, a determination to whether there are other numbers for the contact is performed in a decision block 480. If there are no other numbers available, the system announces, "There are no numbers available for this contact" in a block 482, and the contracts browsing process is resumed in a block 484. If there are other available numbers, a determination is made in a decision block 486 to whether there are multiple other numbers. If there is only one number, that number is confirmed in a block 488. If there are multiple numbers, a valid phone location is retrieved in a block 490, which is confirmed by implicit confirm process 478.

Returning to the top of the flowchart, if the user does not specify a location, the logic proceeds to a decision block 492 in which a determination is made to whether there are multiple numbers. If there is only one number, it is confirmed by implicit confirm process 478. If multiple numbers exist, a valid phone location is retrieved in a block 494, which is confirmed by implicit confirm process 478.

Figure 25:
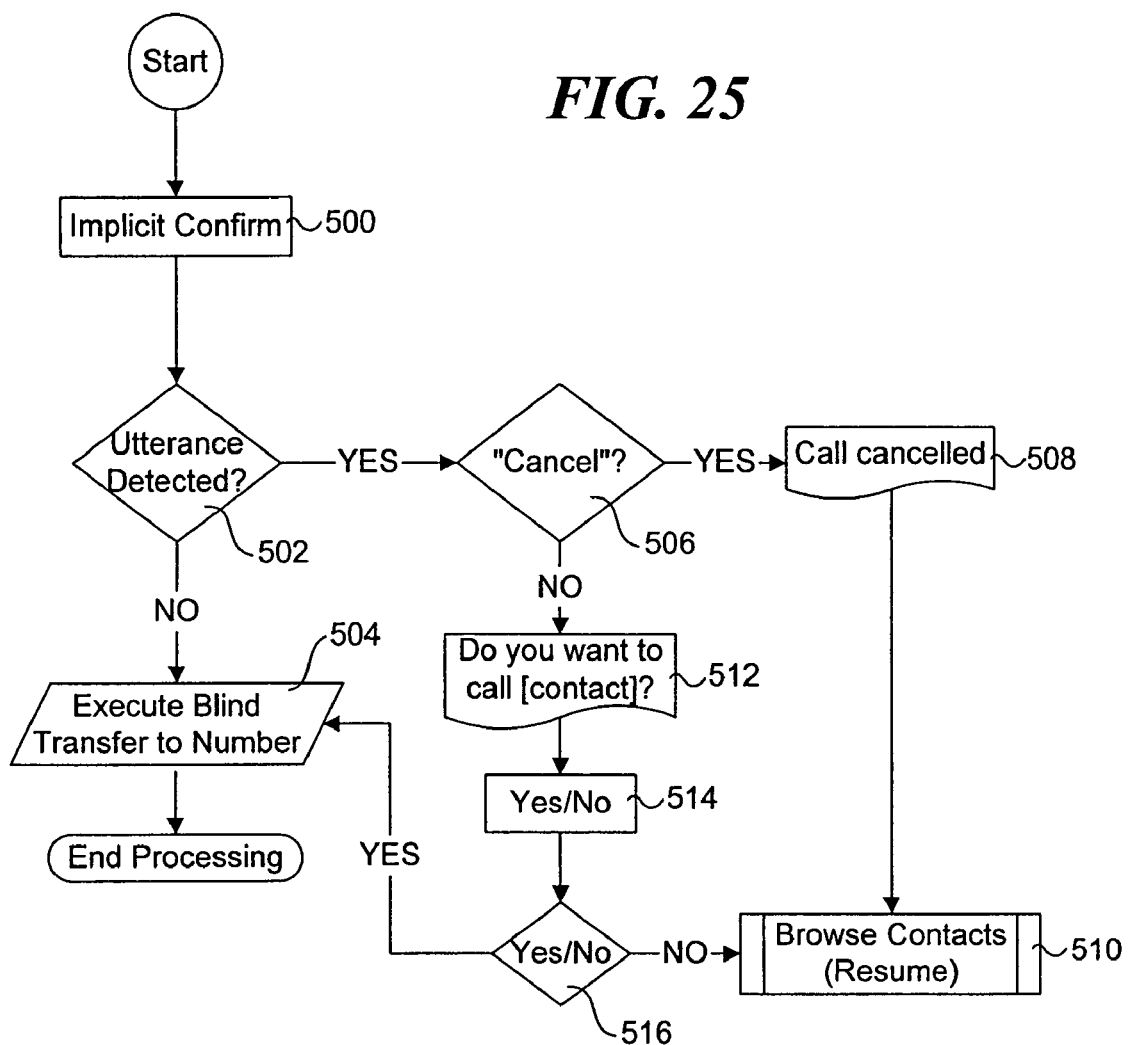
FIG. 25 is a logic flowchart illustrating the logic used by the system when performing an implicit confirmation process.

With reference to the logic flowchart of FIG. 25, the implicit confirm process begins in a block 500, wherein the system implicitly confirms a user's desire to continue with completing a phone connection with a contact by listening for any user feedback. For example, a user can stop a call in progress by saying, "cancel," or continue a call by saying, "go ahead," or "yes." If no utterance prior to a system timeout is detected, as determined in a decision block 502, a "blind" transfer to the number is executed in a block 504, completing the confirmation process. The blind transfer to the number is performed by passing the phone number for the contact to telephony interface 38, which puts the current user connection on "hold" and dials the contact phone number to connect the user to the contact.

If the user says "cancel," as determined by a decision block 506, the system doesn't complete the transfer of the call to the contact, and announces, "call cancelled" in a block 508, whereupon the user is returned to browsing contacts in a block 510. If an utterance is detected and it is something other than "cancel," the system initiates an explicit confirmation by announcing, "do you want to call [contact]" in a block 512. The user then responses with "yes" or "no" (or synonomous equivalents) in a block 514, whereupon a decision block 516 routes the logic based on the answer. If the answer is yes, the logic flows to block 504 and the call is transferred to the contact's number. If the answer is no, the logic flows to block 510, allowing the user to continue browsing contacts.

Accounts Domain

Users can look up or call an account in the accounts domain. If a look up or call request returns more than one account, the user will be placed in a browsable list of accounts returned by the query. The user first hears a header for the queried account; if there are multiple accounts with the same name, the user can disambiguate by saying "Call this one" or "read it", or say any other valid accounts command. When the user drills deeper and reads the account, he or she will receive all of the account detail. Finally, when positioned at a particular account, the user can look up the contacts or opportunities associated with that account.

Figure 26:
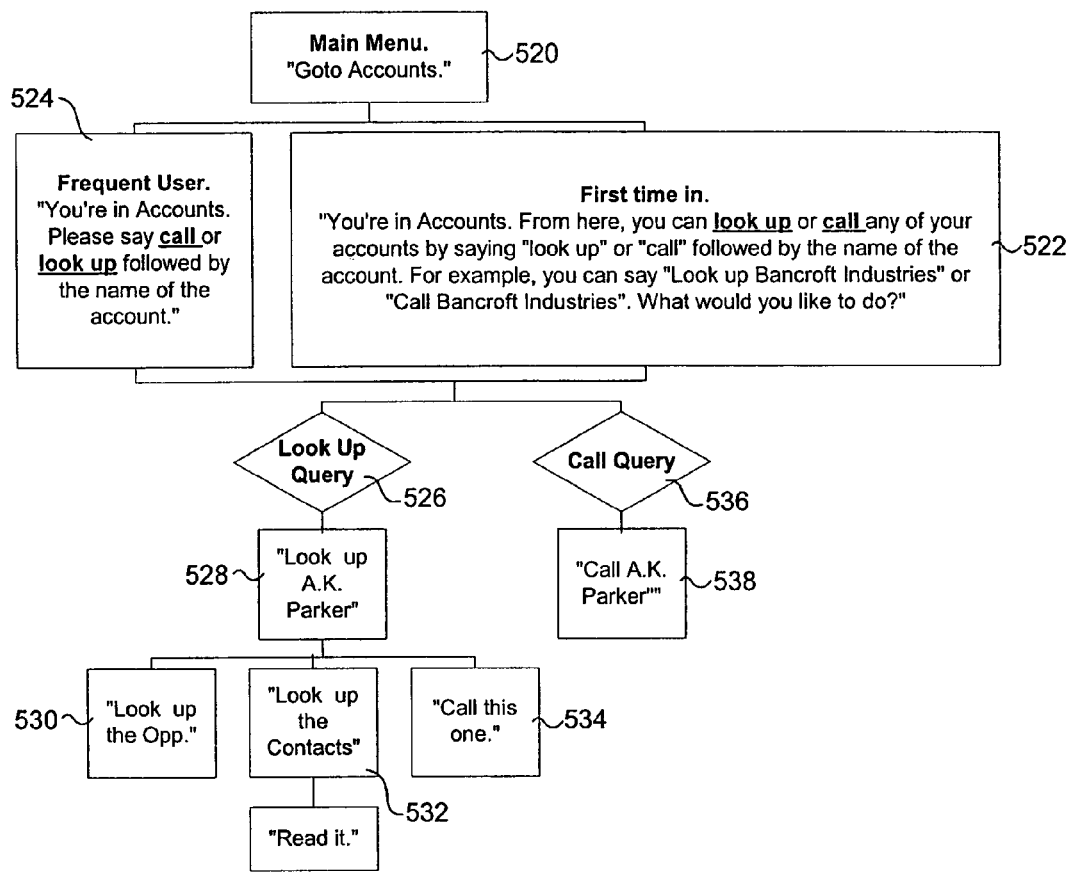
FIG. 26 is a command call diagram illustrating the navigation options encountered by a user when in an "accounts" domain of the voice database access system.

As shown in FIG. 26, a user accesses the accounts domain from the main menu by saying, "Go to accounts" in a block 520. First time users are advised on how to browse account information in a block 522, while previous users are advised to say "call" or "look up" followed by the name of the account in a block 524. A look up query 526 is performed in response to a user command of "look up <account name>," as exemplified by a block 528. Information pertaining to the account can then be retrieved, based on the user's next input. For example, as shown in a block 530, the user can look up opportunities associated with the account, or look up contacts for the account in a block 532. As another option, the user can call the account, as provided by a block 534.

Upon returning an account, the system will read the header, which will typically include an account and site. Depending on the user's inputs, detail information may also be read, which will typically include a main phone number, a fax number, a site (if not in the header), and an address.

Another option in the accounts domain is to call an account directly, as provided by a call query block 536 and a user input block 538. The action is initiated in response to a user saying, "call <contact name>." Further details for calling an account are discussed below with reference to FIG. 28.

Figure 27:
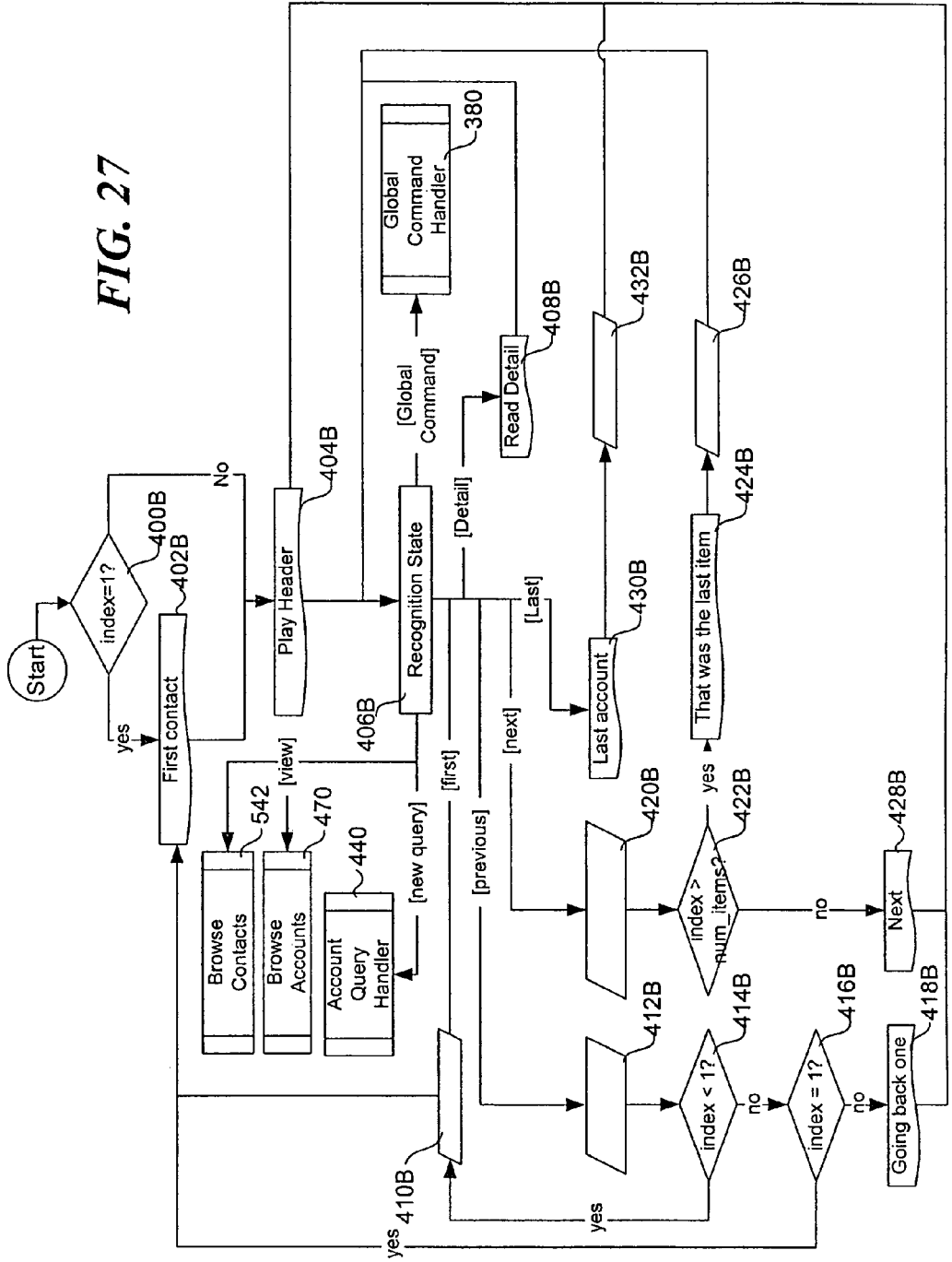
FIG. 27 is a logic flowchart illustrating the logic used by the system when enabling a user to browse accounts returned from an accounts query performed in response to a user request for account information.

FIG. 27 shows a flowchart corresponding to the logic implemented by the system to support account browsing. Much of the logic of the browse account flowchart is identical to the browse opportunities flowchart of FIG. 21. Accordingly, these blocks are labeled with the same base reference numbers plus an appended "B". Notable differences concern various navigation options, which include a accounts query handler 540, browse accounts process 470, and a browse contacts process 542.

Figure 28:
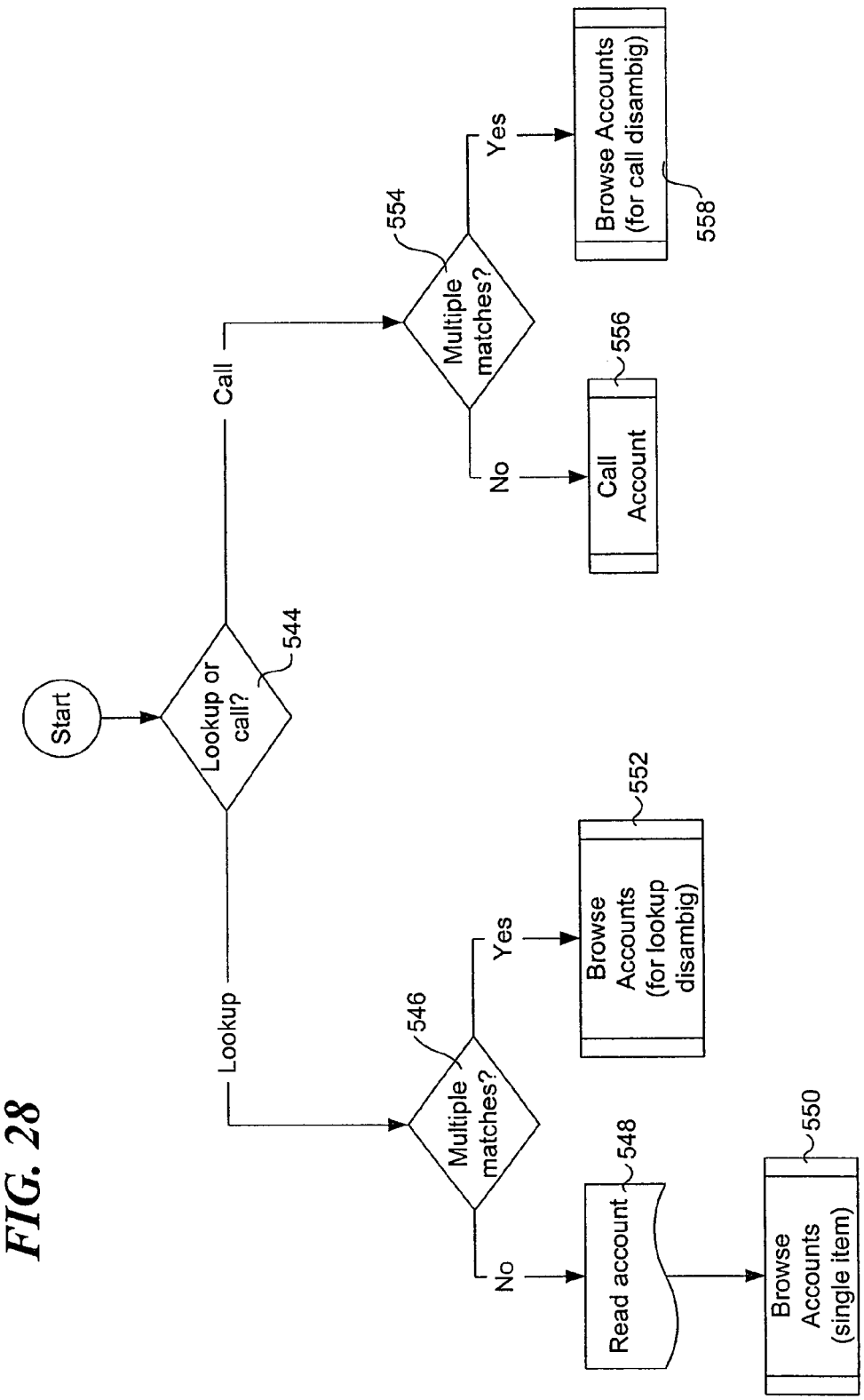
FIG. 28 is a logic flowchart illustrating the logic used by the system when enabling a user to lookup an account or call a contact for the account.

A logic flowchart corresponding to account query handler process 540 is shown in FIG. 28. In a decision block 544 a determination is made to whether the user issued a "look up" or "call" command. If the user issued a "look up" command, the logic flows to a decision block 546 in which a determination is made to whether there are multiple matches. If there are not, the account header is read in a block 548 and the user is enabled to browse the account detail in a browse process 550. If there are multiple matches, the logic proceeds to a browse account process 552 that enables the user to browse the multiple accounts that matched the look up query.

If decision block 544 determines that a call command was issued, the logic flows to a decision block 554 in which a decision is made to whether there are multiple matches. If there is only one matching account, the user is transferred to that account by a call process 556. If there are multiple matching accounts, the systems proceeds to perform a browse accounts process 558 that enables the user to identify which account the user desires to call.

Figure 29:
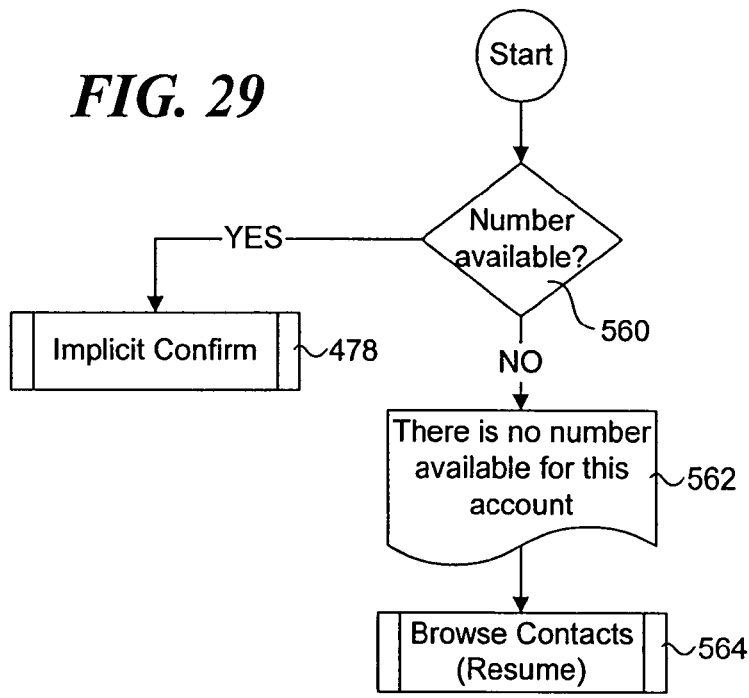
FIG. 29 is a logic flowchart illustrating the logic used by the system when enabling a user to call an account contact.

With reference to the logic flowchart of FIG. 29, the logic for call account process 556 begins with a decision block 560 in which a determination is made to whether a number is available for the account. If it is, the logic proceeds to implicit confirm process 478. If there is no number available, the system announces, "There is no number available for this account" in a block 562 and enables the user to resume browsing contacts in a process block 564.

Calendar Domain

Users can browse calendar information such as appointments for a given day by navigating to the calendar domain. Once in the calendar domain, users do a query by specifying a particular day, and they are placed in a browsable list of appointments for that day. Users can use a variety of different utterances to specify the day, such as, "Monday", "tomorrow", "February 16," etc.

Figure 30:
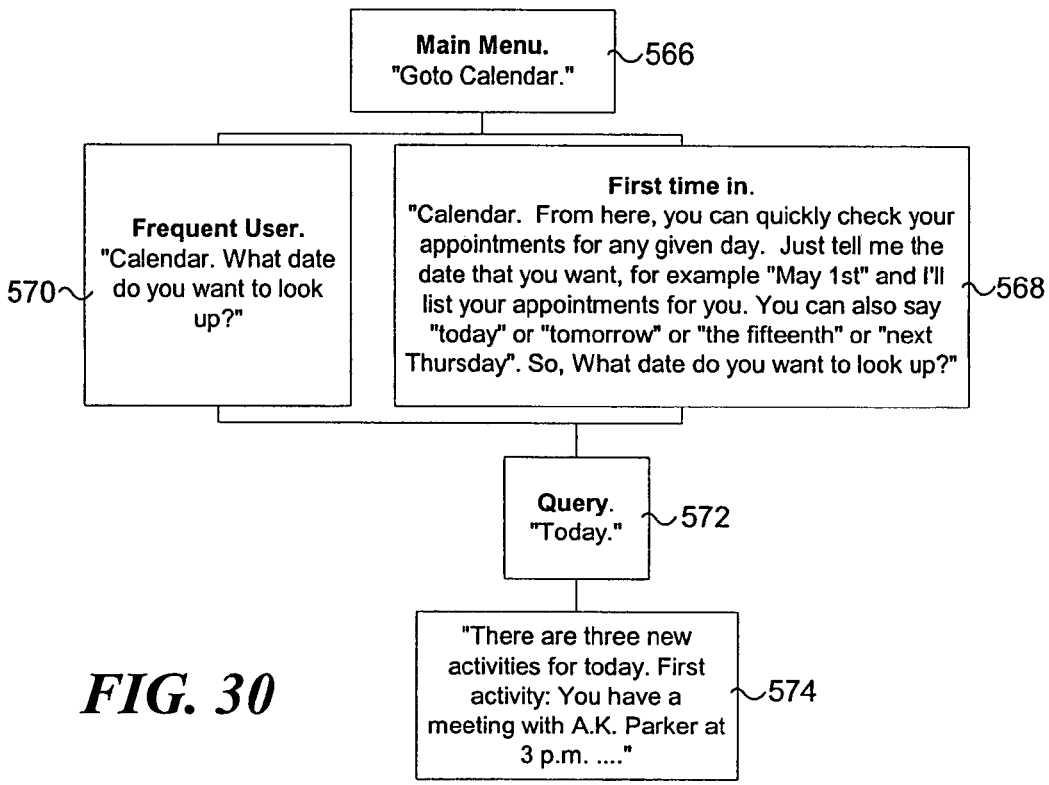
FIG. 30 is a command call diagram illustrating the navigation options encountered by a user when in a "calendar" domain of the voice database access system.

As shown by the command call flow diagram of FIG. 30, a user enters the calendar domain by saying "Go to calendar" in a block 566. Upon entering the domain, new users are advised how to check calendar information in a block 568, while previous users are asked what date the user wants to look up in a block 570. The user then provides input for a calendar query, as exemplified by a "Today" query block 572. The system then queries calendar table 206 and reads back relevant calendar information for the user for the selected day in a block 574.

Figure 31:
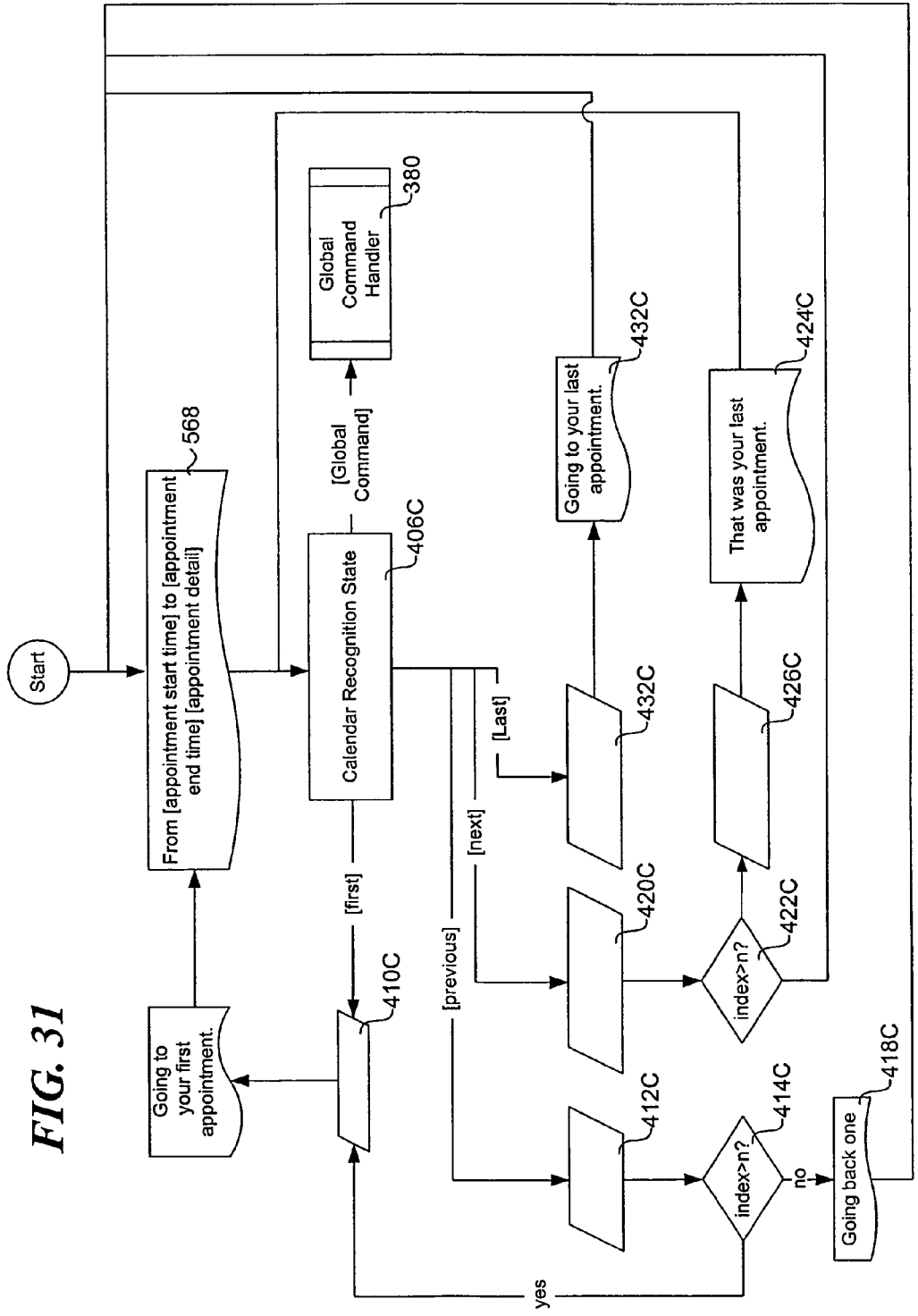
FIG. 31 is a logic flowchart illustrating the logic used by the system when enabling a user to browse calendar information stored in the Enterprise database.
Figure 32:
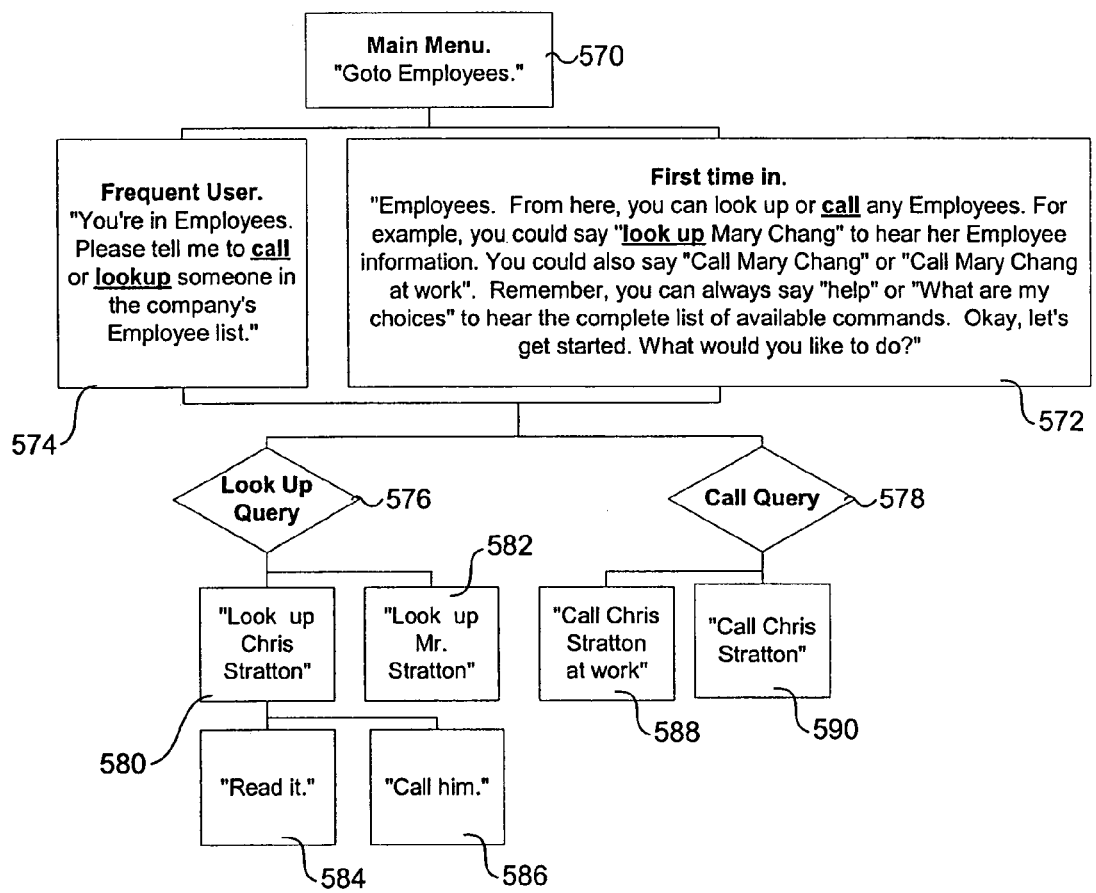
FIG. 32 is a command call diagram illustrating the navigation options encountered by a user when in an "employees" domain of the voice database access system.

A flowchart illustrating the logic used by the system to enabling calendar browsing is shown in FIG. 31. This logic flowchart contains similar logic to that shown in the flowcharts of FIGS. 21, 23, and 27, wherein blocks that perform similar processes to that described for FIG. 21 have an appended "C." The process begins with the system announcing the start and end times and details of the first appointment for the day in question in a block 568. The logic then proceeds to a calendar recognition state 406C, from which the logic is directed to various blocks based on user navigation input, such as "first", "previous," "next," "last," or a global command, thereby enabling the user to navigate to a particular appointment, return to a previously read appointment, etc. As each appointment is navigated to, its start and end times and details are read in block 568.

Employees Domain

Users can look up or call any employee from the employees domain. If a look up or call request returns more than one employee (for example, there are two names in the database that match "John Smith") the user will be placed in a browsable list of employees returned for that request. The user can then disambiguate by saying "Call this one" or "Read this one" after hearing a particular header. They can also say any other valid Employee command. The header information is returned after the initial employee query. If the user wants more detailed data they say "Read it."

A user enters the employees domain from the main menu by saying, "Go to Employees" in a block 570. First time uses are advised on how they can call an employee or look up employee information in a block 572, while previous users are asked for the name of someone in the company's employee list to call or lookup in a block 574. Depending on whether the user requests to "call" an employee or "look up" an employee, a corresponding lookup query 576 or call query 578 will be performed.

The logic used in look up query 576 is similar to the logic used in look up query 446 of FIG. 22. An employee may be looked up using various identifiers, such as a first and last name, a last name or first name, or by a site. Three examples of look up queries are depicted in blocks 580 and 582. Once a set of employee information has been retrieved in response to the look up query, the user can have the system read the header and detail by saying, "read it," as depicted in a block 584. Typical employee header information will include a name, and may include a site for disambiguation purposes. A typical employee detail will include a work number, home number, cellular number, fax number, physical address, and e-mail address. An addition to obtaining employee information, the user may also call the employee from this point in the navigation by saying, "call him" or "call her," as depicted by a block 586.

The logic used in call query 578 is similar to the logic used in call query 460 discussed above with reference to FIG. 22. Examples of call queries are depicted in blocks 588, and 590.

Figure 33:
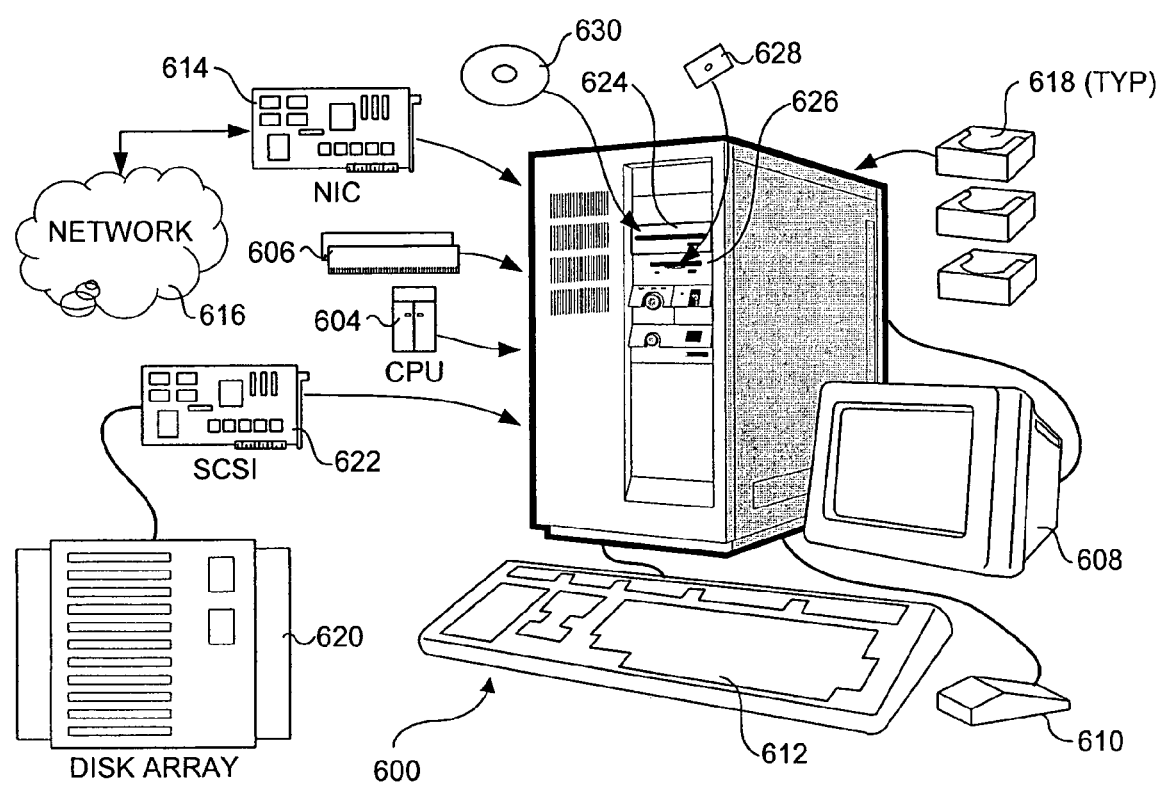
FIG. 33 is a schematic diagram illustrating the primary components of an exemplary computer system suitable for implementing the present invention.

In the foregoing description, an exemplary implementation of the invention that supports voice access to CRM data in an enterprise data system is disclosed. This is not meant to be limiting, as the teaching and principles of the invention may be applied to various other types of data that are commonly stored in enterprise data systems or stand-alone data stored, such as service requests, orders, activities, call reports, financial services vertical or other vertical applications. When implementing the invention for these optional types of information, an appropriate set of domains that map to the underlying data in the enterprise data system or data store should be used. Ideally, in instances in which the underlying enterprise data system is typically access using an online client connection, the navigation routes offered to the users should mirror the navigation routes used by the online clients Exemplary Server Computer System With reference to FIG. 33, a generally conventional computer server 600 is illustrated, which is suitable for use in connection with practicing the present invention, and may be used for the various servers in the system architecture. Examples of computer systems that may be suitable for these purposes include stand-alone and enterprise-class servers operating UNIX-based and LINUX-based operating systems, as well as servers running Windows NT and Windows 2000 server or advance server. In one embodiment, each of the servers operates under the Windows NT operating system, service pack 6.

Computer server 600 includes a chassis 602 in which is mounted a motherboard (not shown) populated with appropriate integrated circuits, including one or more processors 604 and memory (e.g., DIMMs or SIMMs) 606, as is generally well known to those of ordinary skill in the art. A monitor 608 is included for displaying graphics and text generated by software programs and program modules that are run by the computer server. A mouse 610 (or other pointing device) may be connected to a serial port (or to a bus port or USB port) on the rear of chassis 602, and signals from mouse 610 are conveyed to the motherboard to control a cursor on the display and to select text, menu options, and graphic components displayed on monitor 608 by software programs and modules executing on the computer. In addition, a keyboard 612 is coupled to the motherboard for user entry of text and commands that affect the running of software programs executing on the computer. Computer server 600 also includes a network interface card (NIC) 614, or equivalent circuitry built into the motherboard to enable the server to send and receive data via a network 616.

File system storage corresponding to the invention may be implemented via a plurality of hard disks 618 that are stored internally within chassis 602, and/or via a plurality of hard disks that are stored in an external disk array 620 that may be accessed via a SCSI card 622 or equivalent SCSI circuitry built into the motherboard. Optionally, disk array 620 may be accessed using a Fibre Channel link using an appropriate Fibre Channel interface card (not shown) or built-in circuitry.

Computer server 600 generally may include a compact disk-read only memory (CD-ROM) drive 624 into which a CD-ROM disk may be inserted so that executable files and data on the disk can be read for transfer into memory 606 and/or into storage on one or more of hard disks 618. Similarly, a floppy drive 626 may be provided for such purposes. Other mass memory storage devices such as an optical recorded medium or DVD drive may also be included. The machine instructions comprising the software program(s) that causes processor(s) 604 to implement the operations of the present invention that have been discussed above will typically be distributed on floppy disks 628 or CD-ROMs 630 (or other memory media) and stored in one or more hard disks 618 until loaded into memory 606 for execution by processor(s) 604. Optionally, the machine instructions may be loaded via network 616.

Although the present invention has been described in connection with a preferred form of practicing it and modifications thereto, those of ordinary skill in the art will understand that many other modifications can be made to the invention within the scope of the claims that follow. Accordingly, it is not intended that the scope of the invention in any way be limited by the above description, but instead be determined entirely by reference to the claims that follow.

What is claimed is:

1. A voice access system comprising:
   a voice recognition unit, wherein
   said voice recognition unit comprises
   a telephony interface,
   a voice recognition client, coupled to said telephony interface,
   a client-side module, and
   a network interface, coupled to said voice recognition client,
   said telephony interface is configured to
   enable a user to establish a telephone connection with said voice recognition unit, and
   receive user input via said telephone connection,
   said network interface is configured to
   couple said voice recognition unit to an enterprise data system via a network, and
   said client-side module is configured to
   enable said voice recognition unit to access said enterprise data system as a client; and
   a speech processing server, wherein
   said speech processing server comprises
   a voice recognition server, and
   a network interface,
   said network interface is configured to
   couple said speech processing server to said voice recognition unit and said enterprise data system via said network,
   said voice recognition unit and said speech processing server are configured to interact with one another to
   enable said user to request an ad hoc query be performed against data stored by said enterprise data system using a spoken natural language query, and
   said user input is said spoken natural language query.

2. The voice access system of claim 1, wherein
   said voice recognition unit and said speech processing server are further configured to
   interact with one another to
   determine query criteria,
   send said query criteria to said enterprise data system,
   receive data from said enterprise data system, and
   provide feedback data to said user via said telephone connection;
   said query criteria correspond to said ad hoc query;
   said data is based on said query criteria; and
   said feedback data corresponds to data received from said enterprise data system in a verbal format.

3. The voice access system of claim 2, wherein said voice recognition unit and said speech processing server are further configured to interact with one another to:

authenticate said user using a login process, wherein said user is identified using a unique identifier;
determine enterprise data system log-in data, wherein said enterprise data system log-in data is configured to enable said user to access said enterprise data system; and
automatically log said user into said enterprise data system using said enterprise data system log-in data.

4. The voice access system of claim 3, further comprising:
   a local database, wherein
   said voice recognition unit is coupled to said local database,
   said local database is configured to store a plurality of unique identifiers and corresponding pass-codes, and
   said voice access system is configured to authenticate said user by virtue of being configured to
   receive user-identification information from said user via said telephone connection,
   compare said user-identification information with user-identification data stored in said local database, and
   authenticate said user, if said user-identification information received from said user matches said user-identification data stored in said local database.

5. The voice access system of claim 2, wherein said voice recognition client is configured to convert voice waveform data into text data.

6. The voice access system of claim 5, wherein
   said voice recognition client comprises a voice recognition server; and
   said voice recognition client is configured to
   submit voice waveform data to said voice recognition server,
   convert said voice waveform data into text data using said voice recognition server, and
   make said text data available to said voice recognition client.

7. The voice access system of claim 2, wherein
   said voice recognition unit comprises a voice application; and
   said voice application is configured to manage interactions with said voice access system.

8. The voice access system of claim 2, wherein said speech processing server further comprises:
   a text-to-speech server, wherein
   said text-to-speech server is configured to convert text data into computer-generated audible speech, and
   said computer-generated audible speech corresponds to said data.

9. The voice access system of claim 2, wherein said voice recognition unit and said speech processing server are further configured to interact with one another to:
   convert said spoken natural language query into a data request in a text form; and
   identify an object and data criteria corresponding to said spoken natural language query,
   wherein said being configured to identify is based on said data request.

10. The voice access system of claim 9, wherein
    said enterprise data system comprises
    an object manager, and
    a data manager;
    said voice recognition unit and said speech processing server are further configured to
    interact with one another to
    communicate information corresponding to said object and said data criteria to said object manager; and
    said enterprise data system is configured to formulate a data query based on said object and said data criteria, wherein
  said being configured to formulate uses enterprise database schema information available to said data manager, and
return data retrieved by said data query to said voice recognition unit.

11. The voice access system of claim 2, wherein said voice recognition unit and said speech processing server are further configured to interact with one another to:

authenticate said user with said voice access system using a login process, wherein said user is identified by a unique identifier;
retrieve data pertaining to a selected object from said enterprise database, wherein said data is retrieved using said unique identifier; and
provide feedback data corresponding to any data that are retrieved in a verbal format to said user via said telephone connection.

* * * * *

UNITED STATES PATENT AND TRADEMARK OFFICE
CERTIFICATE OF CORRECTION

| | | |
|---|---|---|
| PATENT NO. | : 7,545,917 B2 | Page 1 of 1 |
| APPLICATION NO. | : 11/725839 | |
| DATED | : June 9, 2009 | |
| INVENTOR(S) | : Shannon Jones | |

It is certified that error appears in the above-identified patent and that said Letters Patent is hereby corrected as shown below:

In column 5, line 65, delete "101B" and insert -- 10B --, therefor.

In column 17, line 10, delete "phoemes" and insert -- phonemes --, therefor.

In column 17, line 20, delete "grammer" and insert -- grammar --, therefor.

In column 17, line 45, delete "Grammer" and insert -- Grammar --, therefor.

In column 17, line 66, delete "tor" and insert -- to --, therefor.

In column 18, line 29, delete "visability" and insert -- visibility --, therefor.

In column 20, line 36-53, delete "An exemplary RDBMS database schema 200 corresponding to enterprise database 12 is illustrated in FIG. 14. Database schema 200 includes an ENTERPRISE_USERS table 204, a CALENDAR table 206, an OPPORTUNITIES table 208, an OPPT_CONT_MAP table 210, a CONTACTS table 212, and OPPT_ACCT_MAP table 214, a CONT_ACCT_MAP table 216, and ACCOUNTS table 218, a USER_ACCOUNTS table 220, an EMPLOYEES table 222 and an EMP_ACCT_MAP table 224. The tables are linked via various one-to-many relationships 226. Primary keys for each table are labeled "PK", while foreign keys are labeled "FK#." In addition, required fields are bolded, while optional fields (i.e., nullable fields) contain non-bolded text. It will be understood that database schema 200 is used herein to illustrate how data may be queried, and that an actual enterprise database may have more and/or different columns and tables than those shown in FIG. 14." and insert the same on Col. 20, Line 37 as a new paragraph.

In column 20, line 58, delete "userId" and insert -- userID --, therefor.

In column 27, line 49, delete "synonomous" and insert -- synonymous --, therefor.

In column 29, line 3, delete "16" and insert -- 16$^{th}$ --, therefor.

In column 30, line 18, after "clients" insert -- . --.

Signed and Sealed this

Eighth Day of June, 2010

David J. Kappos
*Director of the United States Patent and Trademark Office*